(12) United States Patent
Guntin et al.

(10) Patent No.: US 12,050,565 B2
(45) Date of Patent: Jul. 30, 2024

(54) MANAGING SYSTEM OPERATIONS WITH A SCHEMA MANAGEMENT SYSTEM AND METHODS THEREFOR

(71) Applicants: Ed Guntin, Barrington, IL (US); Andrew Gust, Port St. Lucie, FL (US)

(72) Inventors: Ed Guntin, Barrington, IL (US); Andrew Gust, Port St. Lucie, FL (US)

(*) Notice: Subject to any disclaimer, the term of this patent is extended or adjusted under 35 U.S.C. 154(b) by 134 days.

(21) Appl. No.: 17/476,906

(22) Filed: Sep. 16, 2021

(65) Prior Publication Data

US 2022/0083518 A1 Mar. 17, 2022

Related U.S. Application Data

(60) Provisional application No. 63/079,282, filed on Sep. 16, 2020.

(51) Int. Cl.
*G06F 16/21* (2019.01)

(52) U.S. Cl.
CPC .................. *G06F 16/213* (2019.01)

(58) Field of Classification Search
CPC ...... G06F 16/213; G06F 16/21; G06F 16/211; G06F 16/2423
See application file for complete search history.

(56) References Cited

U.S. PATENT DOCUMENTS

| | | | |
|---|---|---|---|
| 2006/0095582 A1 | 5/2006 | Nitya et al. | |
| 2008/0027830 A1* | 1/2008 | Johnson | G06Q 30/0641 707/E17.116 |
| 2008/0104104 A1* | 5/2008 | Nolan | G06F 16/93 707/E17.127 |
| 2009/0106234 A1* | 4/2009 | Siedlecki | G06F 16/81 707/999.005 |
| 2011/0246220 A1 | 10/2011 | Albert | |
| 2012/0244510 A1 | 9/2012 | Watkins, Jr. | |
| 2012/0330709 A1 | 12/2012 | Khorsheed et al. | |
| 2013/0055168 A1 | 2/2013 | Shiroor et al. | |
| 2013/0318129 A1* | 11/2013 | Vingralek | G06F 16/284 707/E17.005 |
| 2014/0214333 A1 | 7/2014 | Plattner et al. | |
| 2015/0271178 A1* | 9/2015 | Bhattacharya | G06F 21/6254 726/1 |

(Continued)

OTHER PUBLICATIONS

"Computer Packages Inc.", Patent & Trademark Management System, Sep. 29, 2014, 1 page.

(Continued)

*Primary Examiner* — Dinku W Gebresenbet
*Assistant Examiner* — Dustin D Eyers
(74) *Attorney, Agent, or Firm* — Guntin & Gust, PLC; Ed Guntin

(57) ABSTRACT

Aspects of the subject disclosure may include, for example, a device configured to receive a request to create a schema. The device can be further configured to obtain a schema identifier, user type, and item identifier, the item identifier identifying one or more items to which the schema is to be applied to. The device can also be configured to generate a plurality of schema elements, and distinguish the schema from other schemas based on the schema identifier, the user type, the item identifier, or any combinations thereof. Other embodiments are disclosed.

20 Claims, 47 Drawing Sheets

(56) References Cited

U.S. PATENT DOCUMENTS

2017/0046374 A1* 2/2017 Fletcher .............. G06F 3/04842

OTHER PUBLICATIONS

"Deliver Winning Projects", Project Management Software, Microsoft Project, Sep. 29, 2014, 1 page.
"For Law Firms", CPA Global Patent Services, Sep. 29, 2014, 3 pages.
"Make Lists", Make Free Checklists Online, Take a quick tour, Sep. 29, 2014, 2 pages.

* cited by examiner

Are DEC(s) being filed that have been signed by inventor(s)?     Yes   No

▲ Review DEC(s)

▲ Obtain ADS from EFS if matter is currently being filed (or from PAIR if previously filed). Confirm spelling of inventor name in each DEC matches corresponding inventor in ADS.

◉ Pending issue    Solved? ○ Yes ○ No

▲ Select type of matter requiring DEC

Is a substitute statement (aka substitute DEC) being filed?     Yes   No    Select an option ▸

① Issue Editor

Memo & e-mail — 152D-4    Memo-Only — 152D-5    Cancel

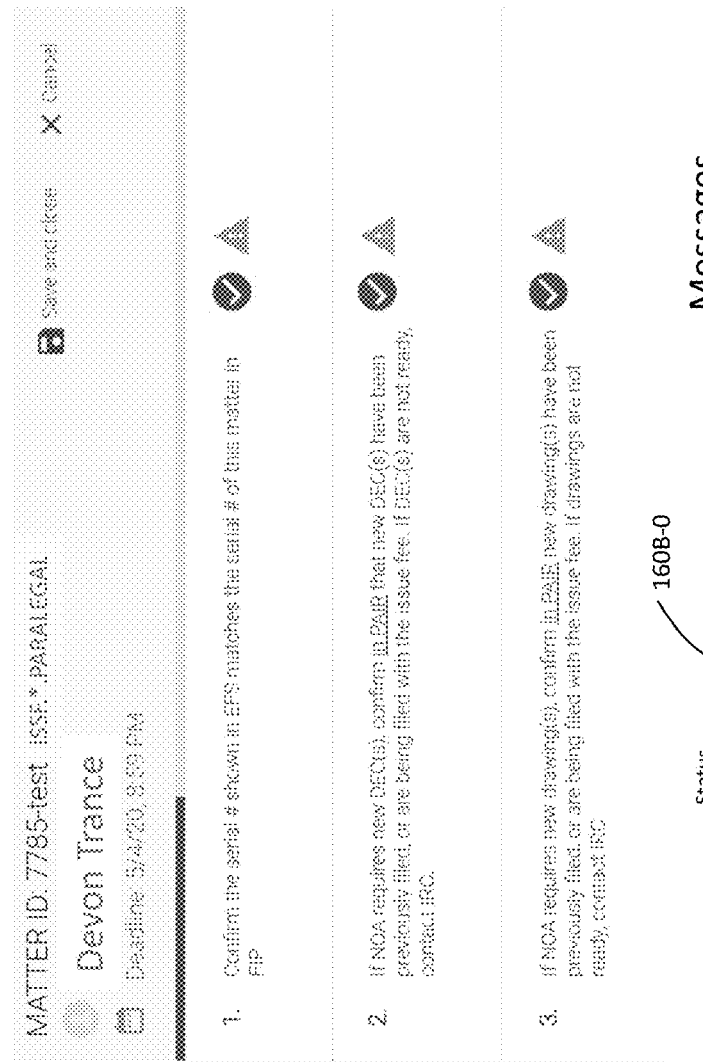
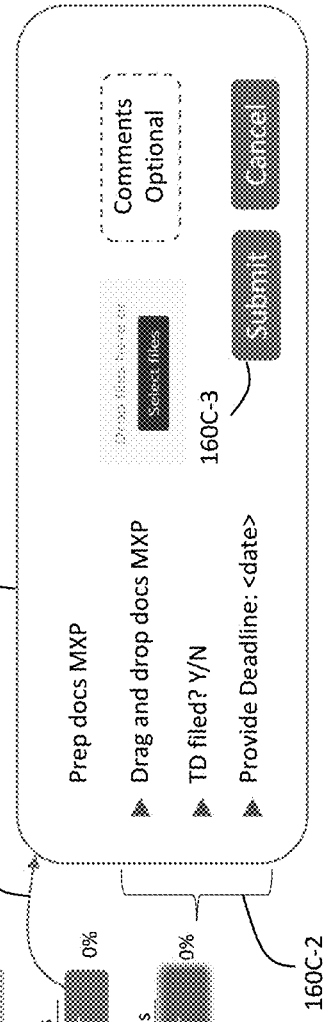
FIG. 9E

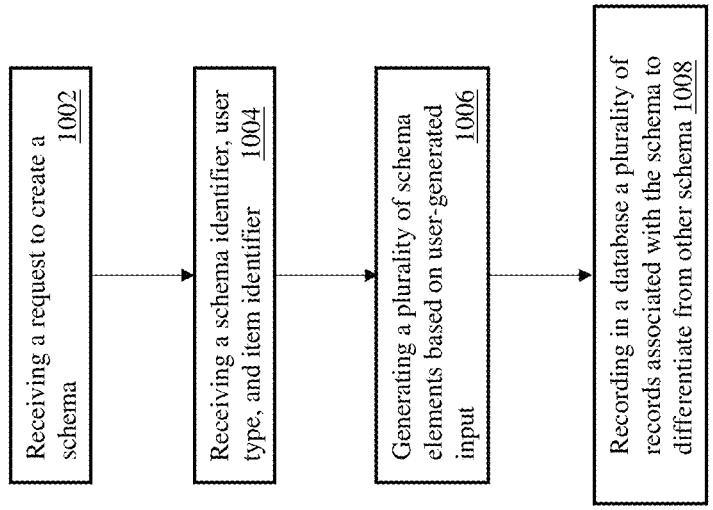

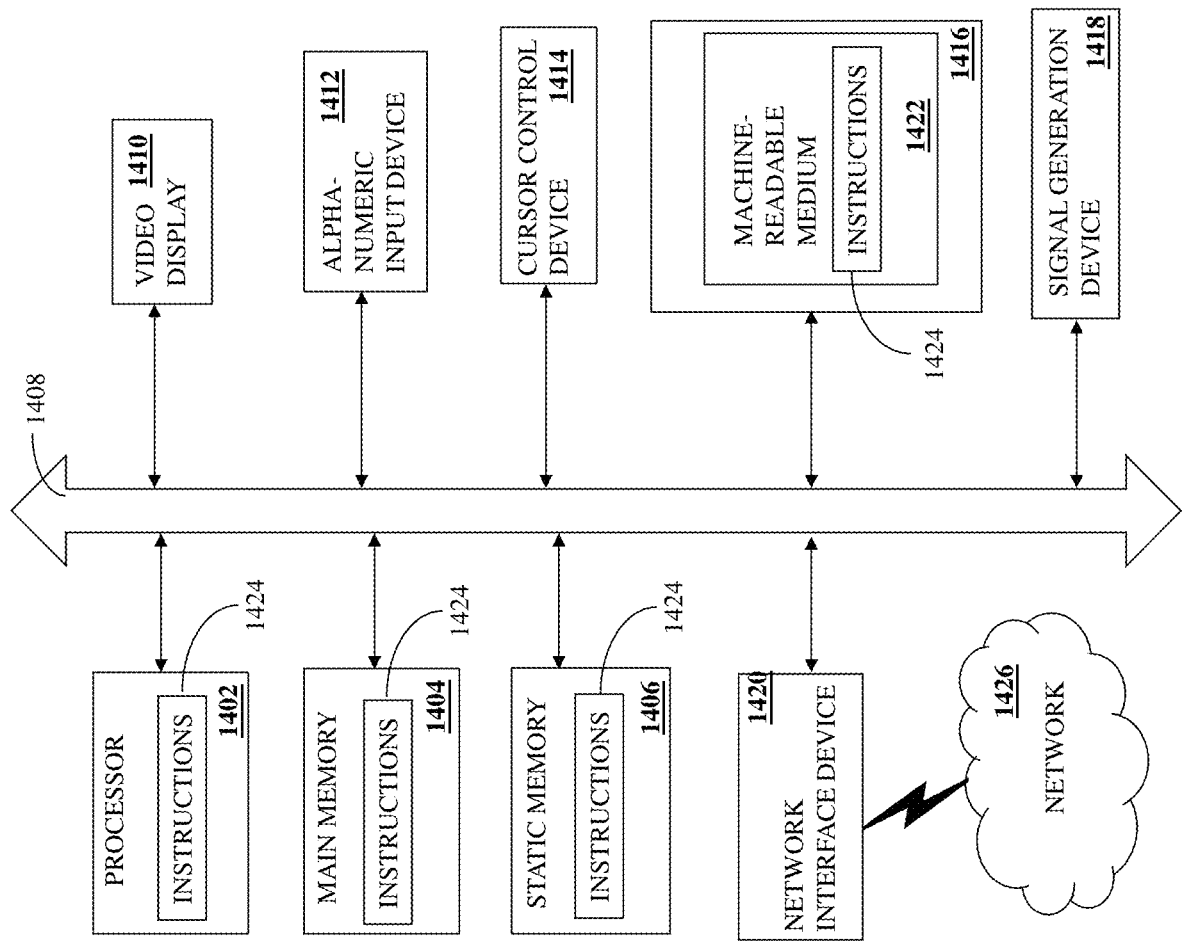

MANAGING SYSTEM OPERATIONS WITH A SCHEMA MANAGEMENT SYSTEM AND METHODS THEREFOR

CROSS-REFERENCE TO RELATED APPLICATION(S)

The present application claims the benefit of priority to U.S. Provisional Application No. 63/079,282 filed on Sep. 16, 2020, which is hereby incorporated herein by reference in its entirety.

FIELD OF THE DISCLOSURE

The subject disclosure relates to managing system operations with a schema management system and methods therefor.

BACKGROUND

Systems and processes can be subject to a malfunction due to a lack or improper testing to confirm the elements of the systems and/or processes are in a proper state of operation and use. To overcome this, some enterprises institute strict guidelines to prevent system and/or process errors. For example, commercial pilots run through a battery of operational verifications while in the cockpit to be assured that the plane is in condition for flight. Surgical staff in an operating room perform operational verifications to be assured that the equipment and tools needed for the operation are functional. Operational verifications are especially complex when there are interdependencies in an interdisciplinary setting.

BRIEF DESCRIPTION OF THE DRAWINGS

Reference will now be made to the accompanying drawings, which are not necessarily drawn to scale, and wherein:

FIGS. 6A, 6B, 6C, 6D, 6E, 6F, 6G, 6H and 6I are block diagrams illustrating exemplary, non-limiting embodiments for managing schemas in accordance with various aspects described herein;

FIGS. 7A, 7B, 7C and 7D are block diagrams illustrating exemplary, non-limiting embodiments for importing schemas or schema elements in accordance with various aspects described herein;

FIGS. 8A, 8B, 8C, 8D, 8E, 8F, 8G, 8H and 8I are block diagrams illustrating exemplary, non-limiting embodiments for processing schemas in accordance with various aspects described herein;

FIGS. 9A, 9B, 9C, 9D, 9E, 9F, 9G, 9H, 9I, 9J, 9K, 9L, 9M, and 9N are block diagrams illustrating exemplary, non-limiting embodiments for utilizing features of a schema management system in an interdisciplinary environment in accordance with various aspects described herein;

FIG. 10 depicts an illustrative embodiment of a method applied to a schema management system in accordance with various aspects described herein;

FIG. 14 is a diagrammatic representation of a machine in the form of a computer system within which a set of instructions, when executed, can cause the machine to perform any one or more of the methods or embodiments described herein for a schema management system.

DETAILED DESCRIPTION

Figure 1A:
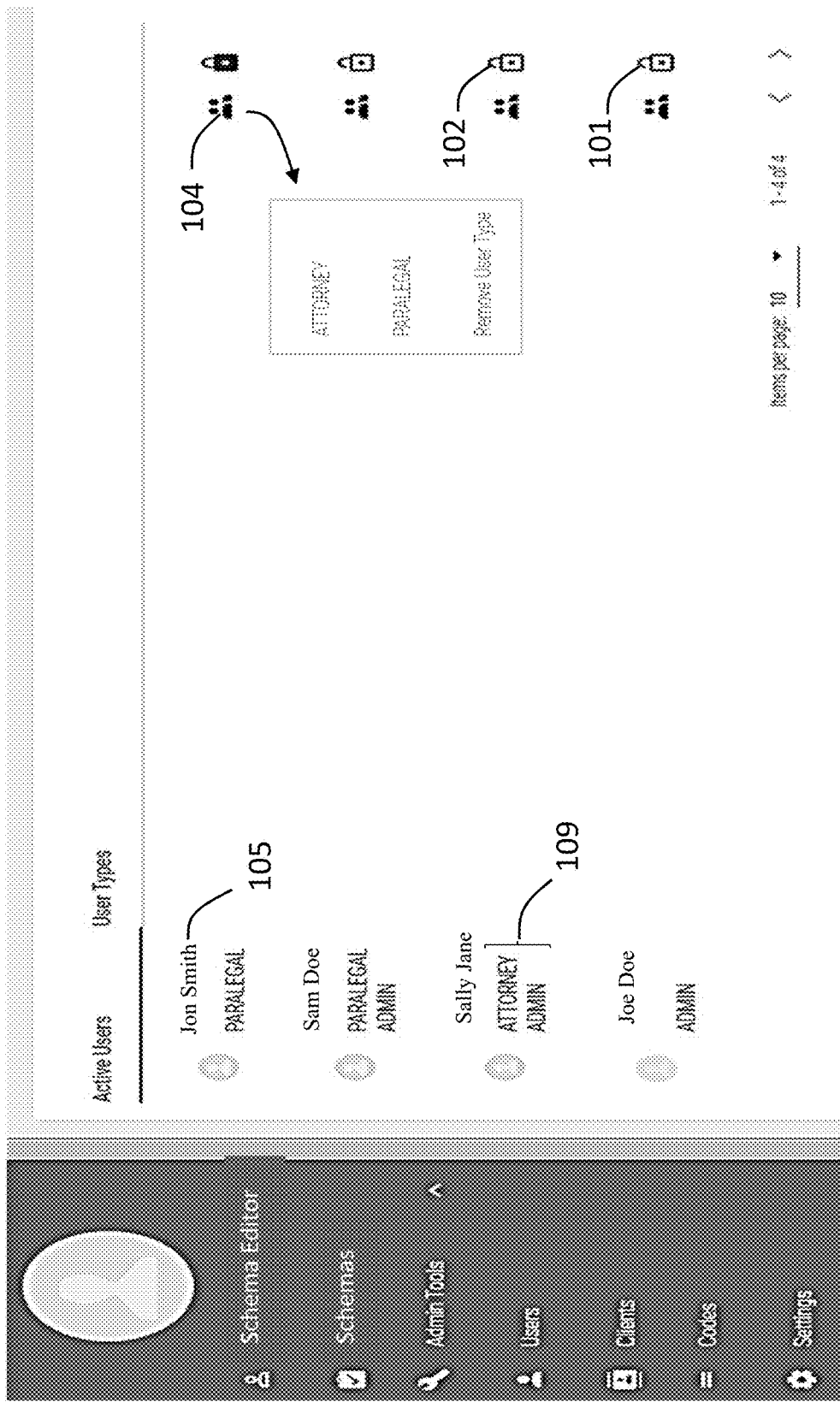
FIGS. 1A, 1B, 2 and 3 are block diagrams illustrating exemplary, non-limiting embodiments of a schema management system in accordance with various aspects described herein.

The subject disclosure describes, among other things, illustrative embodiments for a schema management system enabling users to process schemas efficiently. Other embodiments are described in the subject disclosure.

One or more aspects of the subject disclosure include a machine-readable medium, including executable instructions that, when executed by a processing system of a schema management system that includes a processor, facilitate performance of operations. The operations can include receiving a request to create a schema, presenting a schema structure for completing the schema, receiving, via the schema structure, a schema identifier, user type, and item identifier, receiving, via the schema structure, an expiration period for the schema, generating a plurality of schema elements based on user-generated input, and recording in a database a plurality of data structures associated with the schema, the data structures including the schema identifier, the user type, the item identifier, the expiration period of the schema, and the plurality of schema elements, the database including other data structures for other schemas, the other schemas and the schema collectively corresponding to a plurality of schemas with associated data structures, and the plurality of schemas distinguishable from each other based on the schema identifier, the user type, and the item identifier associated with each schema of the plurality of schemas.

One or more aspects of the subject disclosure include a portion of the plurality of schema elements comprising an imported schema and the operations of the processing system further include presenting the imported schema at equipment of a first user, receiving user-generated input from the equipment of the first user, the user-generated input identifying an assignment of the imported schema to a second user, and detecting a submission request directed to the second user.

One or more aspects of the subject disclosure include the operations of the processing system further configured for notifying the second user of the assignment of the imported schema responsive to detecting the submission request, receiving a delegation request from the second user, the delegation request identifying a third user to delegate the imported schema element, receiving an acceptance message from equipment of the third user, and reassigning the imported schema to the third user.

One or more aspects of the subject disclosure include the imported schema being partially completed by the second user before being reassigned to the third user.

One or more aspects of the subject disclosure include the operations of the processing system further configured for presenting a first survey to the first user and a second survey to the second user.

One or more aspects of the subject disclosure include the operations of the processing system further configured for setting a status of the schema to an expiration state responsive to detecting the expiration period.

One or more aspects of the subject disclosure include the operations of the processing system further configured for receiving first user-generated input from first equipment of the first user, the first user-generated input corresponding to an extension request for extending the expiration period, notifying a second user of the extension request, receiving second user-generated input from second equipment of the second user, the second user-generated input corresponding to response instruction addressing the extension request, and adjusting the expiration period of the schema according to the response instruction.

One or more aspects of the subject disclosure include the operations of the processing system further configured for reordering schema elements of the plurality of schema elements according to drag-and-drop user-generated input.

One or more aspects of the subject disclosure include the operations of the processing system further configured for receiving a search request for one or more schemas, and presenting results of the search request.

One or more aspects of the subject disclosure include the operations of the processing system further configured for presenting a pending state of an uncompleted schema.

One or more aspects of the subject disclosure include a method for receiving a request to create a schema, receiving a schema identifier, user type, and item identifier, the item identifier identifying one or more items to which the schema is to be applied to, generating a plurality of schema elements based on user-generated input, and recording in a database a plurality of records associated with the schema, the records including the schema identifier, the item identifier, and the plurality of schema elements, the database including other records for other schemas, the other schemas and the schema comprising a plurality of schemas with corresponding records, and the plurality of schemas distinguishable from each other based on the schema identifier and the item identifier associated with each schema of the plurality of schemas.

One or more aspects of the subject disclosure include a method for configuring a portion of the plurality of schema elements of the schema for a multi-user based processing of the schema between a plurality of users.

One or more aspects of the subject disclosure include a device including a processing system including a processor, and a memory that stores executable instructions that, when executed by the processing system, facilitate performance of operations. The operations can include receiving a request to create a schema, receiving a schema identifier, user type, and item identifier, the item identifier identifying one or more items to which the schema is to be applied to, generating a plurality of schema elements, and distinguishing the schema from other schemas based on the schema identifier of the schema, the user type of the schema, the item identifier of the schema, or any combinations thereof differing from another schema identifier of other schemas, another user type of the other schemas, another item identifier of the other schemas, or any combinations thereof.

One or more aspects of the subject disclosure include the operations of the processing system further configured for configuring a portion of the plurality of schema elements of the schema for team-based processing of the schema between team members.

FIG. 1A depicts a user interface (UI) for identifying users 106 of a schema management system 100. User entries can be created automatically by linking a Windows Active Directory (or other directory service) with the schema management system 100. Each user 106 can also be given a user type tag 108 (e.g., Paralegal, Attorney, Administrator, or combinations thereof). Administrators are represented by a locked iconic symbol 101 versus non-administrators (or regular users) are represented by an unlocked iconic symbol 102. Administrators have full access to all features of the schema management system 100 represented by the unlocked status of the iconic symbol 101, while regular users have limited access to the features of the schema management system 100 represented by the locked status of the iconic symbol 101. Administrators, for example, can create a schema or edit schema elements of an existing schema as will be described shortly below. Non-administrative users (or regular users) can selectively request a specific schema with corresponding schema elements, but cannot create or edit schemas, schema elements, add or remove users, or other administrative tasks given to an administrator of the schema management system 100.

Figure 1B:
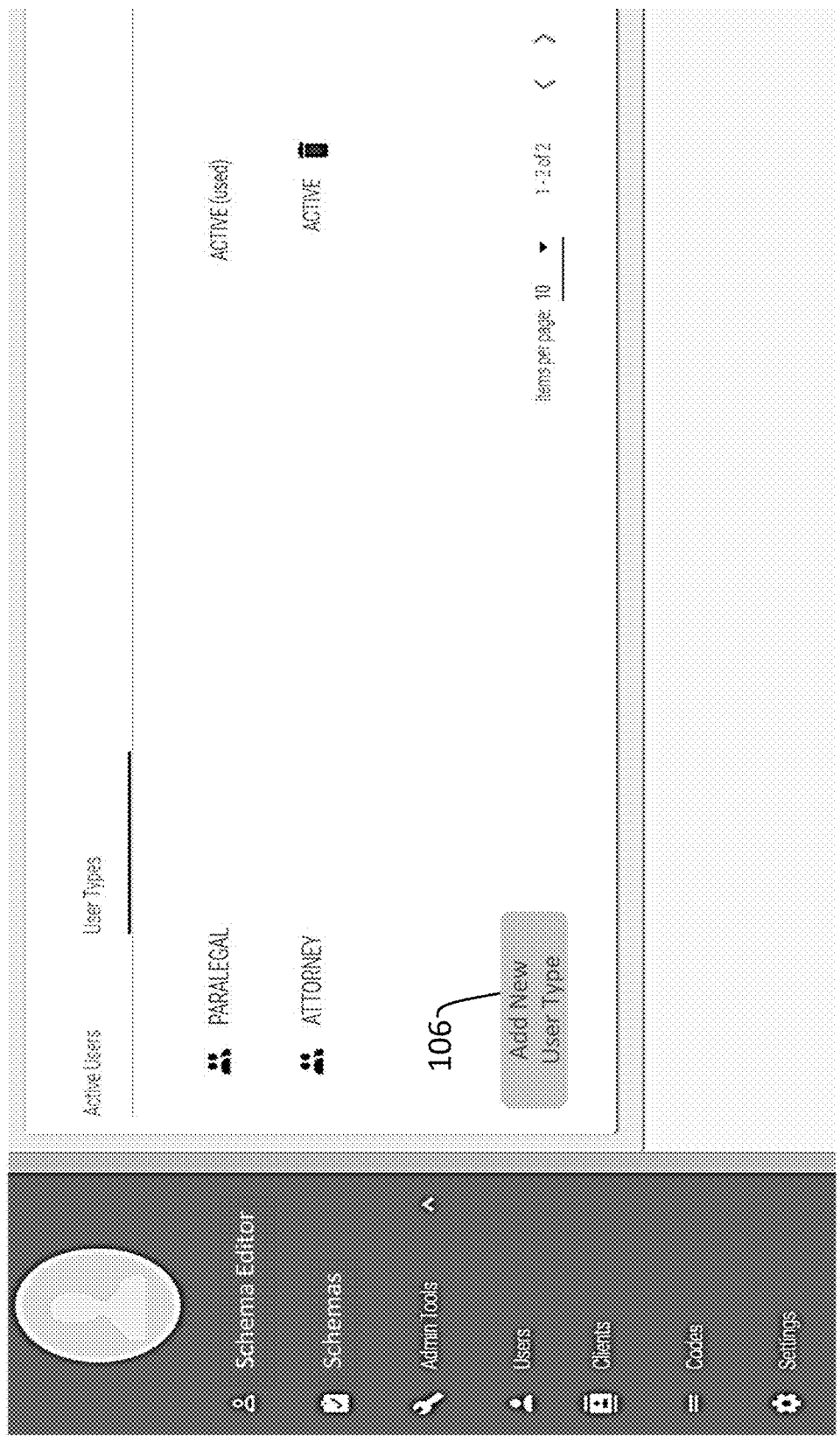

User type tags 109 can be selected from a drop-down menu generated when an iconic symbol 104 is selected. The options provided in the dropdown menu are not limited to the examples shown in the UI of FIG. 1A. For example, other user type tags 109 can include by way of illustration only, a cleaning crew, maintenance crew, warehouse crew, management, facilities, HR, supply, mom, dad, son, daughter, etc. User types can be selected from the drop-down menu 104 or can be automatically generated. For example, user types can be automatically generated via active directory settings (e.g., user's title, function, responsibility, etc.). Also, user types can be manually created via user generated input provided upon selecting button 106 of FIG. 1B. User types can be based on various options including, but not limited to, title, function, responsibility, or other options that can be defined by the administrator(s) of the schema management system 100. It will be further appreciated that user types can represent an artificial intelligence system or other form of a computing system.

Figure 2:
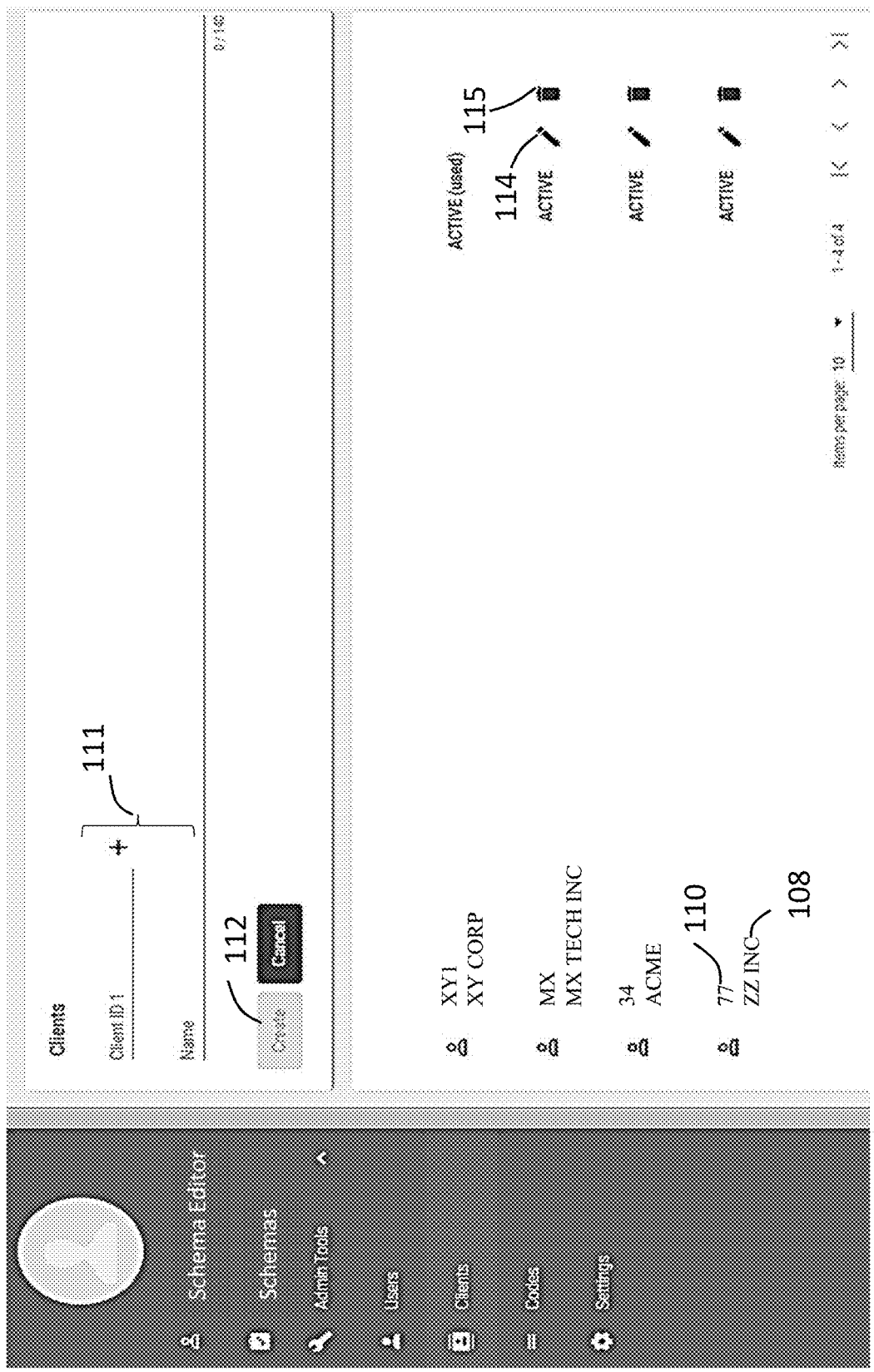

FIG. 2 depicts a UI for entering clients by name 108 with a corresponding client ID 110. A client name 108 can be the full name of the client or an abbreviation. The client ID 110 can correspond to a number (e.g., 77), characters only (e.g., MX) or alphanumeric with our without special characters/symbols (e.g., XY1). The client ID can serve as a base for identifying specific client matters (e.g., XY1-0001 for a first matter of XY Corp). New clients can be added by completing fields 111 (i.e., client ID 110, and the corresponding client name 108) followed by a selection of the Create button 112. Clients ID's 110 and client names 108 can be edited with the edit icon 114 depicted as a pencil icon. Similarly, a client ID 110 and it's corresponding name 108 can be deleted by selecting the trashcan icon 115.

It will be appreciated that a client ID 110 and corresponding client name 108 are a non-limiting illustration of the subject disclosure. For example, the schema management system 100 can be configured to refer instead to an item identifier in place of client ID 110 and a corresponding name given to the identifier in place of client name 108. The item name can be used to identify an enterprise, a person, an animal, a function, a grouping, an object, intangible item, an artificial intelligence system, or other types of conceptualizations that can make use of an operational schema and its corresponding schema elements as described in the subject disclosure. The item identifier of a corresponding item name can be used to distinguish between instances of applying a schema to the item name.

It will be further appreciated that an existing client ID 110 can be transferred to another client name 108. Upon completing the transfer, the schema management system 100 can be configured to show the client ID 110 of the former client name 108 highlighted in a color (e.g., red) or other indicia to indicate the client ID 110 is no longer available to the prior client name 108 and highlight in another color (e.g., green) or other indicia the client ID 110 under the new client name 108. Additionally, any schemas previously submitted by users under the former client name 108 remain linked to the former client name 108. Any new schemas submitted under the new client name 108 after the transfer took place would be linked the new client name 108. Segregating schemas previously submitted under the original client name 108 versus new schemas submitted under the new client name 108 enables the schema management system 100 to maintain statistics between client names 108 set apart. The foregoing client ID transfer feature can be used to account for instances when a new client acquires a previous client or other circumstances that may warrant a transfer of an existing client ID 110 to another client name 108.

Figure 3:
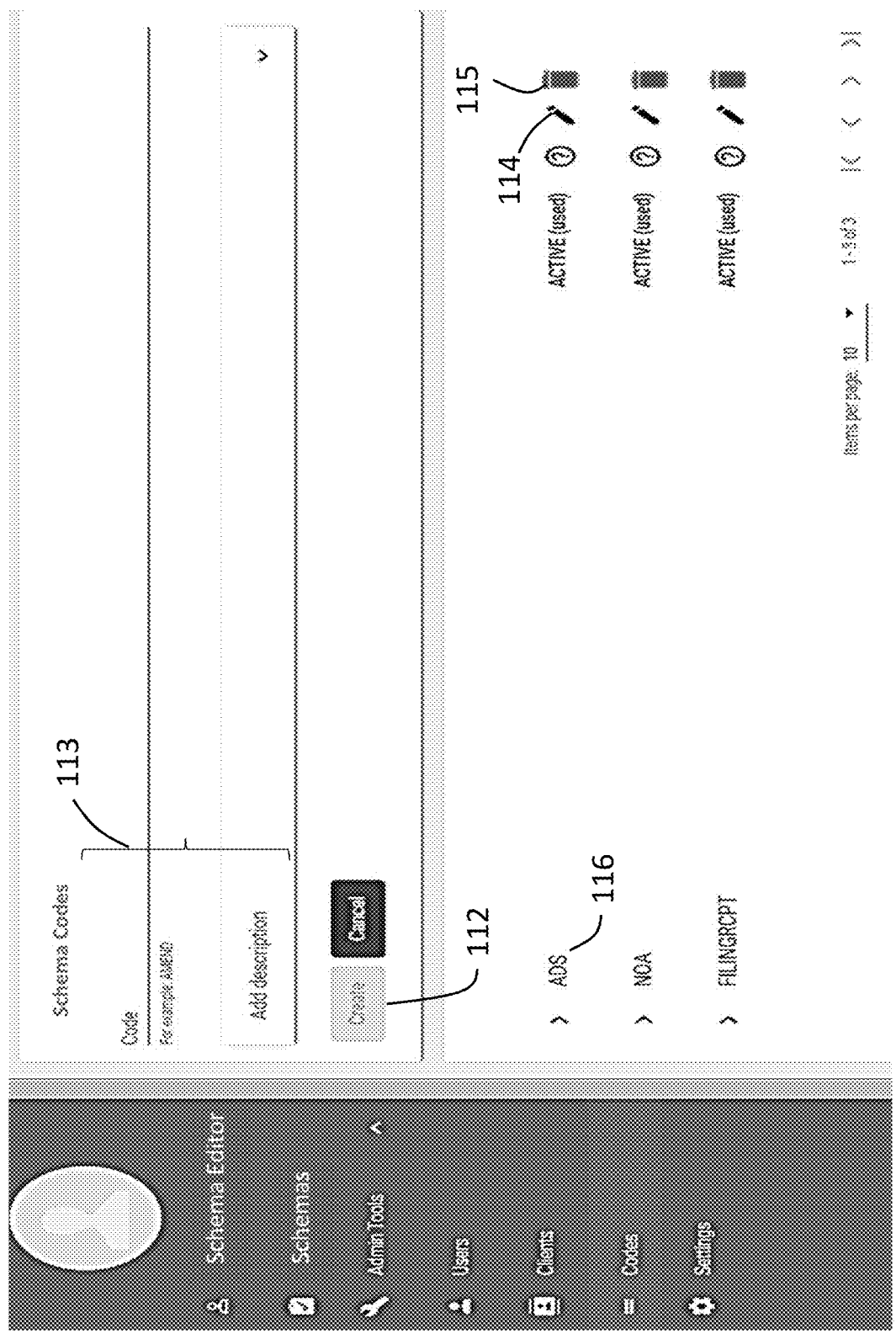

FIG. 3 depicts a UI for entering schema identifiers 116 (e.g., ADS, NOA, FILINGRCPT). A schema can include schema elements (which can have a temporal factor tied to them, e.g., an expiring time/date). Schema elements can be linked with schema elements in another schema thereby enabling an administrator to create nested schemas as will be described below. A user 105 of FIG. 1A can selectively request a schema by providing a schema identifier 116 and matter identifier (which inherently includes a client ID 110—as will be discussed below). The schema identifiers 116 can be created manually by an administrator through the UI of FIG. 3, or at the time of creating a new schema via the UI of FIG. 6B. Schema identifiers 116 can be represented by acronyms (or other identification techniques) to identify a type and/or function of a schema. Existing schema identifiers 116 can be edited by selecting the pencil icon 114 or deleted by selecting the trashcan 115.

Figure 4:
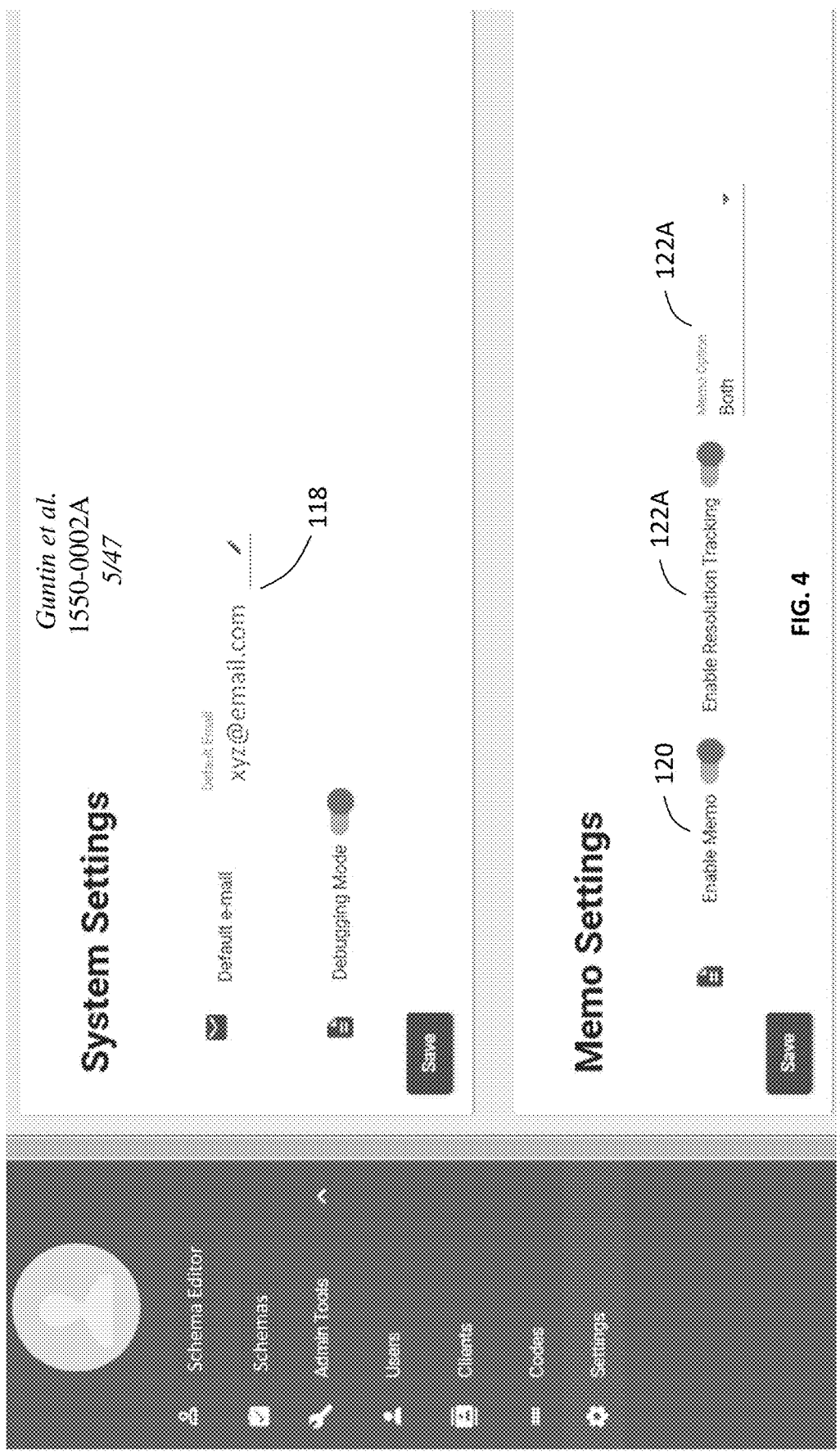
FIGS. 4 and 5 are block diagrams illustrating exemplary, non-limiting embodiments for configuring a schema management system in accordance with various aspects described herein.

FIG. 4 depicts setting configurations of the schema management system 100. The default e-mail field 118 can be used to designate where a schema notification is to be emailed to. The memos settings enables or disables use of memoranda 120 for recording/memorializing status information (e.g., issues) associated with a schema element of a schema. The memos settings can also be used to enable or disable resolution tracking 122A (e.g., user can indicate whether issue has been solved or remains unsolved). The memos settings can also be used identify memoranda options 122A to present a user when encountering an issue with a specific schema element. An administrator can choose via the memoranda options 122A presenting a user a memo that can be emailed, a memo that is for internal use only, or both. Other methods of communications can also be utilized for memos or notifications of memos, such as instant messaging, and addresses and/or contact information of recipients of the memos can be provided via this UI.

Figure 5:
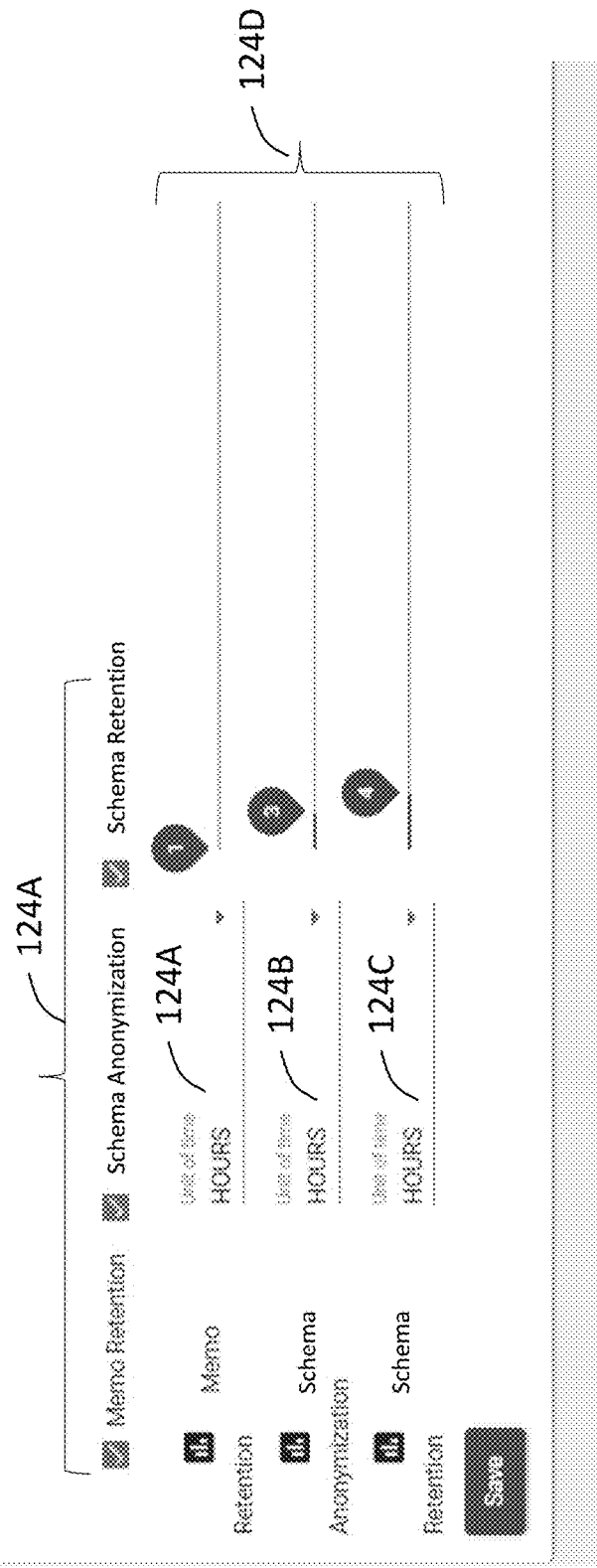

FIG. 5 depicts additional setting options of the schema management system 100. Memo retention, schema anonymization and schema retention periods can be selectively chosen via a checkbox section 124A. A retention (or purge) period 124A can be set for purging memos in a schema, but not the schema itself. Similarly, a purge period 124C can be set for purging an entire schema with all memoranda created by a user therein. The purge period for a memo and/or schema can be in any time frame desired by the administrator (e.g., minutes, hours, days, weeks, months, or years). Further, a period 124B can be set for anonymizing a schema. Anonymization can represent making anonymous a matter ID (e.g., XY1-0001) entered for a specific schema, the user (e.g., Jon Smith) who submitted the schema can also be made anonymous, along with anonymizing other fields in a submitted schema. Anonymity can be achieved by replacing matter IDs, user ID, and/or other fields with random alphanumeric numbers (e.g., replace XY1-0001 with 3df6-123-$$aa). In one embodiment, the anonymizing can be utilized so that data (e.g., results) can be analyzed without storing the original identification of matters and users that generated the data associated with the results.

A matter ID can represent an instance of an item identifier used to identify a particular use of a schema. Schema Element Import Settings 126 (discussed in relation to FIGS. 7A-7C) can also be set. For instance, the import feature can be configured to allow importing of only active schemas (i.e., schemas in use), but not inactive schemas (i.e., schemas that have been deactivated and are no longer in use). The "*" option is a wildcard flag that allows for import of schema elements from active and inactive schemas.

Figure 6A:

FIG. 6A depicts a UI for previewing or editing existing schemas identified by their respected schema IDs 116. A schema can be previewed by selecting the preview iconic symbol 136B. Previewing a schema represents presenting the administrator a view similar if not identical to how a regular user would view schema elements of a schema—see FIG. 8C. A schema can be edited by selecting the editing iconic symbol 136C. Characteristics of the schema are depicted by section 132B which includes columns for a general ID #, Schema ID, Client(s), User type(s), Version, Status, Created, Created By and Actions. The ID column represents a unique ID given to each schema instance. The schema ID 116 identifies each schema by its name. The Client(s) column identifies whether the schema is associated with a wildcard client, or one or more specific clients (e.g., the schema INVCALL is associated with single client: ACME). A wildcard (*) in the Client(s) column means the schema is associated with all clients of the schema management 100 system (see FIG. 2). It will be appreciated schemas can also be associated with more than one client, but not all. For example, suppose there are three clients: A, B, C. A schema can be associated with clients A & B, but not C. In this embodiment, client A would be shown in the Client(s) column with a superscript 2 to indicate two clients have been identified, but only one is shown. Placing a cursor over the superscript can reveal the hidden client B.

The User type(s) column identifies whether the schema is associated with a wildcard user type, or one or more specific user types (e.g., the schema TD is associated with only the user type: Paralegal). A wildcard (*) in the User type(s) column means the schema is associated with all user types of the schema management 100 system (see FIG. 1A). It will be appreciated schemas can also be associated with more than one user type, but not all. For example, suppose there are three user types: D, E, F. A schema can be associated with user types D & F, but not E. In this embodiment, the user type D would be shown in the User type(s) column with a superscript 2 to indicate two user types have been identified, but only one is shown. Placing a cursor over the superscript can reveal the hidden user type F.

The version column indicates the version of the schema. Each time a schema is edited, the version number increases.

The status column also indicates when a schema is New, Active, Active (used), Inactive, and Inactive (used). Inactive and Inactive (used) are not illustrated in FIG. 6A. New in the status column represents a new schema has been created, but is not available for use by regular users yet. An Active status represents an active schema available for use, but has yet to be used by a user. An Active (Used) status represents an active schema currently being used by a user or previously submitted by a user. An Inactive status represents a deactivated schema that is not available for use, and has not yet been used by a user. An Inactive (Used) status represents a deactivated schema that has been previously submitted by a user and is no longer available for use. The Created and Created By columns indicate, respectively, when the schema was created and by which administrator. The Actions column enables an administrator to view, upon selecting button 136A, a history of schema versions created and edited by administrators of a specific combination of schema ID, client ID, and user type.

Selection of a New designator 135A launches a pop-up screen 135B which allows the administrator to Activate the schema for use by other users. Similarly, selecting Active 135C in the status column launches a pop-up screen 135D that when selected by the administrator deactivates the schema. Also, when a schema has not been used (i.e., has not been utilized by a user) while either in the Active, Inactive, or New state, the schema will show a trashcan symbol 136D or other indicia enabling the administrator to delete it. However, once a schema has been used by a user by way of invoking, completing, or submitting the schema, the trashcan will disappear removing the ability for the administrator to delete the schema. This feature prevents deletion of data structures (or records) associated with a pending or submitted schema, which in turn enables an administrator to retrieve and/or analyze schemas processed by users of the schema management system 100.

Although not shown, it will be appreciated that when an administrator creates a schema, the schema can be linked to an approval workflow. For example, changing the New status to Activate can trigger the workflow. The schema management system 100 can be configured to submit notices to one or more individuals who must review and approve the schema being activated. The notices can be via email or other suitable notification process. The notice can include, for example, a hyperlink to the schema the administrator is requesting to activate. Selecting the hyperlink causes the schema to be presented to the reviewer with an Approve or Decline button. If the reviewer selects the Decline button, the reviewer can be prompted to provide a reason for the rejection, which is then communicate to the administrator. Upon all reviewer(s) selecting the Approve button, the schema is activated.

It will be appreciated further than when a schema transitions from New to Active, the schema management system 100 can be configured to deactivate any other schema that has an identical schema ID 116, client ID 110, and user type 109. This feature prevents conflicts between schemas.

Figure 6B:
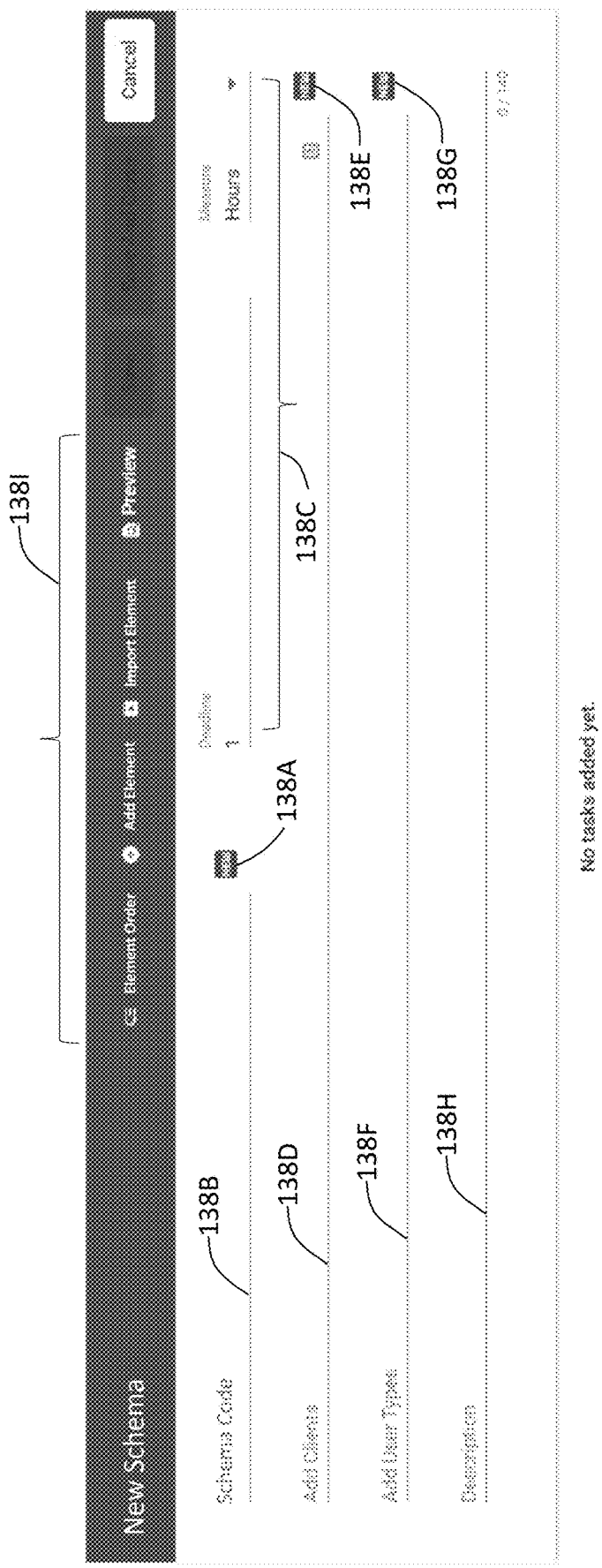

The New button 130A can be used to generate a new schema as depicted in FIG. 6B. In FIG. 6B, if the schema identifier 116 does not exist, a new one can be created by pressing the NEW button 138A. If, on the other hand, the schema identifier 116 exists, the user can type in schema ID in the schema code field 138B. A schema can also be given an expiration period as depicted in fields 138C. The administrator can enter any integer number in the Deadline field and select a unit of measure in minutes, hours, days, weeks, months or years. The deadline may be chosen by the administrator according to a specific application of the schema. An expiration timer is set to the expiration period and triggered at the time when a user requests a schema via the interface shown in FIG. 8A. The expiration period defines the time the user has to complete the schema.

The "Add Clients" field 138D can be used for identifying which clients can be associated with the schema. If the administrator enters "*" in the add clients field 138D, then the schema will apply to all clients. Otherwise, the administrator can identify one or more specific clients in the clients field 138D. If one or more clients do not exist, the New button 138E can be selected to create one or more new clients. The User Types field 138F identifies the type of users that can use the schema being created. If the administrator enters "*" in the user type field 138F, then all user types can use the schema. Otherwise, the administrator can identify one or more specific user types in this field. If one or more user types do not exist, the New button 138G can be used to define one or more new user types.

The section 138I can be used to manage the creation of schema elements. Particularly, the Element Order button can be used to change the order of schema elements (see FIG. 6I), the Add Element button can be used to add new schema elements (see FIG. 6C), the Import Element button can be used to import schema elements from other schemas (see FIGS. 7A-7D), and the preview button can be used to visualize schema elements as a user would view the schema.

Figure 6C:
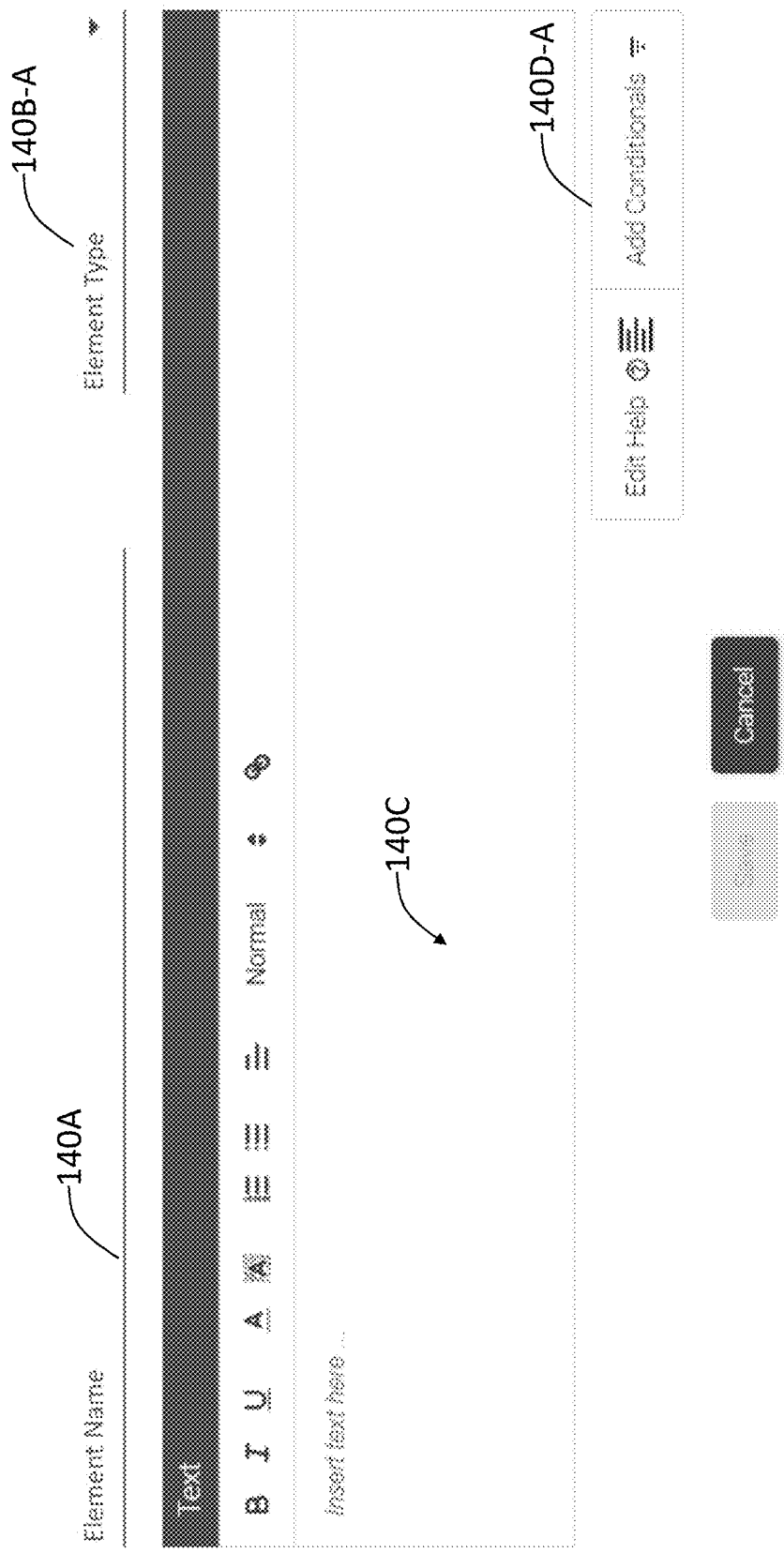
Figure 6D:
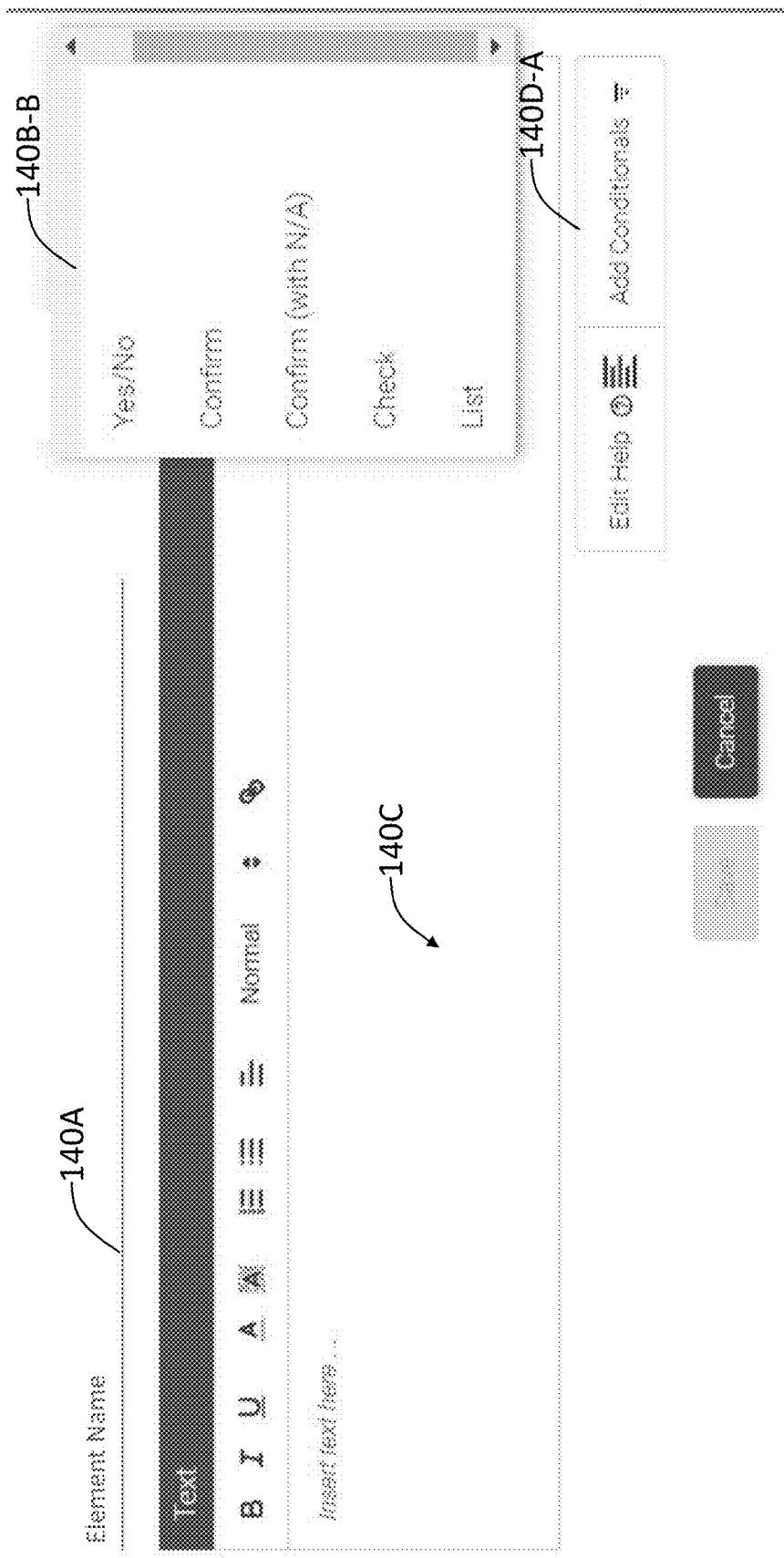

Referring to FIG. 6C, upon selecting the Add Element button, the administrator is presented with the UI of FIG. 6C. The administrator can add a schema Element Name 140A, select an Element Type 140B-A from a drop-down menu, and enter the description of the element in the "insert text here . . . " section 140C. The element type 140B-A can include without limitation element type options 140B-B such as blank, yes/no, Confirm, Check, or List—see FIG. 6D.

A Blank element type means there is no selectable item placed next to the schema element being created. This can be useful for designating a title of a group of schema elements. The element type Yes/No can be used for creating a conditional element based on the user's answer to a Yes/No inquiry. The Confirm element type can be used for confirming or identifying an issue while performing the schema element. The Confirm (with N/A) element type can be used for confirming, identifying an issue while performing the element, or noting that the schema element is not applicable under the circumstances. The Check element type can be used to create a checkbox next to the schema element to validate that the user has performed the schema element without confirmation or issue recognition. The List element type can be used to identify a list of options that can be associated with a conditional selection of sub-schema elements based on the option selected by a user.

Figure 6E:
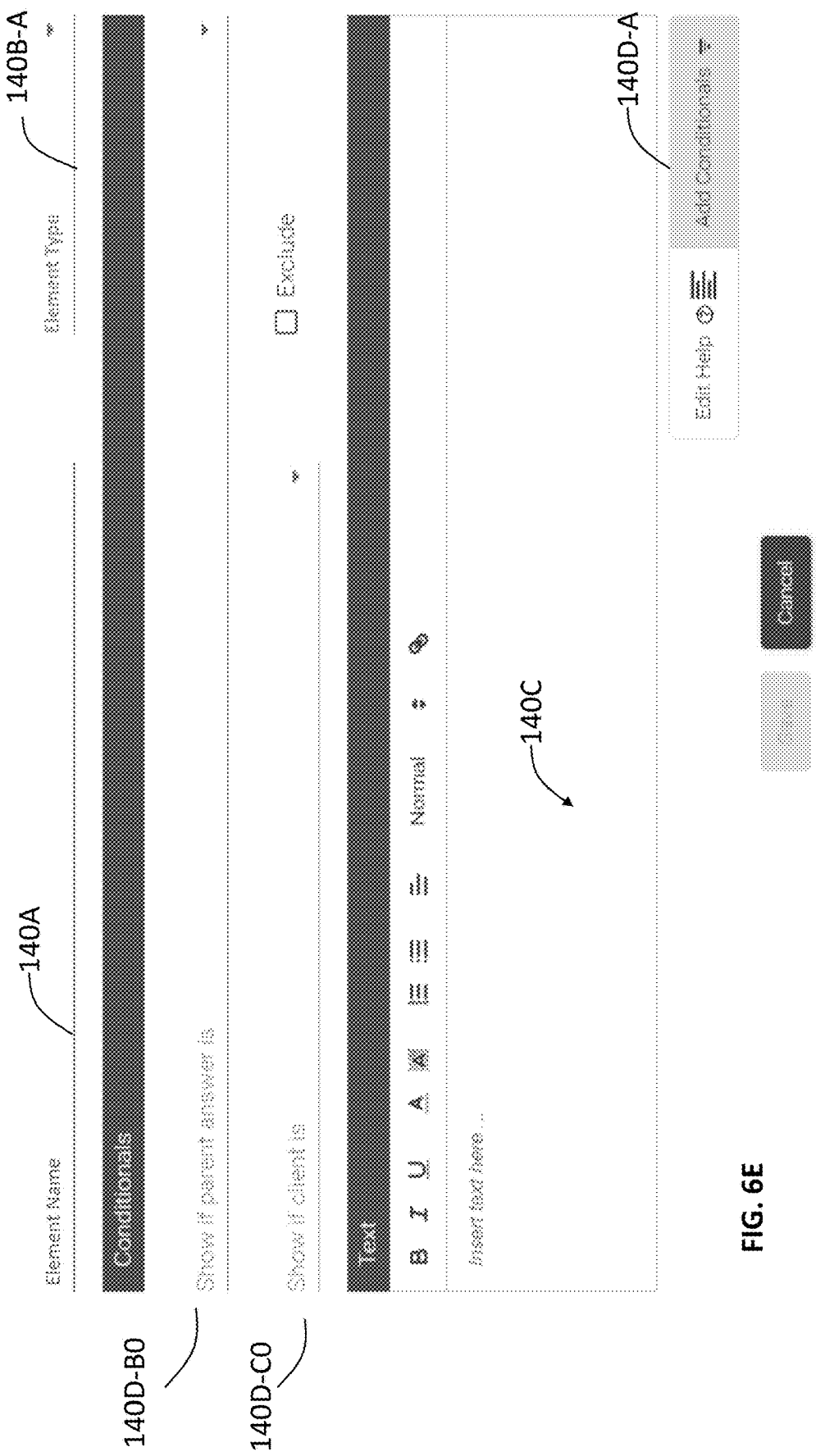
Figure 6F:
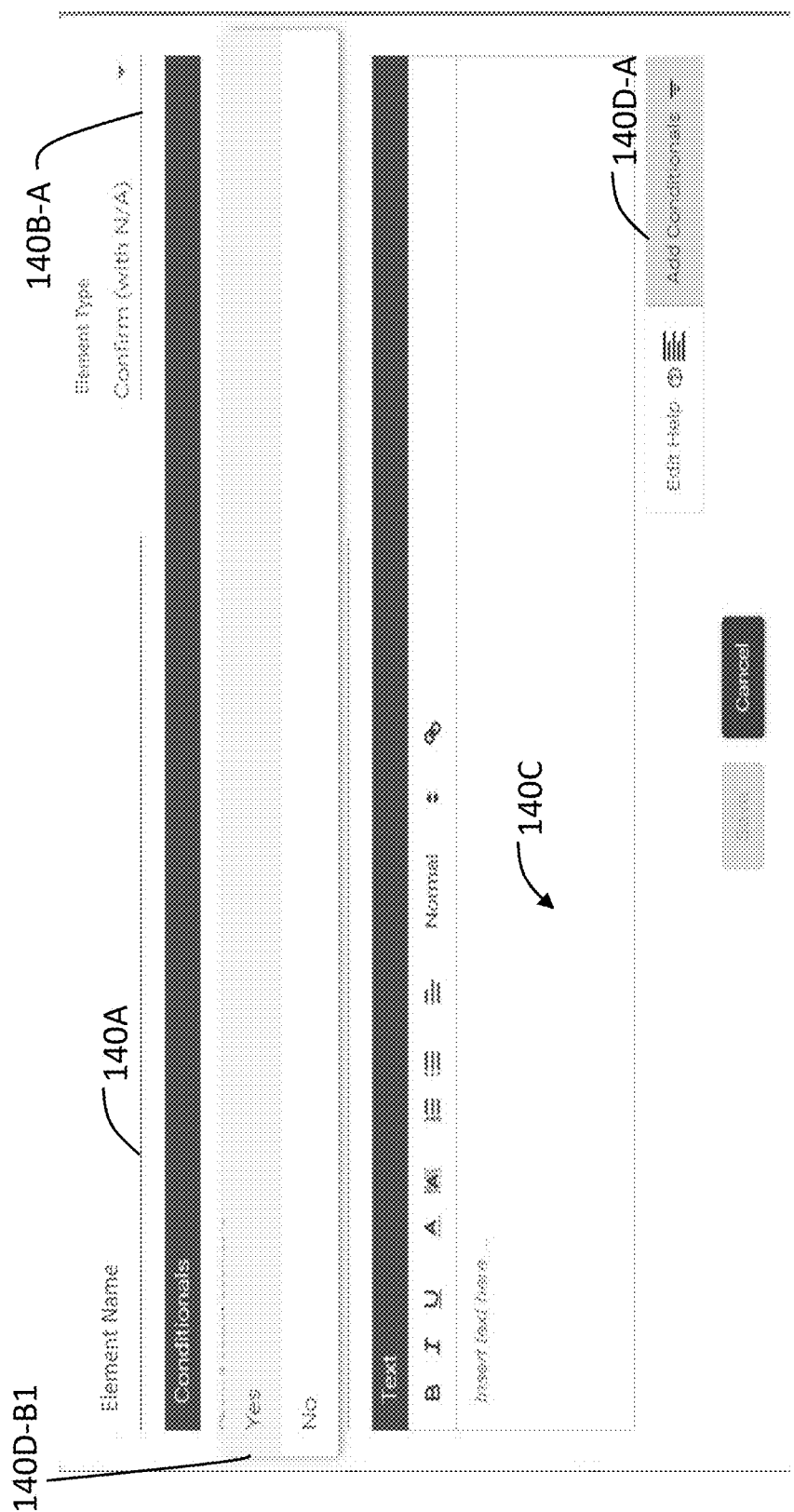
Figure 6G:
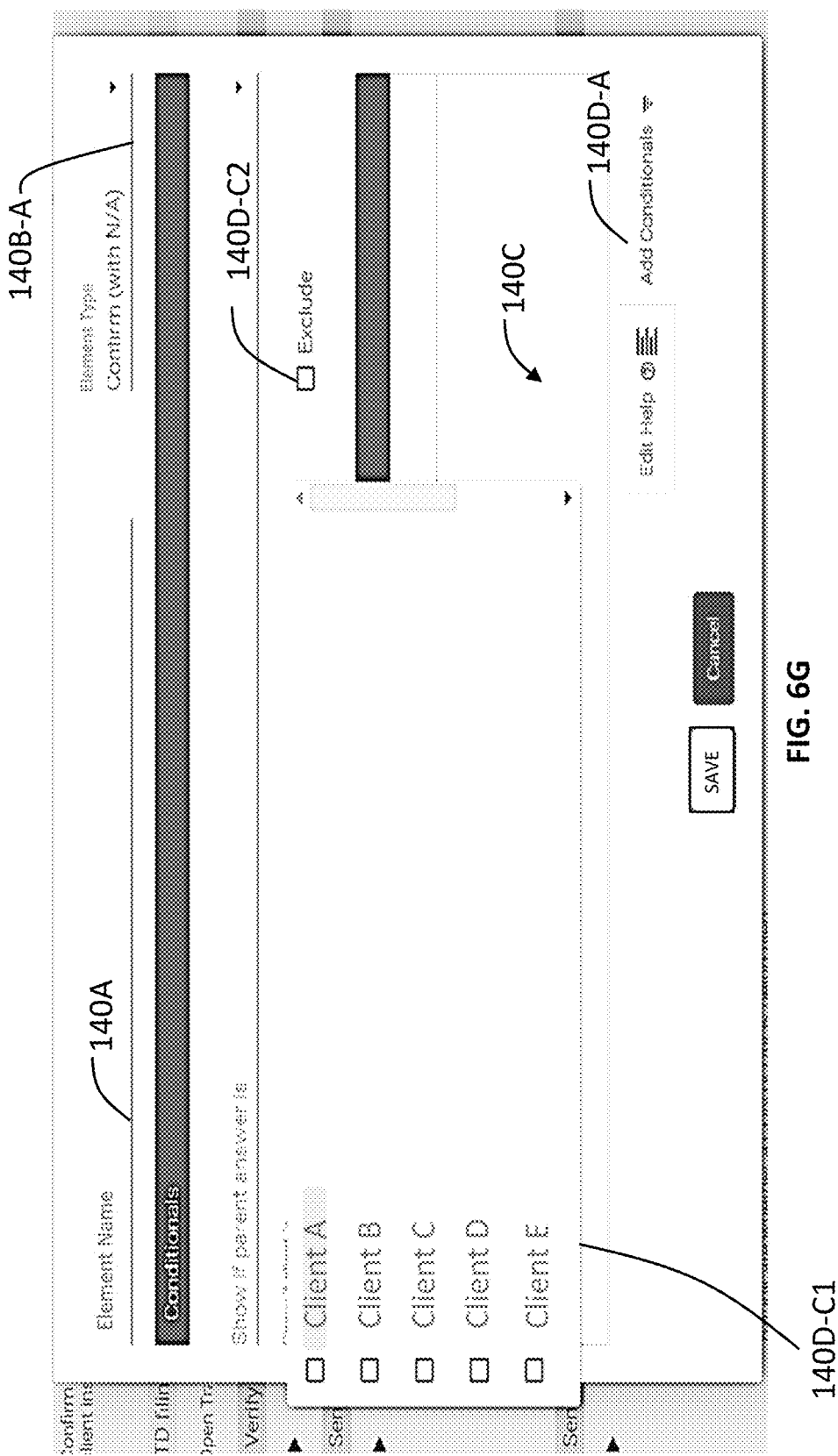

FIG. 6E depicts options for establishing a conditional sub-schema element. For example, a sub-schema element can be conditioned on a Yes or No response of a parent schema 140D-B0, which can be established with a Yes or No selection 140D-B1 as shown FIG. 6F. Alternatively, or in combination, sub-schema elements can be conditioned on a client ID 140D-C0, which can be established based on a selection from a client list 140D-C1 as shown in FIG. 6G. Alternatively, by selecting the exclude option 140D-C2, the client list 140D-C1 can be used to identify in the parent schema element which clients to exclude from invoking the sub-schema element.

Figure 6H:
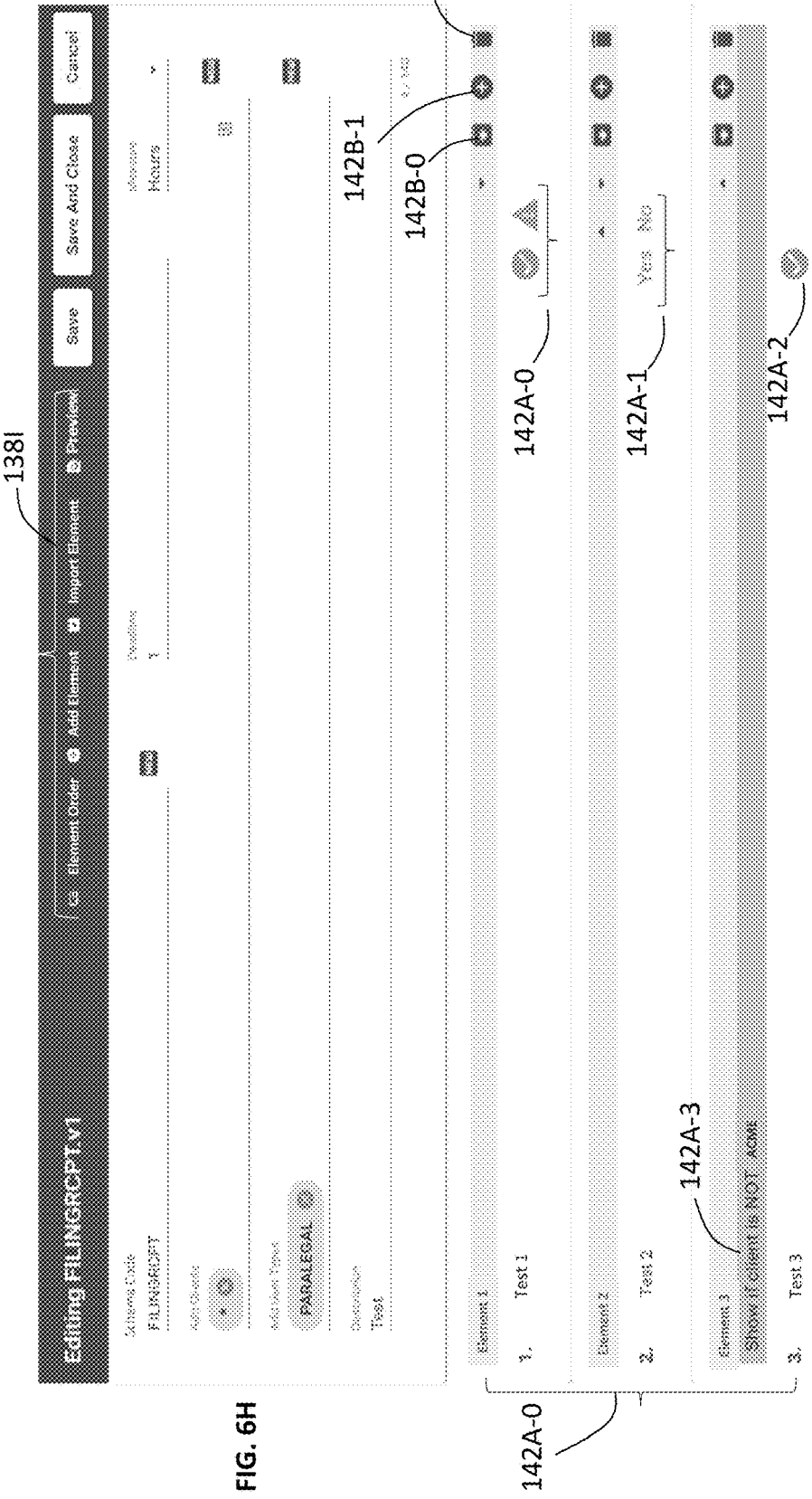
Figure 6I:
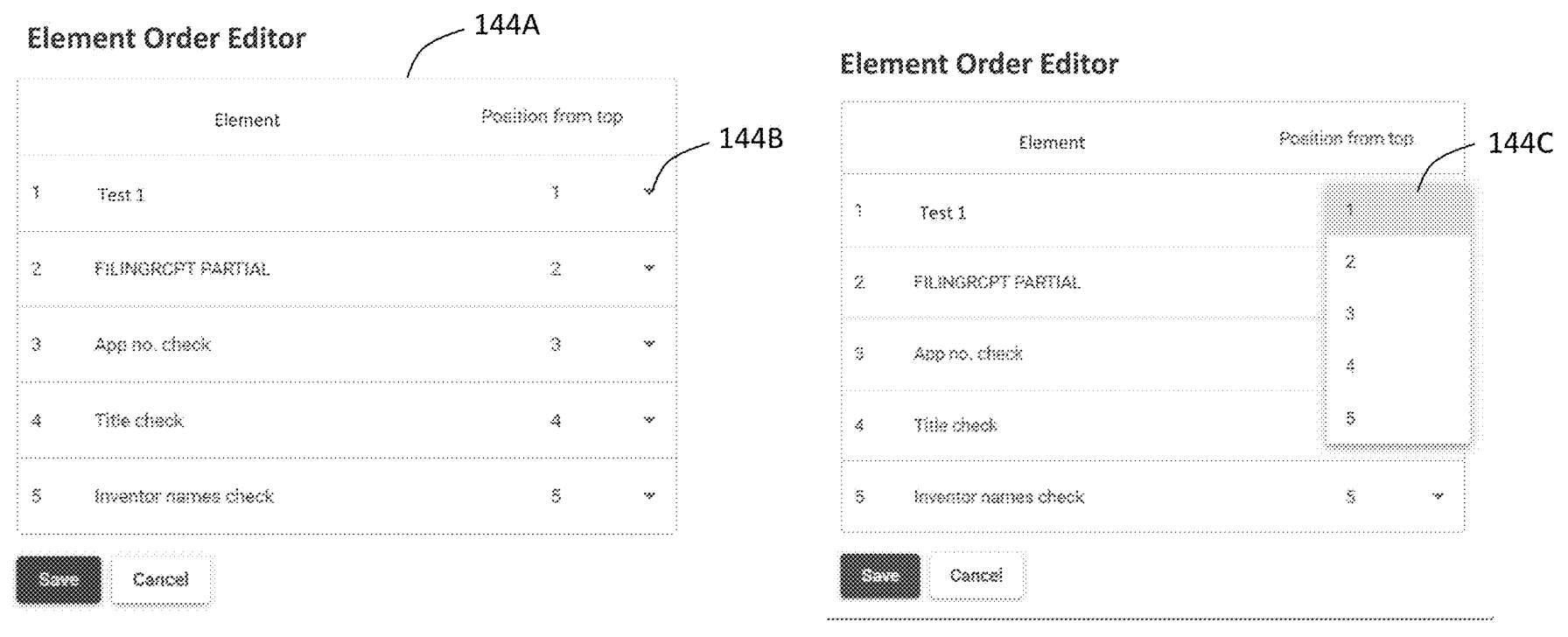

FIG. 6H depicts an illustration of schema elements 142A-0 that have been created with, for example, the Add Element button. Each schema element can have sub-schema elements (resulting in a parent/child schema hierarchy) which can be created by pressing the "+" button 142B-1. Each schema element can also have its own element type (e.g., 142A-0 confirm/issue, 142A-1 yes/no inquiry, 142A-2 check). Schema element 3 shows an illustration of a schema element (Test 3) that is invoked when matter ID does not correspond to the client name ACME.

The number of sub-schema elements created can be unlimited. When there are too many sub-schema elements to view in the same screen, the schema management system 100 can be configured to generate left and right arrows (not shown in FIG. 6H) to enable horizontal scrolling between sub-schema elements. The trashcan 142B-2 can be selected to delete a parent schema-element or sub-schema element. If the parent schema element is deleted, all associated sub-schema elements of the parent are also deleted. The down arrow 142B-0 can be used to import schema elements from other schemas to enable administrators to reuse schema elements of other schemas. The order of schema elements can be changed by grabbing one of the schema elements 142A-0 with a mouse pointer (holding the left mouse button down) and dragging the schema element to another location in the list. Alternatively, a list 144A of the present order of schema elements can be generated with their by selecting the Element Order button from the section 138I—see FIG. 6I. Schema elements can be reordered in list 144A by selecting a schema element and dragging it to another location in list 144A. Alternatively, a drop-down menu 144B can be selected, which provides an order list with the present order highlighted. Selecting a different order number changes the position number of the schema element.

Figure 7A:
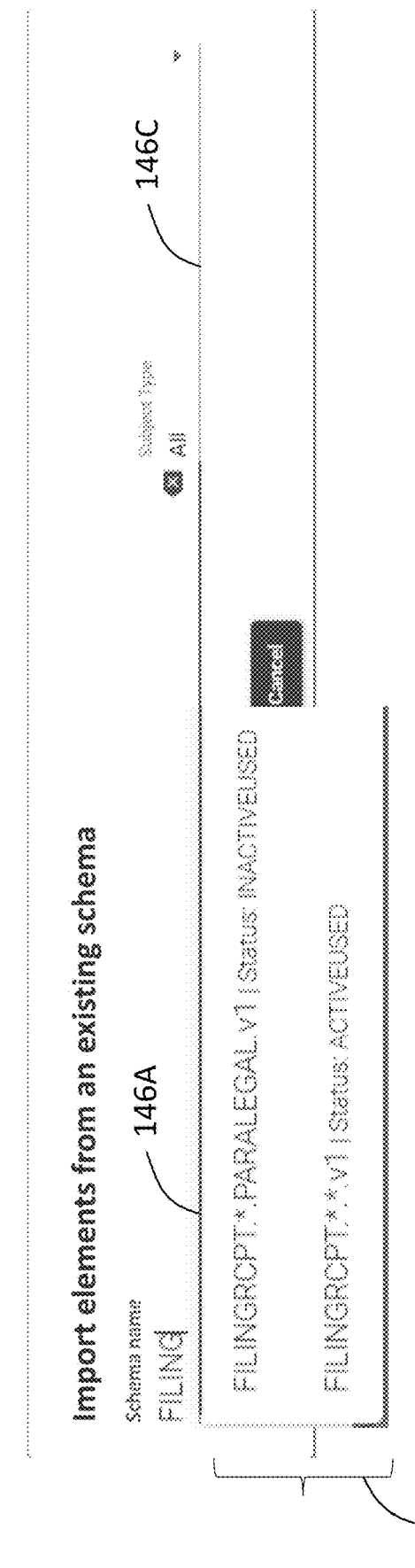
Figure 7B:
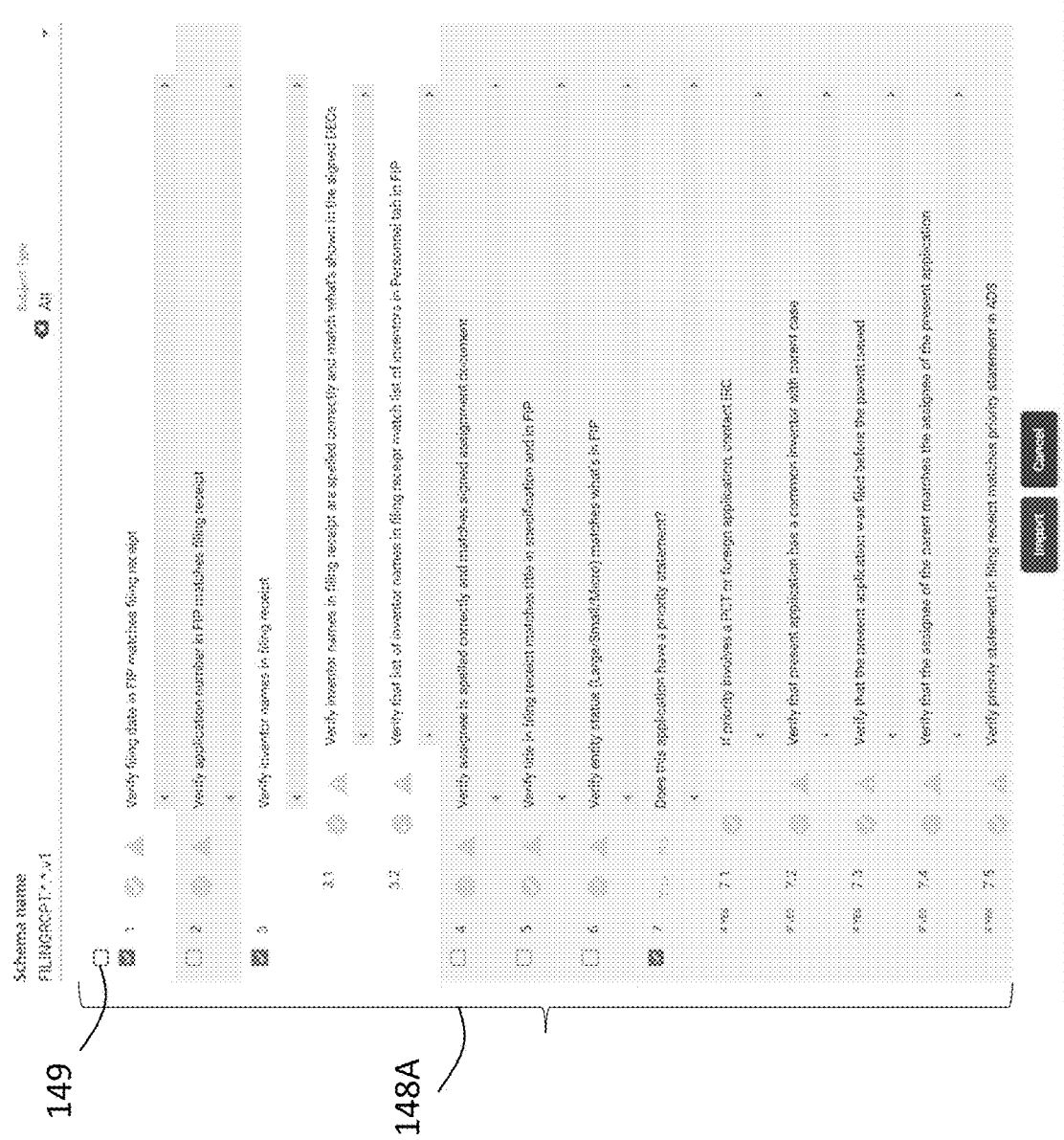
Figure 7C:
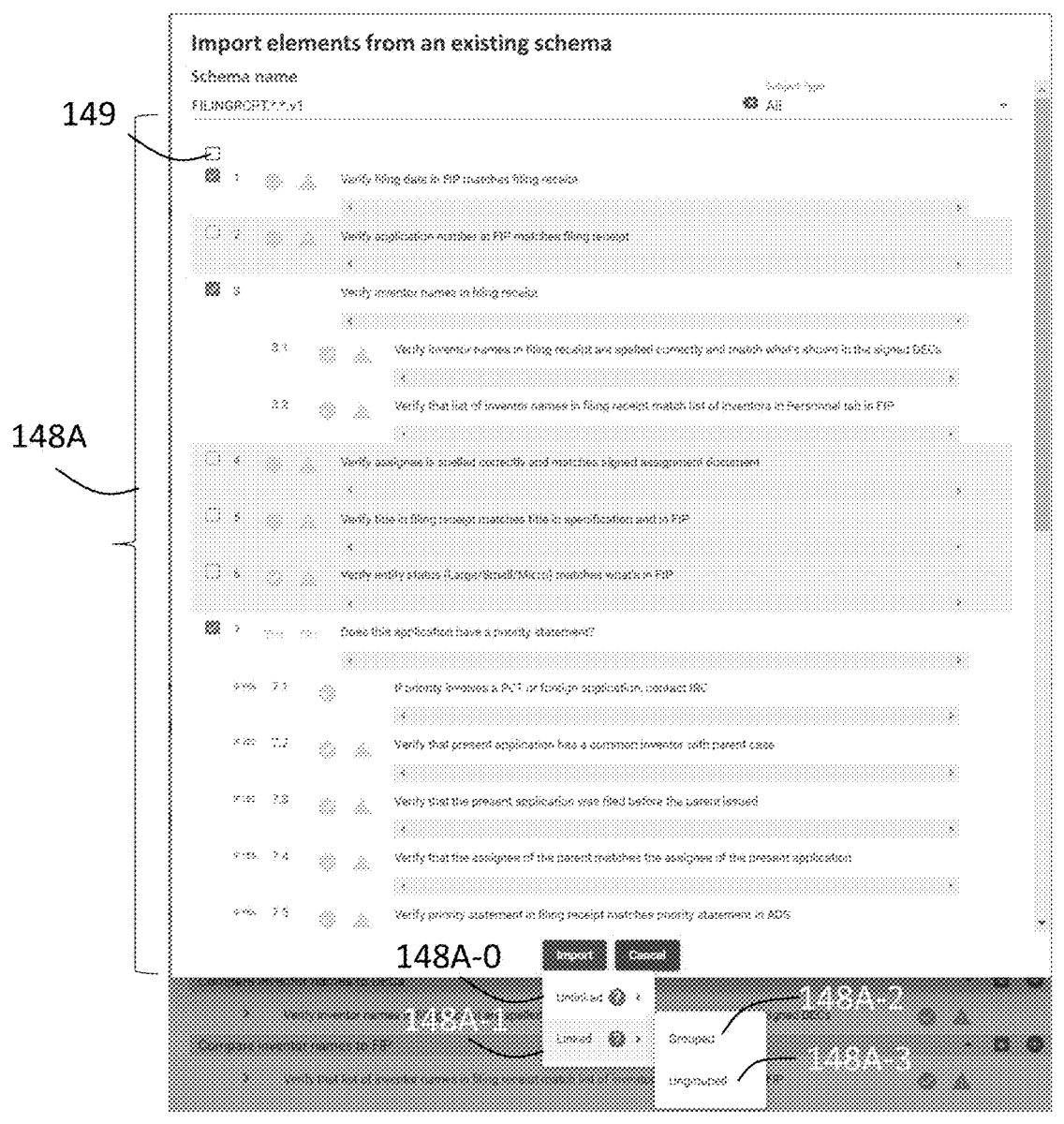

FIGS. 7A-7C depict various UIs for importing schema elements from other schemas to a schema under development. This feature provides an administrator an opportunity for reuse schema elements, which in turn can help expedite the development of a new schema. The import feature also enables the administrator to create nested schemas. To achieve nested schemas, schema elements can be imported as linked schema elements from other schemas. A linked schema element signifies that the schema element remains linked to the schema ID of the source schema. For instance, a schema element imported from a schema with ID ADS into a new schema with ID OAR can be imported as a linked schema element. The schema management system 100 maintains a record that the imported schema element is linked to schema ID ADS. As will be described later, the linkage can be used for issue tracking among schemas.

It will be appreciated that schema elements from other schemas can also be imported into a new schema without linkage. In this embodiment, the imported schema elements are independent of the source schema. Consequently, issue tracking for the imported schema elements remains solely a part of the new schema.

FIG. 7A depicts a UI launched upon selecting the Import Element button in section 138I of FIG. 6H, or upon selecting the down arrow 142B-0 of a specific schema element. In this UI, the administrator can enter (in whole or partially) a schema ID 146B to invoke a dropdown menu 146B for selecting from one or more schemas from which schema elements can be imported. For example, in FIG. 7B, the user selected the schema FILINGRCPT.*.*.v1. The two instances of "*" represent that the schema applies to all clients and all user types. The administrator can select all schema elements by checking off the top checkbox 149, some schema elements by checking off individual schema elements as shown in FIG. 7B, or a single schema element to import into the new schema. Once the selection is completed, the administrator can select the import button at the bottom, which launches options for selecting Unlinked 148A-0 or Linked 148A-1, and Grouped 148A-2 or Ungrouped 148A-3.

As noted earlier, importing one or more schema elements as unlinked elements means that the administrator is copying one or more schema elements from another schema without any logical link to the schema from which the schema is being copied. Importing unlinked schema elements is equivalent to a copy/paste process for adding schema elements in a quick and efficient manner. When the Grouped button 148A-2 is selected, it enables the administrator to create a single button 148B-1 in the new schema for applying multiple schema elements—see FIG. 7D. By default the schema management system 100 names the new button 148B-1 the same as schema ID from which the schema elements were imported (in this example, FILINGRCPT). The administrator, however, can rename the grouped button 148B-1 if desired. When a user requests the new schema, the user only sees the grouped button 148B-1 without being able to view the individual schema elements 148B-2. In the administrator view of FIG. 7D, the administrator is shown the individual schema elements of the grouped button 148B-1 to provide the convenience of being to edit the imported schema elements. When the grouped button 148B-1 is pressed by a user after requesting the new schema, a UI is launched that lists the schema elements associated with grouped button 148B-1 that were previously hidden. For illustration purposes, this UI will be referred to as a child schema UI. The child schema UI is superimposed on the UI of the parent schema from which the UI was launched after depressing the grouped button 148B-1. Grouped buttons such as 148B-1 can be very useful for creating logical groupings between schema elements and simplifying the layout of a schema. When the Ungrouped button is selected, the imported schema elements are added without any groupings (i.e., each individual schema element is imported without a button).

Importing one or more schema elements as linked elements means that the administrator wishes to maintain a logical linkage between the source schema from which schema element(s) are being imported and the recipient (or new) schema which is receiving the schema elements. Maintaining a linkage can be useful when performing data mining techniques across schema identifiers on a periodic basis (e.g., quarterly or monthly reports on the number of issues reported for schema identifier XYZ). When the Grouped button 148A-2 is selected, it enables the administrator to create a single button 148B-2 for grouping multiple schema elements. As noted earlier, the administrator can use the default button name or create a new name. When the Ungrouped button 148A-3 is selected, the imported schema elements are added without any groupings (i.e., each individual schema is imported without a button). A link symbol 148B-0 is placed next to the grouped button 148B-1 and across all linked schema elements to indicate to the administrator that the imported schema elements are linked to the source schema.

Figure 7D:
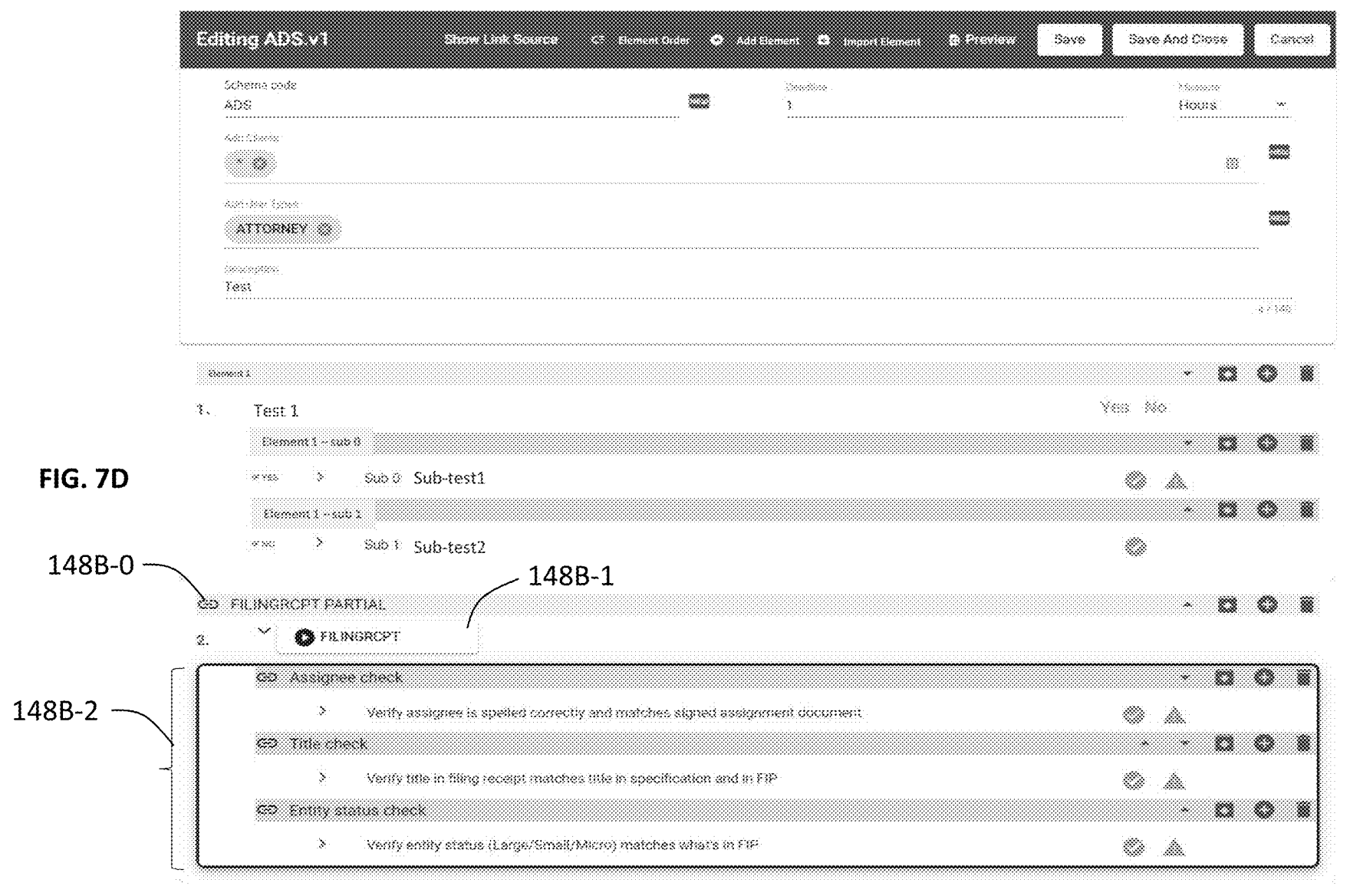

In the illustration of FIG. 7D, the imported schema elements are linked to the source schema ID FILINGRCPT. The administrator can edit the content of the schema elements or change their order without removing the logical linkage to the source schema FILINGRCPT. Moreover, the administrator is not required to import all schema elements of the source schema. This provides administrators flexibility as to how they can import linked schema elements.

Linking schema elements to other schemas enables an administrator to nest complete or partial schemas within a schema. It will be appreciated that within a linked schema 148B-0, schema elements from yet other schemas can be imported. In this embodiment, nested schemas can be hierarchically structured within a single schema.

Figure 8A:
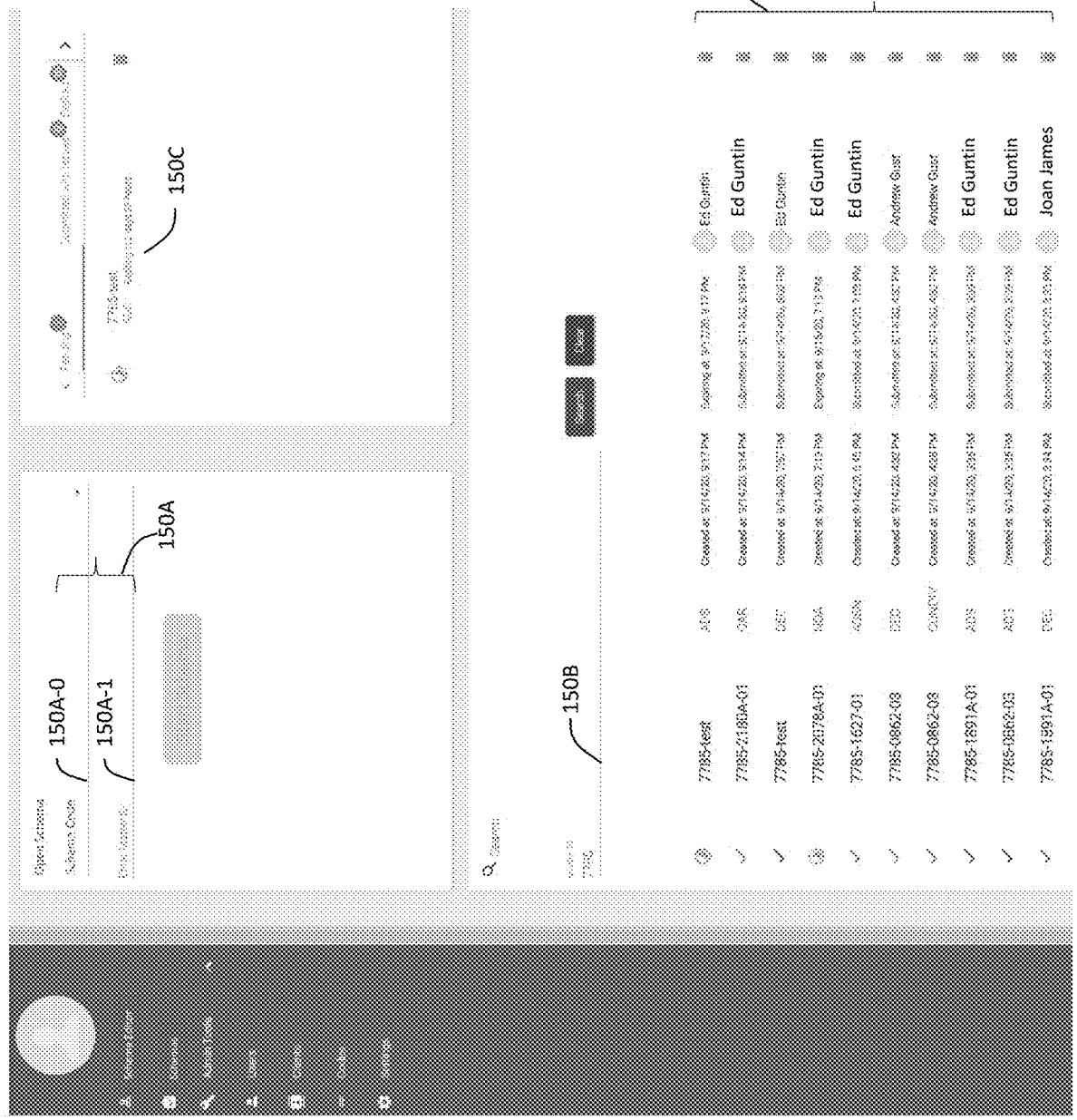
Figure 8B:
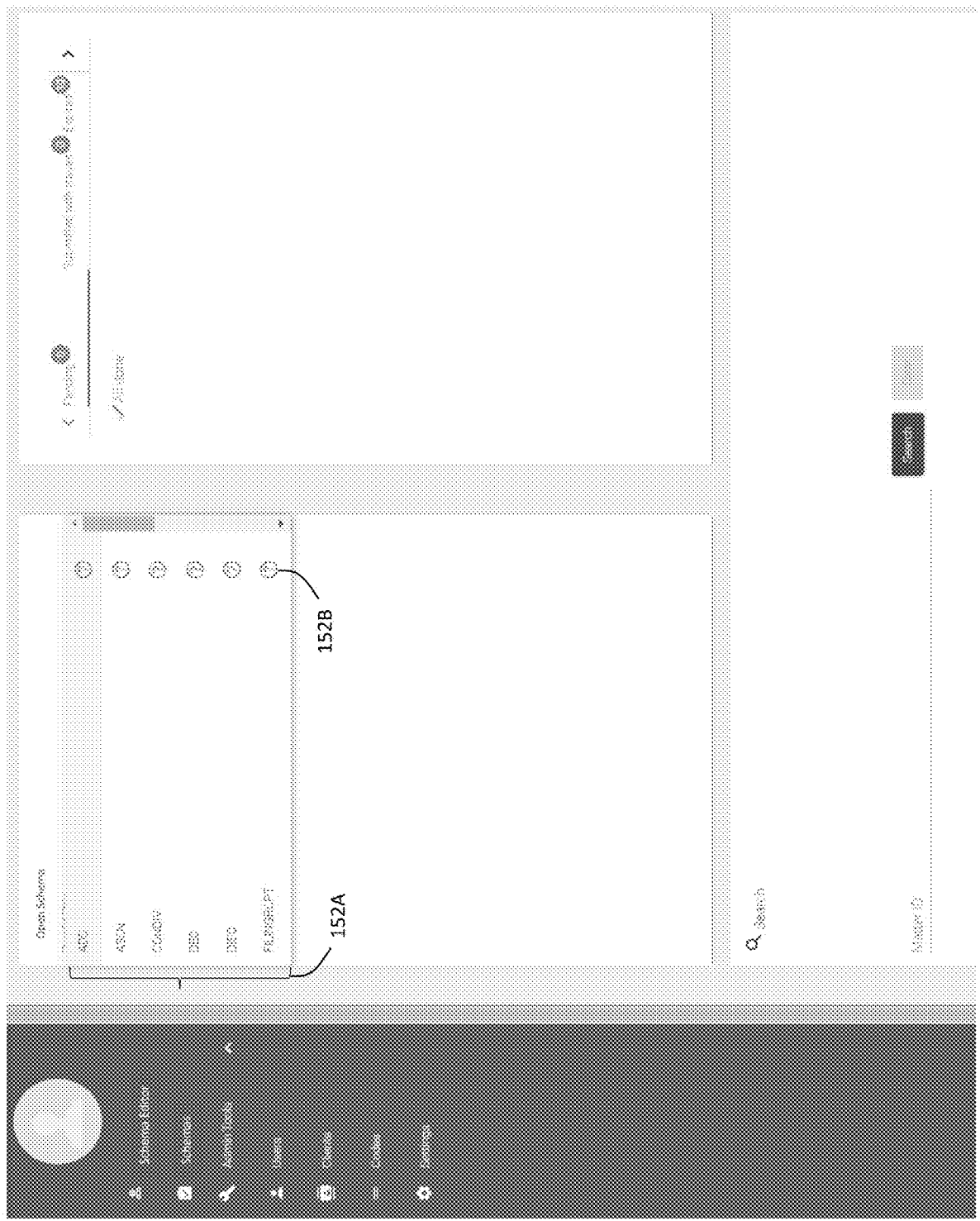

FIG. 8A depicts a user interface for requesting a schema 150A, searching for schemas 150B, and viewing the pendency of a user's schemas 150C. To search for one's own or other user's schemas, the user can enter a matter ID (in whole or in part) in the search field 150B and select the search button which in turn generates search results 150D. The user can see the pendency 150C of a schema that is incomplete with an expiration date. To request a new schema, a user selects a schema identifier 150A-0 from the dropdown menu 152A as shown in FIG. 8B. If the user is unsure of the purpose of a schema, the user can select a question mark icon 152B, which can present textual and/or video assistance that explains the purpose of the schema and/or its proper use. Upon selecting a schema identifier from the dropdown menu 152A, the user then needs to enter a matter ID 150A-1, which is composed of a client ID combined with an instance (e.g., XY1-0001, first instance of client ID XY1). To initiate the schema, the user presses the Start Schema button.

Since schema identifiers can be linked to a specific user type, and/or one or more client IDs, the same schema identifier can be used multiple times by users of differing user types and across differing clients. For example, an administrator can choose to create a schema using schema identifier ADS which is linked to user type "Attorney". The administrator can also choose to create another schema using schema identifier ADS which is linked to user type "Paralegal". The attorney ADS schema can include any number of schema elements which can differ from the schema elements of the paralegal ADS schema. Similarly, the administrator can choose to link the attorney ADS schema to specific clients (e.g., client A, client B), while linking the paralegal ADS schema to other clients (e.g., client D and client E). Any number of permutations and combinations of schema identifier, user type and/or client(s) can be created for each schema.

To the user, these combinations can be kept hidden when selecting a schema identifier. When the user logs into the schema management system 100, the system knows from the user list depicted earlier in FIG. 1A a user type of the user logging in. Consequently, when the user enters the combination of a specific schema ID and matter ID, the schema management system 100 knows the user type of the user from the login information. The combination of the user type, the schema ID provided, and the client ID (obtained from the matter ID) enables the schema management system 100 to select a specific schema that applies to this combination. This simplification significantly benefits the user since all the user needs to provide is a schema ID and matter ID to obtain a specific schema. Keeping the permutations and combinations of schemas (based on combinations of user type, schema ID and client ID) hidden from users substantially improves the user experience across all user types and all clients to which schemas can be applied. Furthermore, this method enables the reuse of schema IDs across all combinations, thereby substantially reducing the number of schema IDs users need to know for various applications of the schema management system 100.

For example, suppose there are 10 clients, 3 user types, and 10 schema IDs. This could result in 300 unique combinations (100 per user type)—assuming an administrator makes all schemas unique by client and user type. With the aforementioned embodiments in which the schema management system 100 automatically determines client ID and user types, the user would only need to select from 10 schema IDs, while without this embodiment, the user would be required to select from 100 possible schema ID and client ID combinations. Such a reduction in volume substantially simplifies the user experience when users request a schema.

Figure 8C:
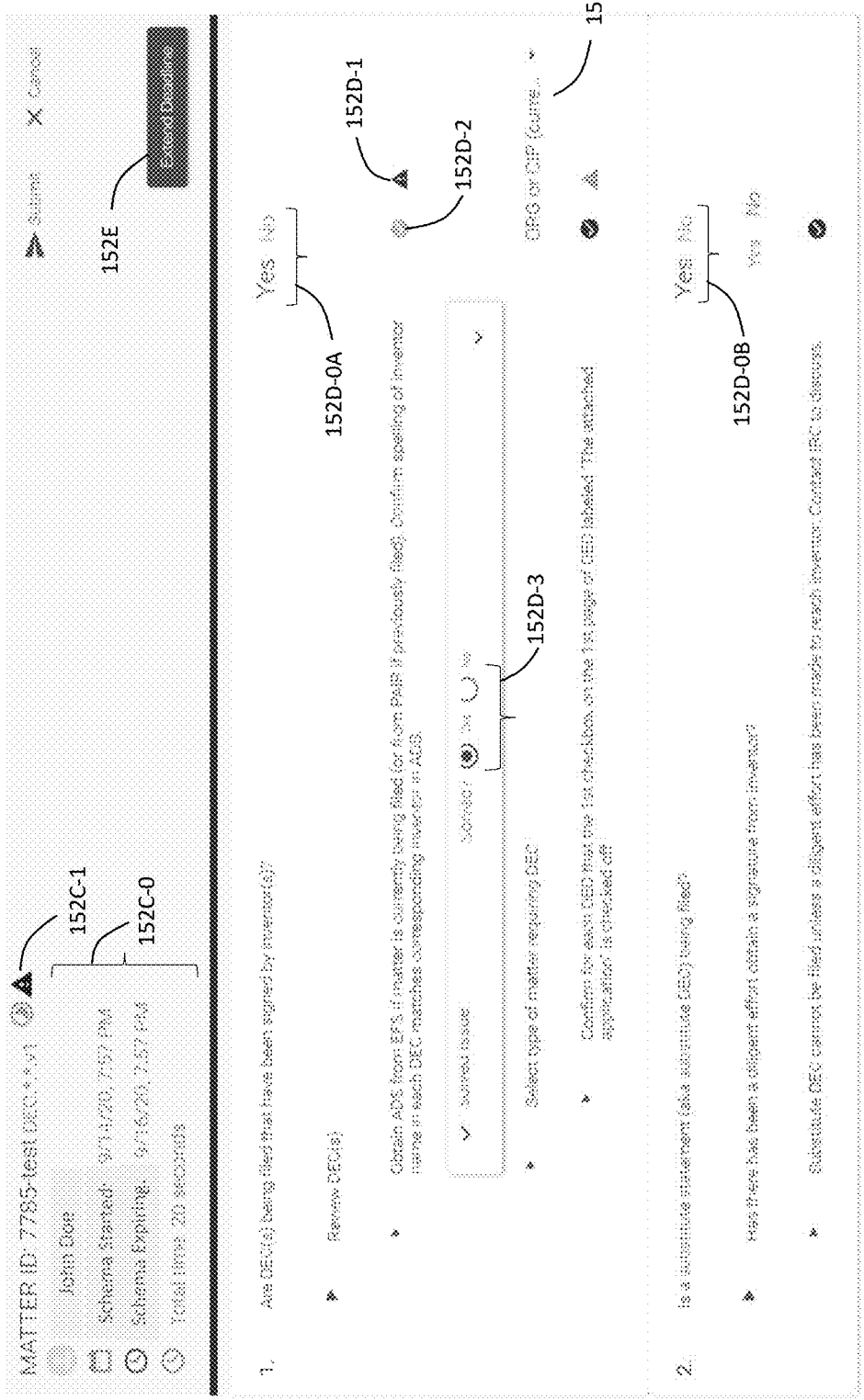
Figure 8E:
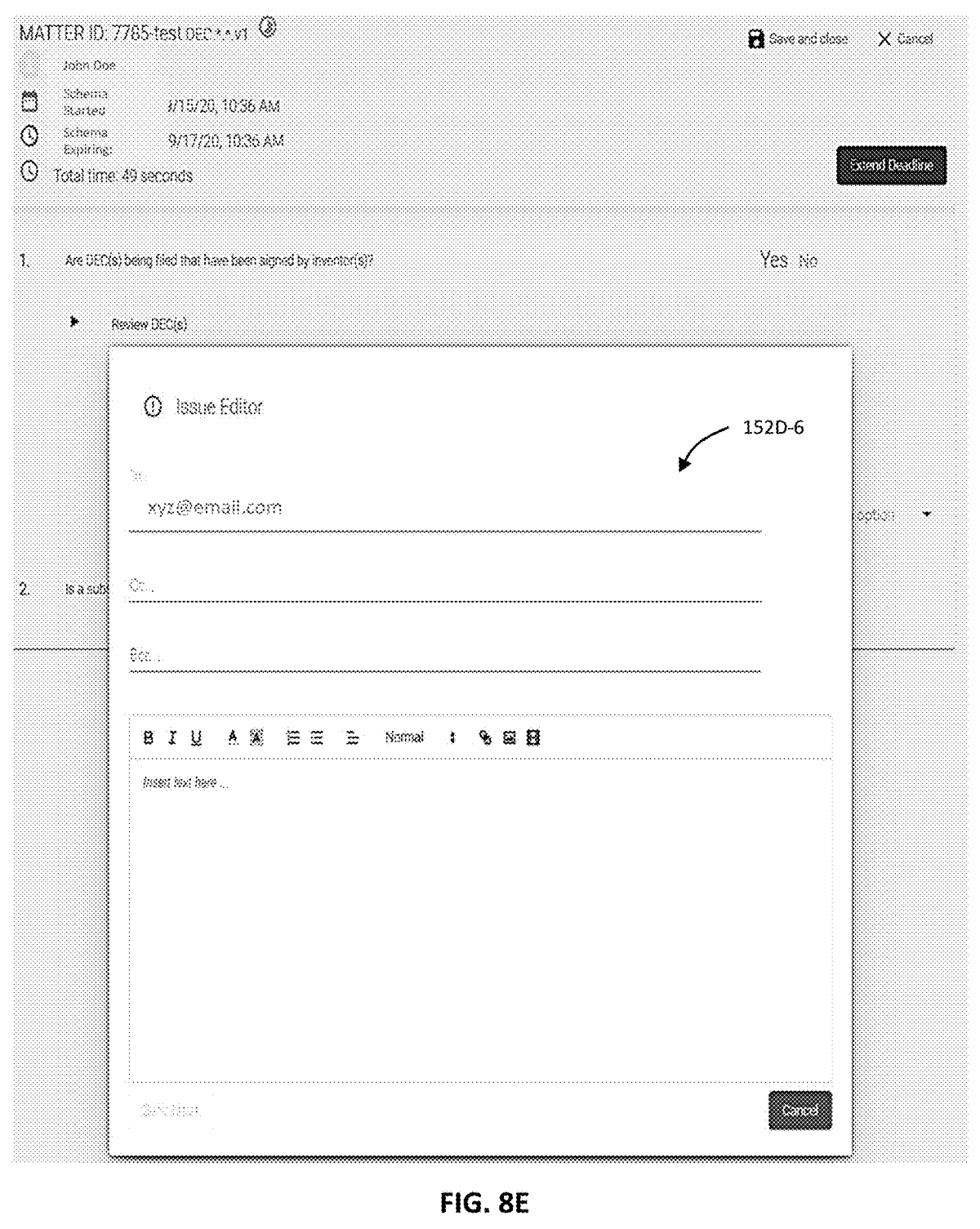
Figure 8F:
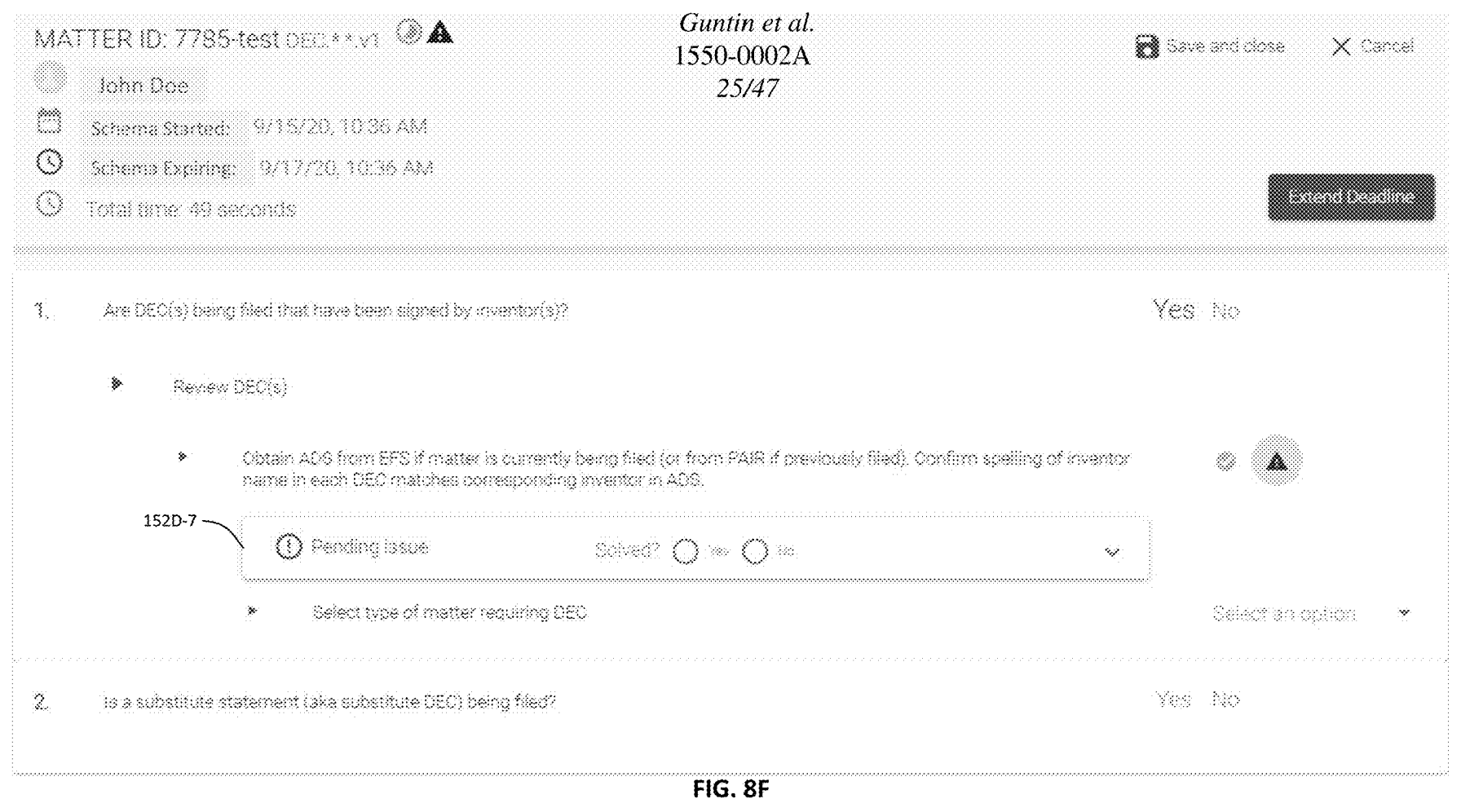
Figure 8G:
Figure 8H:
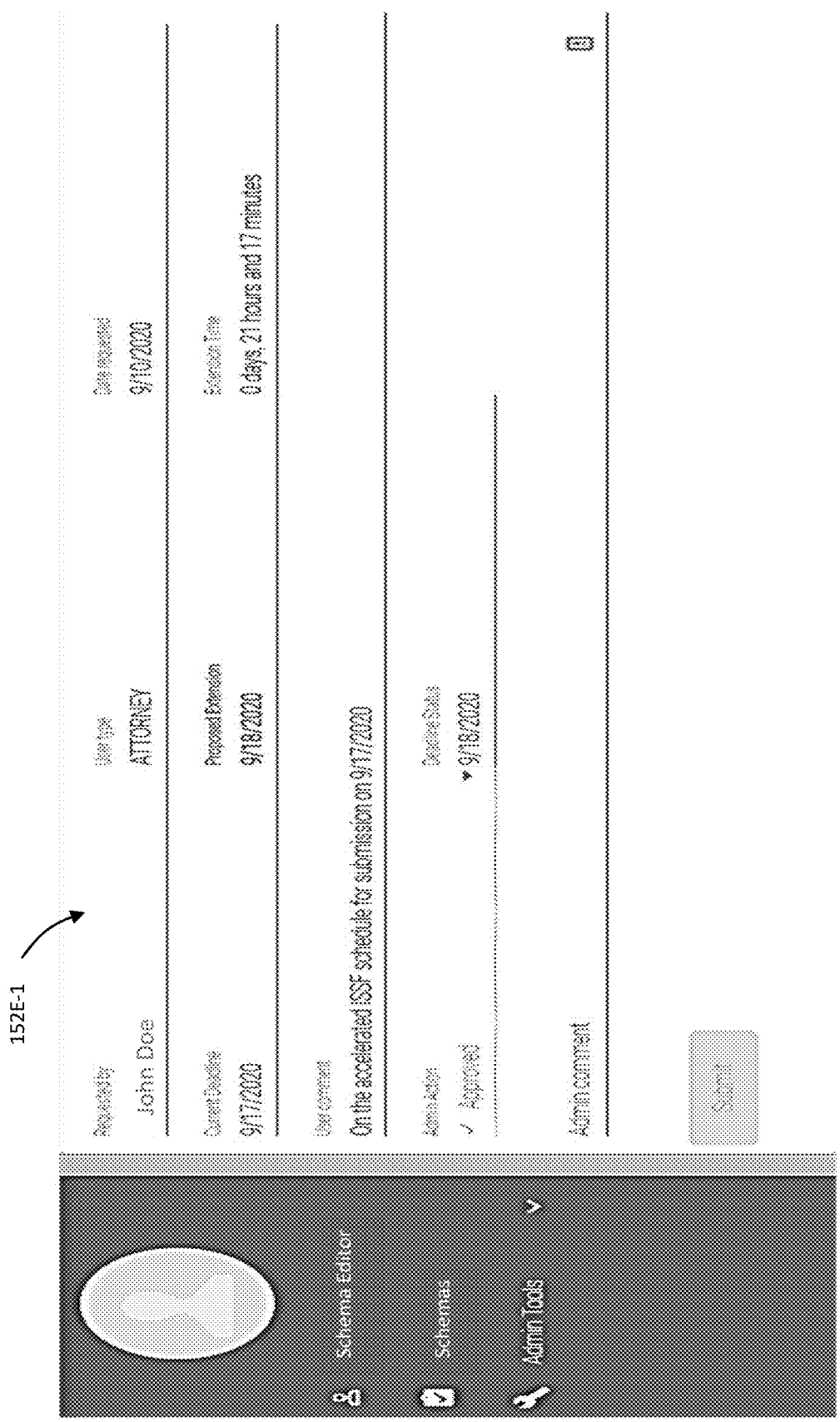

FIG. 8C depicts schema (DEC.*.*.v1) being applied to matter ID 7785-test. Once a schema is invoked, it is given a start date/time and an expiration date/time—see 152C-0. If the user determines s/he needs more time to complete the schema, the user can select the Extend Deadline button 152E, which generates the UI 152E-0 in FIG. 8G. In this screen, the user can select an extension date, and enter a comment as to why an extension is being requested. Upon submitting the extension request, the administrator can receive an email with a hyperlink button (or other suitable means of communication). Selecting the hyperlink button produces the UI 152E-1 in FIG. 8H. In this screen, the administrator sees who is requesting the extension, the user type, the extension date proposed, the extension time, and reasons for the request. The administrator can approve, reject, or adjust the proposed extension date. Once an administrator selects a response and submits it, the user receives an email or other suitable notification indicating the response of the administrator, which can be viewed via the schema management system 100. Setting time limits on schemas prevents the application of a schema from losing its effectiveness in validating a system and/or process.

Referring back to FIG. 8C, the schema shown depicts two schema elements (1-2) with conditional sub-schema elements 152D-0A and 152D-0B. The schema is labeled DEC.*.*.v1 which indicates that schema identifier DEC applies to all clients, and all user types, and it is a first version (v1) of this schema. The schema identifier (DEC) could have been adapted to be client specific and/or user type specific, which would have possibly lead to a different schema being generated based on the matter ID (which the schema management system 100 maps to a client name) or user type based on who is invoking the schema. Referring to Schema element 1, this schema element is a conditioned on a Yes/No response 152D-0A. In this illustration, the user has selected Yes to the inquiry, which in turn causes the schema management system 100 to present a sub-schema element that matches the "Yes" response. This sub-schema element is for "Obtaining an ADS from EFS . . . ". The sub-schema element has a schema element type of "Confirmation" (refer back to FIG. 6D) with a selectable checkmark 152D-2 (that transitions from gray to green upon selection) if there are no issues, or selectable exclamation mark 152D-1 if the user finds an issue. In the illustration, the user detected an issue, which led the user to choose the exclamation mark 152D-1. Once selected, the exclamation mark icon 152-D-1 transitions from being grey to red. This in turn generates the UI shown in FIG. 8D, where the user is given the option to launch a memorandum that can be emailed 152D-4 or memorandum only 152D-5 for internal record only.

In this illustration, the user chose the memo & email option which launches the UI 152D-6 shown in FIG. 8E. In UI 152D-6, the "To . . . " field is automatically populated with the default email selected by the administrator in the settings section (see FIG. 4). The user can also choose to cc or blind copy (bcc) others. The user can enter via text any description of the issue. The user can also take screen shots of the issue and paste the image alongside the text description or as an attached file. Once these fields are populated, the user can select the Send Issue button which records the memo in the schema management system 100, and sends an email to xyz@email.com (and others if provided in the cc/bcc fields) with a link to retrieve the memo. The recipient of the email can select the link to launch the schema management system 100 and thereby view the memo and take appropriate action to resolve the issue.

Upon submitting the email, the user is presented with a Pending issue UI 152D-7 as shown in FIG. 8F. After an attempt is made to resolve the issue, the user can select whether the issue has been resolved in UI 152D-7 by selecting Yes or No. In the illustration of FIG. 8C, the user selected Yes indicating the issue was solved (see 152D3). In the next sub-schema element of FIG. 8C, labeled "Select type of matter requiring DEC", the user is provided a list of options 152D-0C to choose from. The list of options was created by the administrator using the "List" schema element type, which enables the administrator to link specific options to one or more specific schema elements.

Figure 8I:
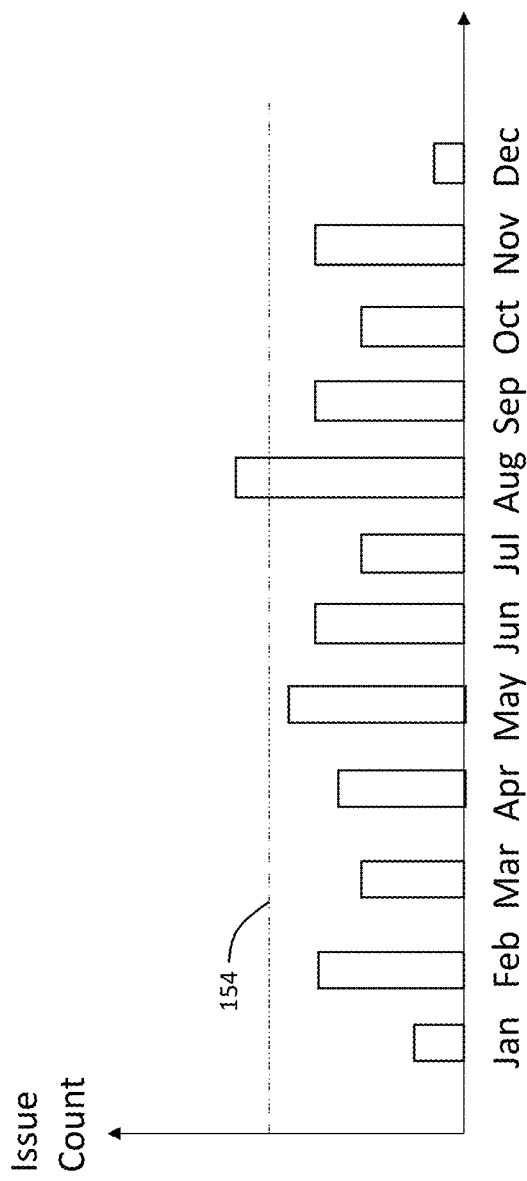

In the foregoing embodiments, the schema management system 100 is adapted to track issues for schema identifiers. An administrator can configure the schema management system 100 to report graphically (e.g., histograms, line graphs, etc.) or numerically issues per schema identifier over certain intervals (e.g., weekly, monthly, semiannually, and/or annually)—see FIG. 8I. FIG. 8I illustrates gross counts of issues per month. An issue count threshold 154 can be set to automatically notify an administrator (by email or other suitable notification) when a particular month exceeds the threshold (e.g., August). The administrator can invoke the schema management system 100 to present the histogram of FIG. 8I. Although not shown, the schema management system 100 can be configured to enable the administrator to request a breakdown by client for the month of August to determine if any particular client stands out. The request could be invoked by selecting the histogram in August via a mouse cursor to provide the requested breakdown. Additionally, the administrator can request a breakdown of the issue count by schema ID. This can provide the administrator further insight whether a specific schema ID is causing a spike in issues.

The aforementioned analysis can provide the administrator insight for changing and/or adapting processes to eliminate and/or reduce the recurring issues. It can also provide the administrator further insight on how one or more schema elements of one or more corresponding schemas should be updated to reduce the issue count. Mitigating recurring issues can significantly improve efficiency and productivity of an enterprise, which in turn can improve profitability and/or reduce liability such as malpractice. The tracking of issues can also be utilized to adjust one or more schema elements based on, for example, a user recommendation in which the user requests additional information associated with a particular schema element that is detected as being problematic. In one embodiment, the recommendation can be based on past recommendations for particular schema elements that were determined to be problematic and whether the requesting of additional information associated with the particular schema elements resulted in improvement of performance of the particular schema elements or schema as a whole.

It will be appreciated that the aforementioned embodiments associated with FIG. 8I can be further enhanced with the use of artificial intelligence and/or machine learning to detect issues before they rise above the threshold 154 and to provide administrators recommendations for improving processes and/or schemas and their corresponding elements.

Regression analysis techniques can also be incorporated into the aforementioned embodiments to perform predictions of future spikes in issues by client, schema ID, or combinations thereof.

Figure 9A:
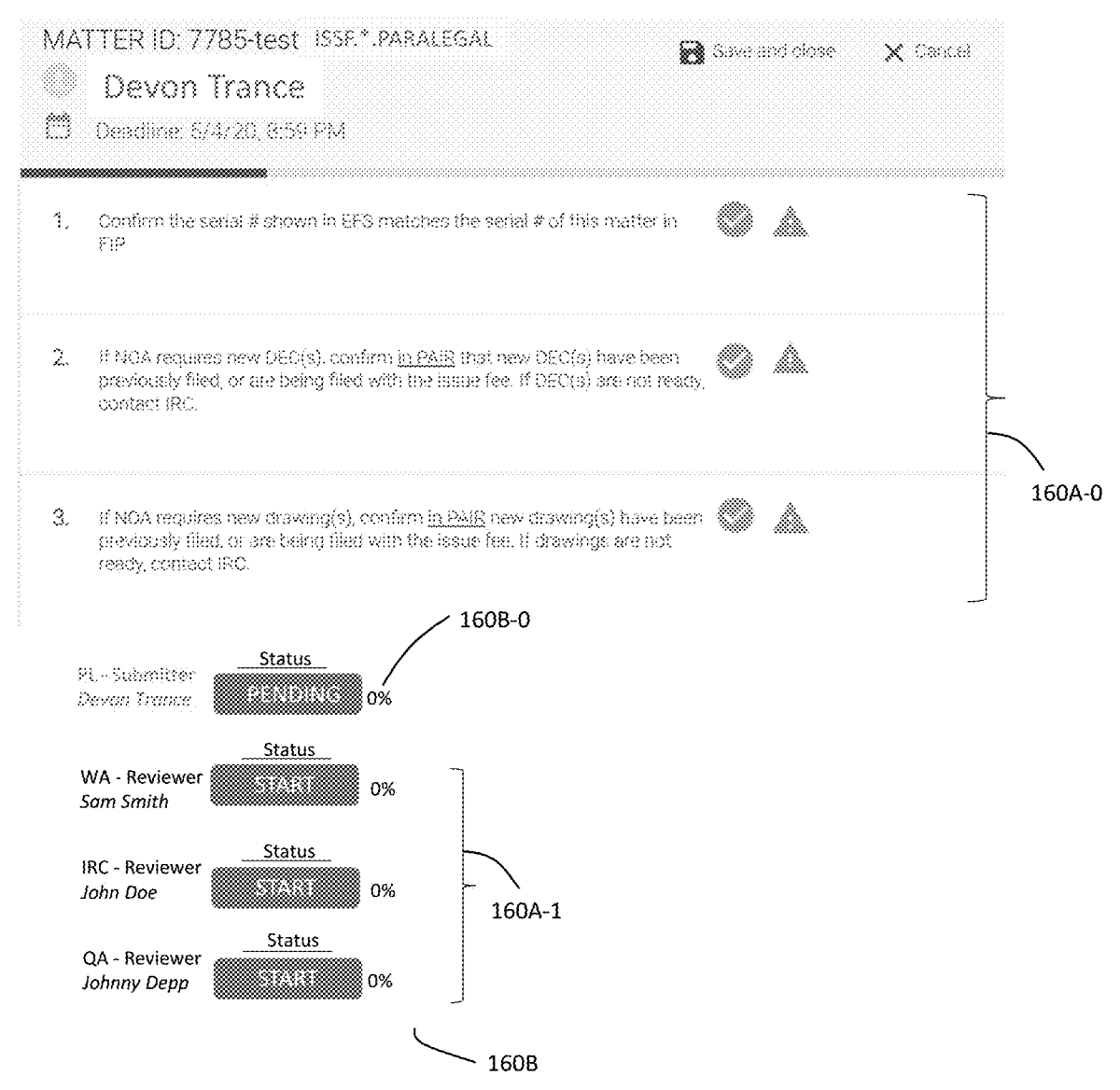

In an interdisciplinary environment, the schema management system 100 can be adapted to generate a multi-user schema structure. In this embodiment, the schema management system 100 can enable an administrator to utilize the Grouped feature (described in FIGS. 7A-7D) for importing schema elements or schemas that can be nested in a single schema and can be individually delegated to more than one user as depicted in FIGS. 9A-9N. The imported schema element may or may not be linked to another schema. Alternatively, the schema management system 100 can be configured to group schema elements created by the administrator into a single grouped button as shown in FIG. 7D. This procedure can be applied for each schema button that would be delegated to a user other than a primary user of the single schema.

As will be discussed below, the administrator can delegate one of the nested schemas to a specific user listed in the active user list shown in FIG. 1A. Alternatively, the administrator can delegate the schema to a user type (e.g., PARALEGAL, ATTORNEY, etc.) without specifically identifying an active user. In this latter embodiment, it is the responsibility of a primary user of the schema to choose from a list of active users that match the user type chosen by the administrator to establish the delegation to a specific active user as will be described below in relation to FIG. 9C. Additionally, as the administrator creates delegable schemas, the administrator can configure the schema management system 100 to require specific actions by a primary user of the schema and/or specific information that must be provided by the primary user to the delegated user prior to requesting that the delegated user perform the schema as will be described in FIG. 9C.

In an embodiment, a primary (or first) user of the multi-user schema is assigned by the administrator the schema elements of section 160A-0. The respective nested schemas assigned (or to be assigned to) active users (other than the primary user) is located in section 160A-1 of a status UI 160B. Status UI 160B also shows the status of the primary user of the schema in relation to all users applying the schema. In the illustration of FIG. 9A, the administrator created the schema ISSF.*.PARALEGAL. The asterisk (*) indicates the schema can be used for any client, while the PARALEGAL designation indicates the schema can only be requested by a primary user of user type PARALEGAL. Although the primary user of the schema must be of user type PARALEGAL, the nested schemas in section 160A-1 can be assigned by the administrator to the same user type, other user types, specific users, or combinations thereof. For example, in the present illustration, the administrator delegates the WA-Reviewer to a user type ATTORNEY and not a specific user, the IRC-Reviewer is delegated to a user type RVW ATTORNEY, and the QA-Reviewer is delegated to a specific active user. Although the user type RVW ATTORNEY is not shown in FIG. 1B, it can be created by the administrator in accordance with the embodiments of the subject disclosure.

Figure 9B:
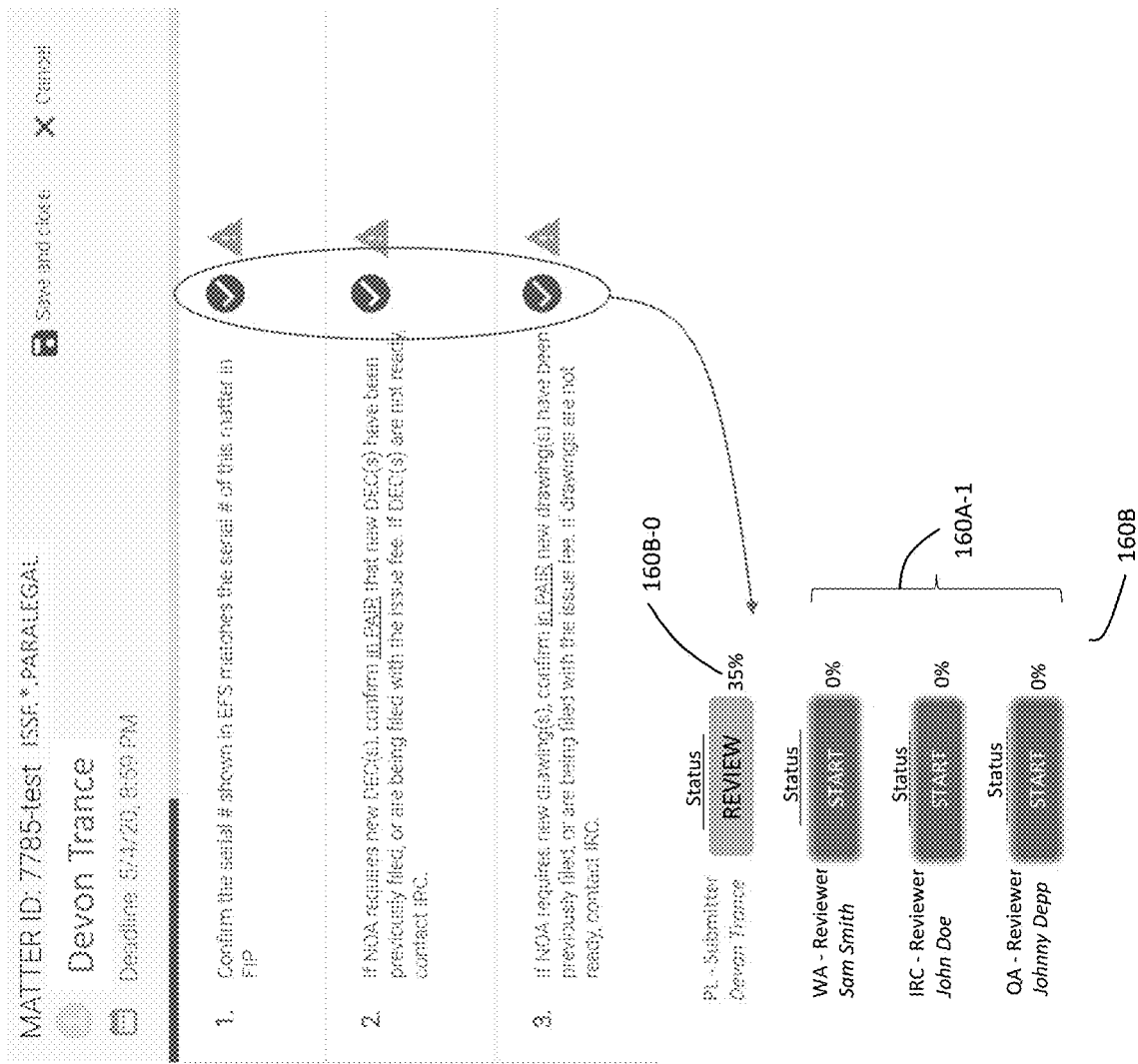

Once the schema of FIG. 9A has been made available to the user community of user type PARALEGAL, a primary user can request the schema. In this illustration, Devon Trance who is of user type PARALEGAL has requested the schema presented in FIG. 9A. The primary user can perform his own schema elements in section 160A-0. While the schema elements in section 160A-0 are pending (i.e., not completed), a percentage of completion 160B-0 for the primary user (Devon Trance) is shown as 0%. Upon the primary user completing the schema elements of section 160A-0, the schema management system 100 changes the status of the primary user from PENDING to REVIEW, updates the percentage of completion 160B-0 for the primary user (e.g., 35%) and enables the "START" button for each of the nested schemas in section 160A-1 by turning them from gray to green color, as shown in FIG. 9B.

Figure 9C:
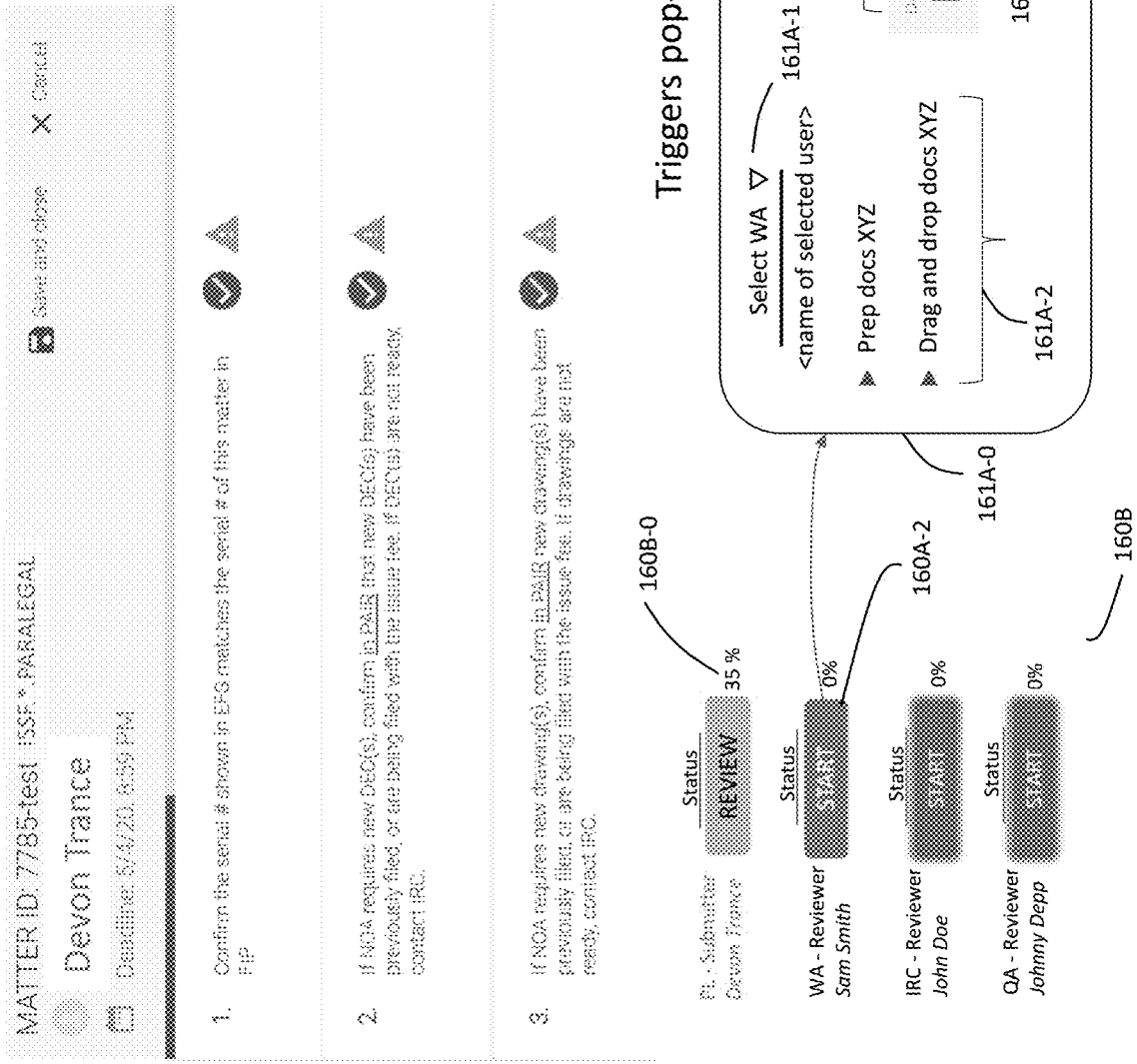

When the administrator delegates a nested schema to a user type rather than an active user, the primary user will be directed to UI 161A-0 to select a person to assign the imported schema from a dropdown menu 161A-1 of active users that match the user type chosen by the administrator— see FIG. 9C. For example, if the user type chosen by the administrator is ATTORNEY, then only active users with this user type will be shown in the dropdown menu 161A-1. The UI 161A-0 further contains actions 161A-2 that need to be performed by the primary user, and information 161A-3 (with an option for comments) that the primary user needs to supply the WA-Reviewer.

Figure 9D:
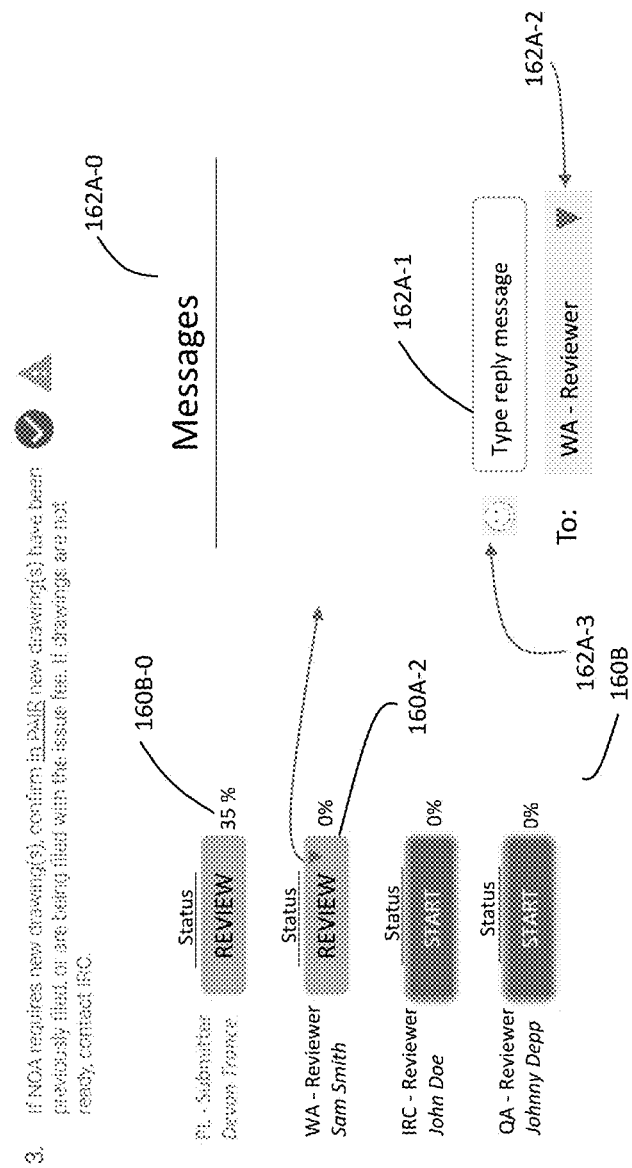
Figure 9F:
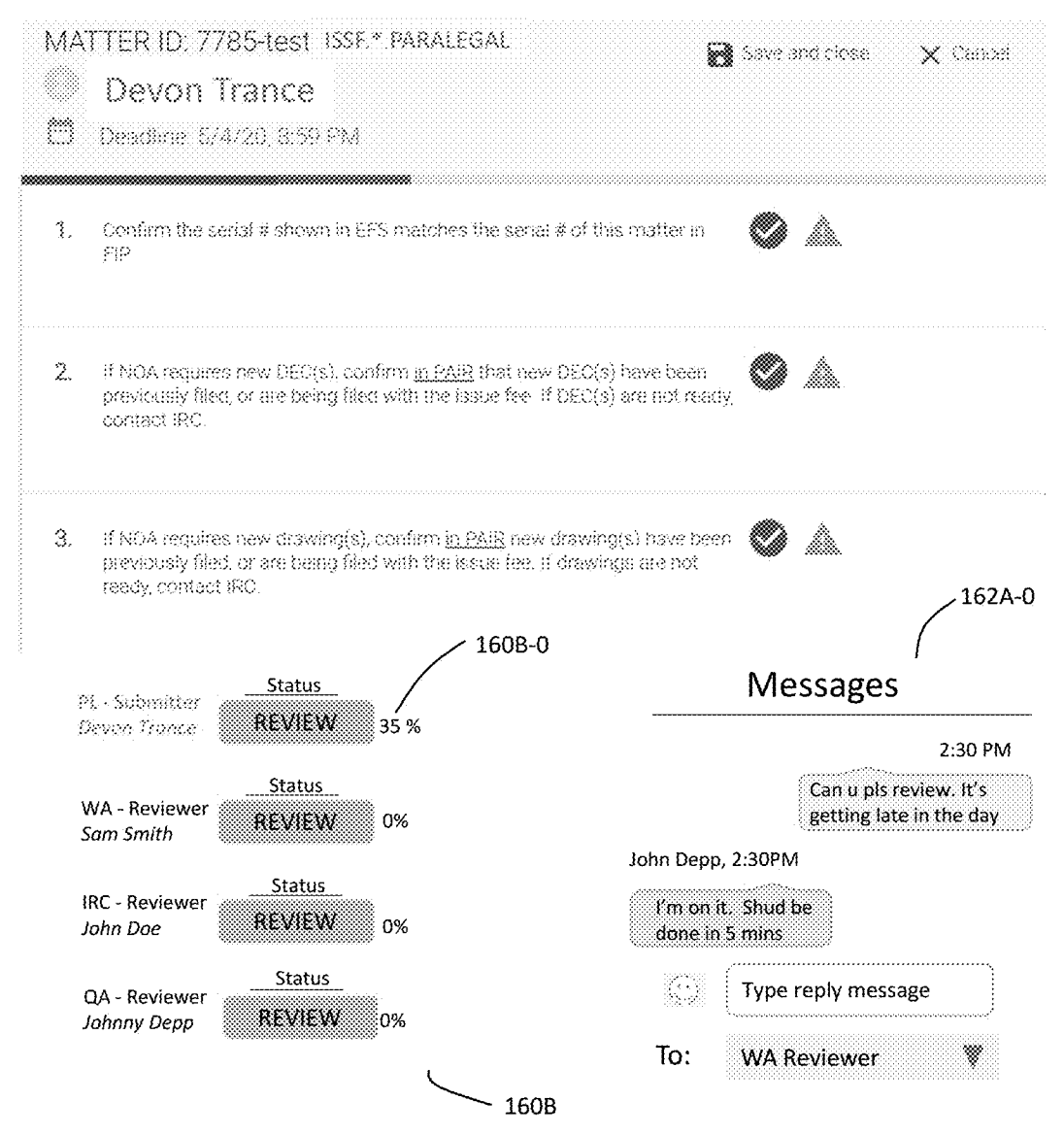
Figure 9G:
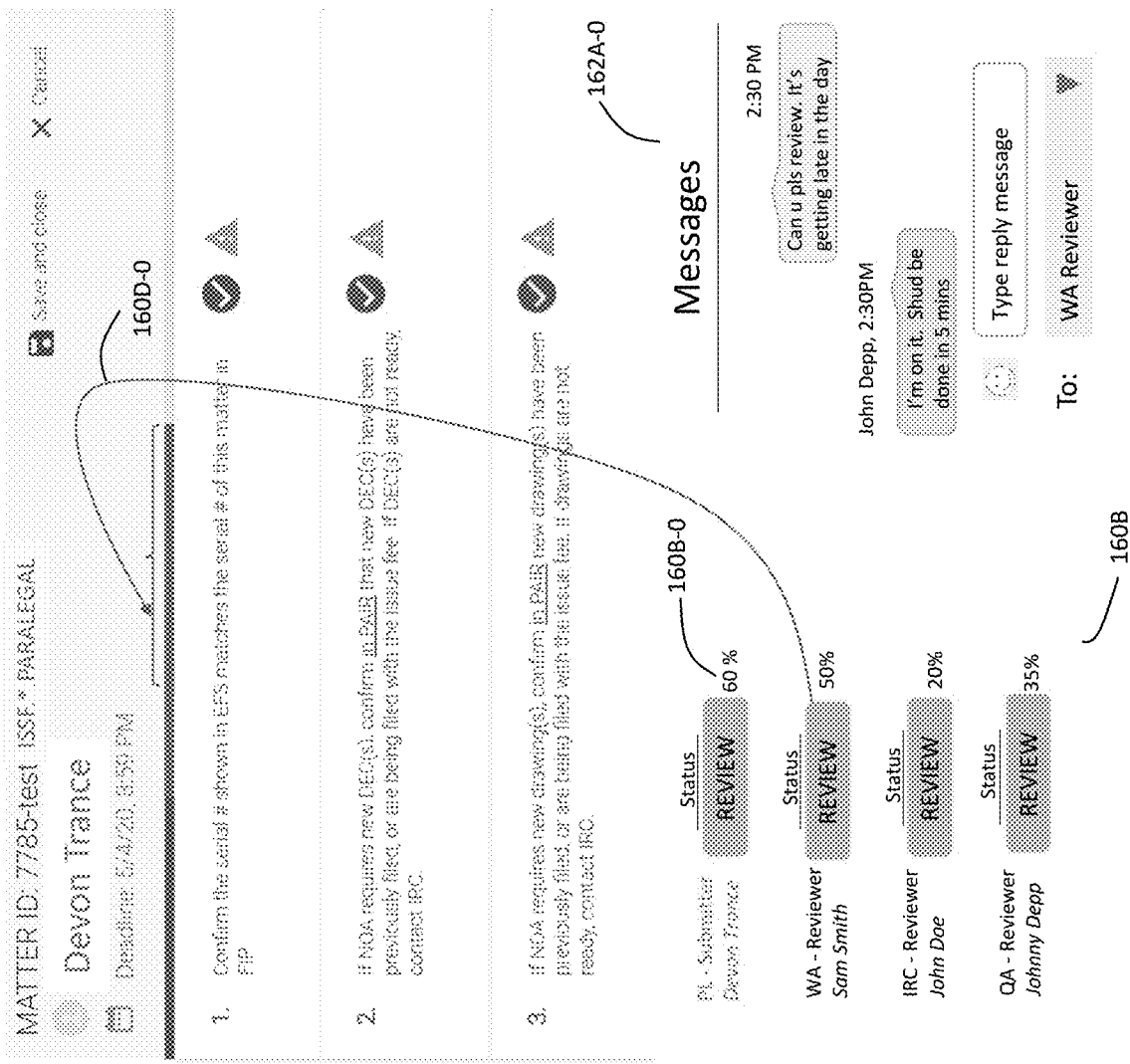

The information can be a file that can be supplied by the primary user via a drag and drop feature or file browser feature. The actions and information must be provided by the primary user before a selected user from the dropdown menu 161A-1 will be notified via an email or other form of suitable communication s/he must process the nested schema assigned thereto. Once the primary user has performed the actions 161A-2, and provided required data 161A-3, the primary user can select the submit button 161A-3, which in turn changes the status for the WA-Reviewer from START to REVIEW and launches a messaging UI 162A-0 as shown in FIG. 9D. Upon the WA-Reviewer starting the schema as prompted by a received communication, the selected WA-Reviewer can obtain from the schema management system 100 the information provided by the primary user and comments if any—see FIG. 9M.

The messaging UI 162A-0 can be used to communicate with the WA-Reviewer via text entry in field 162A-1. It will be appreciated that audio and/or video messaging is also contemplated for the messaging UI 162A-0. In one embodiment, the primary user can communicate with other users by selecting from a dropdown menu 162A-2 a different user, or Everyone involved with the multi-user schema. In another embodiment, the dropdown menu 162A-2 is limited to users in section 160A-1 that have a REVIEW status. The primary user can also provide an emoji 162A-3 as part of the messaging. The primary user can use the messaging UI 162A-0 to send reminders or other suitable communications.

Similar to the process described for the WA-Reviewer, depression of the start button 160C-0 launches a UI 160C-1 (see FIG. 9E), which requires certain actions and/or data depicted by field 160C-2 that needs to be provided to the IRC-Reviewer. Upon completing these tasks, the primary user can select the submit button 160C-3, which causes the greyed out START status to be replaced with a REVIEW status. The schema management system 100 further sends a notification (email or other suitable form of communication) to the IRC-Reviewer to process his/her schema. And as described before, upon invoking the schema, the IRC-Reviewer will be presented with the information provided by the primary user. Suppose in the case of the QA-Reviewer that the administrator chose an active user and further suppose that the primary user is not required to send any information or perform an actions before the QA-Reviewer can be requested to process his/her schema. In this embodiment, the schema management system 100 sends a notification (email or other suitable form of communication) to the QA-Reviewer to process his/her schema and transitions the START status to a REVIEW status without further input from the primary user. The result of all schemas being started is depicted in FIG. 9F. If one the reviewers (e.g., WA Reviewer) is taking too long to initiate the review process, the primary user can message this user via the messaging UI 162A-0 as shown in FIG. 9 to motivate the user to complete his/her schema thereby causing the progress bar 160D-0 to progress further.

It will be appreciated that the status UI 160B and messaging UI 162A-0 can also be presented to the other users, e.g., the WA-Reviewer, IRC-Reviewer and QA-Reviewer, respectively, with the features described above. In this embodiment, all users of the schema can track each other's progress and message each other to achieve an efficient completion of the schema. It will also be appreciated the schema management system 100 can be configured to privatize messaging between users. That is, communications between the primary user and the WA-Reviewer cannot be seen by the IRC-Reviewer or the QA-Reviewer. In another embodiment, the schema management system 100 can be configured to allow all users to view each other's messages. Either of these configurations can be set by the administrator at the time of creating the schema or as a global setting. It will be further appreciated that the administrator can configure the schema management system 100 to purge the contents of messages sent between users via the messaging UI 162A-0 once the schema is finalized. In an embodiment, the schema elements that the nested users of section 160A-1 see along with the messaging UI and status UI 160B is depicted in FIG. 9N.

It will also be appreciated that any of the users of the schema can delegate in whole or in part the schema elements assigned to them to other users. Although not shown, such delegation can be invoked with, for example, a delegation button, which when depressed, provides the user an option to select other active users of the same user type. Once a user is selected, the schema management system 100 can be configured to provide a notification via email (or other suitable communication) to enable the user to complete the schema elements of the delegating user.

Figure 9H:
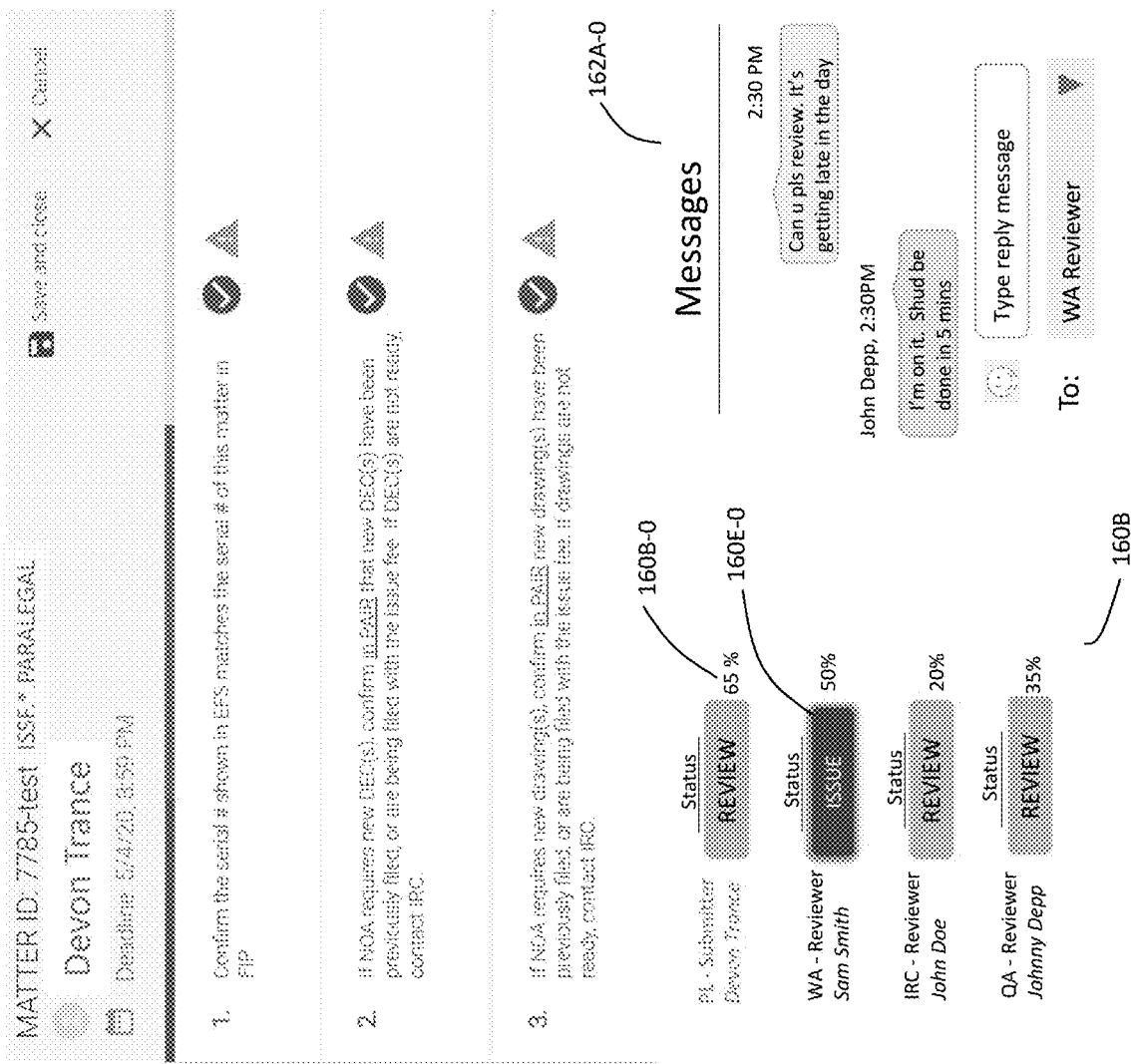
Figure 9I:
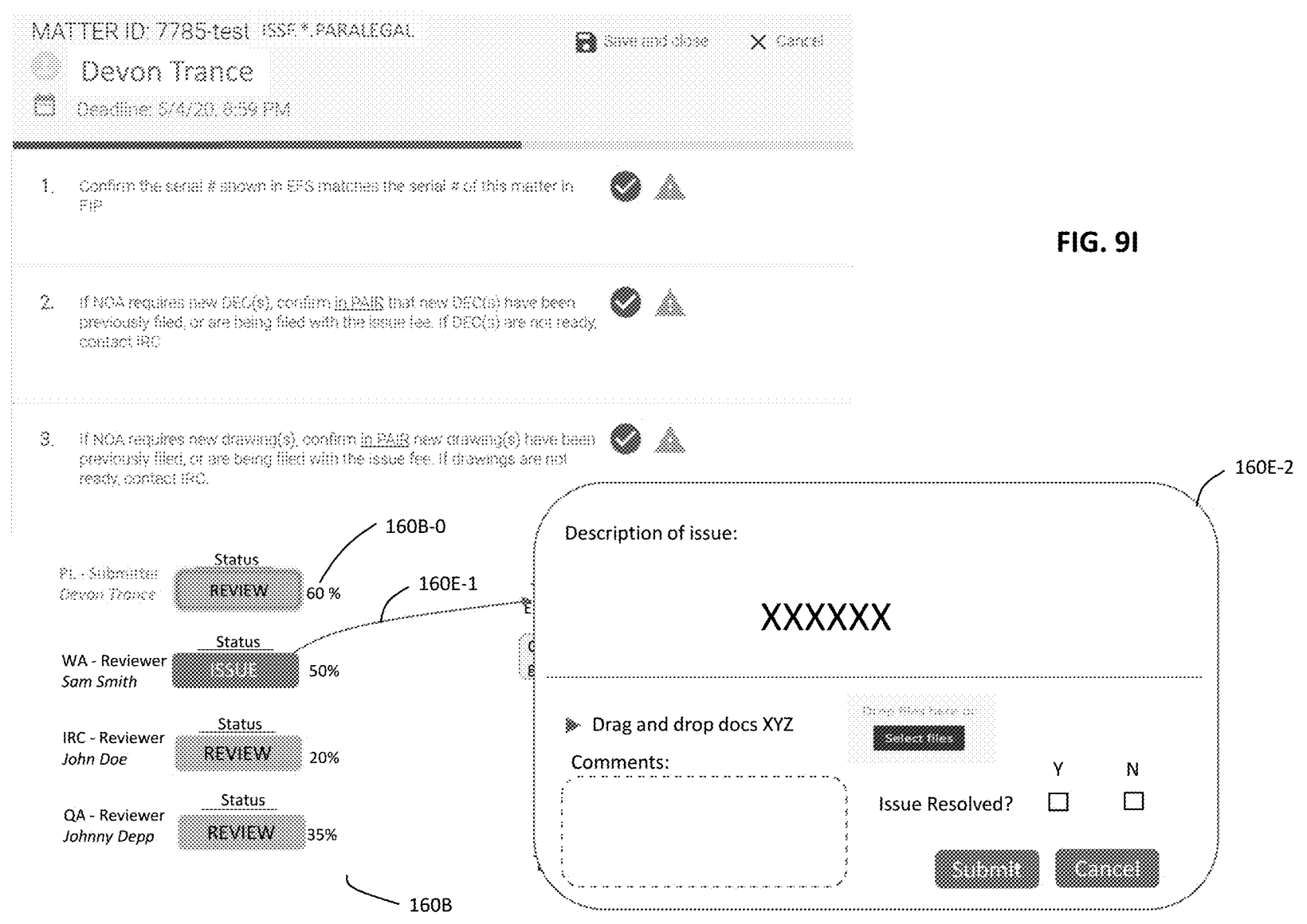
Figure 9J:
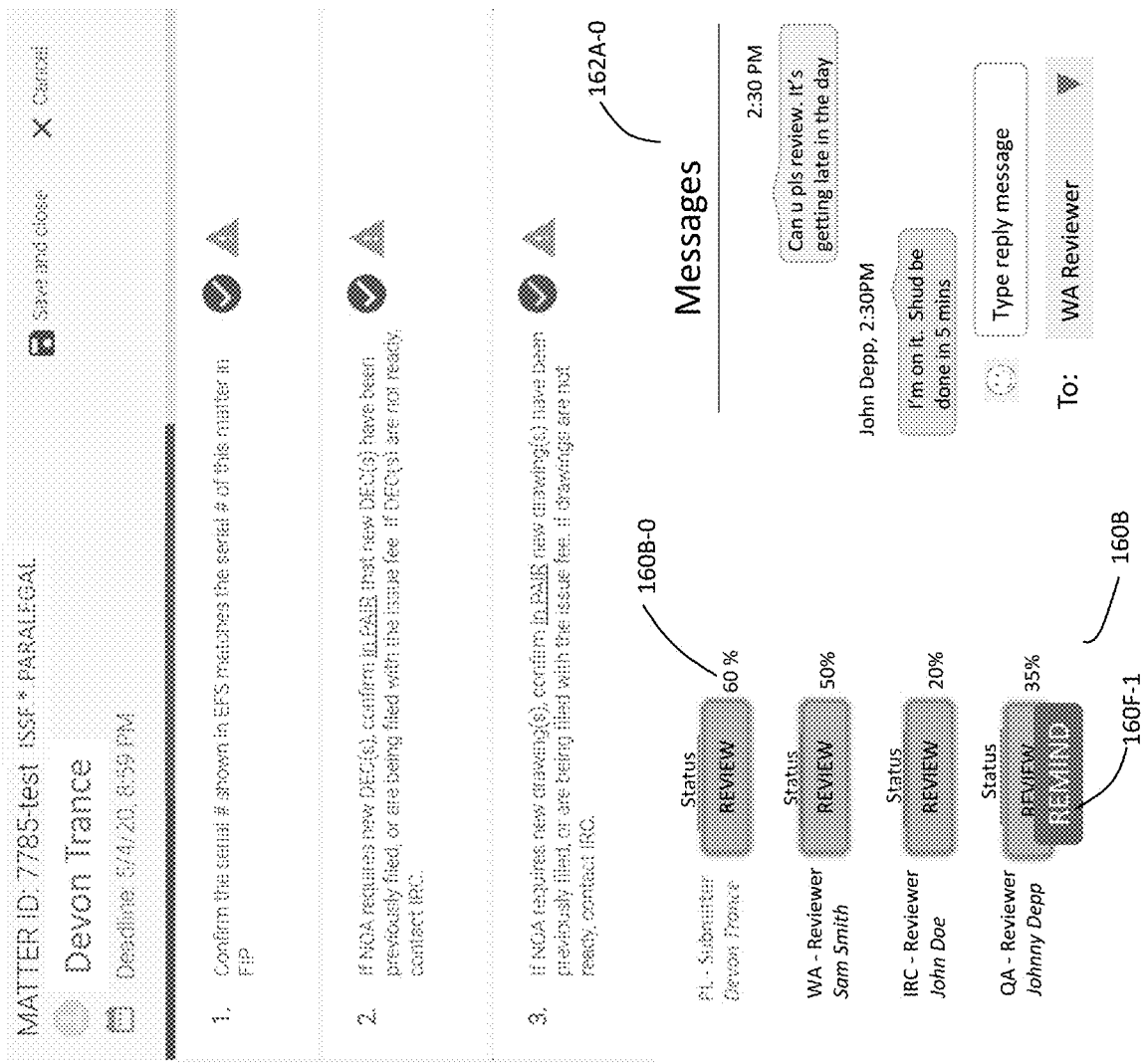

If an issue is raised by one of the users of the nested schema using similar techniques as described in FIGS. 8D-8E, the status of REVIEW for the user that the discovered the issue turns to ISSUE as depicted in FIG. 9H. The primary user can select the issue button 160E-0, which in turn launches the UI 160E-2 as shown in FIG. 9I. In UI 160E-2, the user raising the issue can describe the issue found in text and/or using screen shots. The primary user can drag and drop files if needed and provide comment before submitting a response to the user raising the issue. The comments can represent how the primary user was able to mitigate the issue, and the one or more files sent can show proof of mitigation. Alternatively, the comments field can also enable the primary user to include a screenshot showing the mitigation. UI 160E-2 may also require the primary user to indicated with a yes or no inquiry whether the issue has been resolved. Once the primary user's response has been submitted, the ISSUE status transitions back to REVIEW as depicted in FIG. 9J. The schema management system 100 can be configured to present to the user raising the issue (referred to herein as recipient user) a UI with the primary user's response. In one embodiment, the UI can be on an indicia such as icon 164A-0 of FIG. 9N, which can indicate the primary user has provided a response. Upon selecting this icon, the user can be presented a UI (not shown in FIG. 9N) with the primary user's textual, visual, and/or audible response. Alternatively, or in combination, the comments provided by the primary user can be presented via the messaging UI 162A-0 and/or a message indicating a response can be retrieved upon selecting the alert icon 164A-0. Attached files can be retrieved via indicia such icon 164A-1. In the UI presented upon selection of the alert icon 164A-0, the recipient user can be asked to indicate whether the issue has been resolved such as shown in the UI 160E-2. In the same inquiry, however, the user can also be given an option to proceed without resolution of the issue.

Figure 9K:
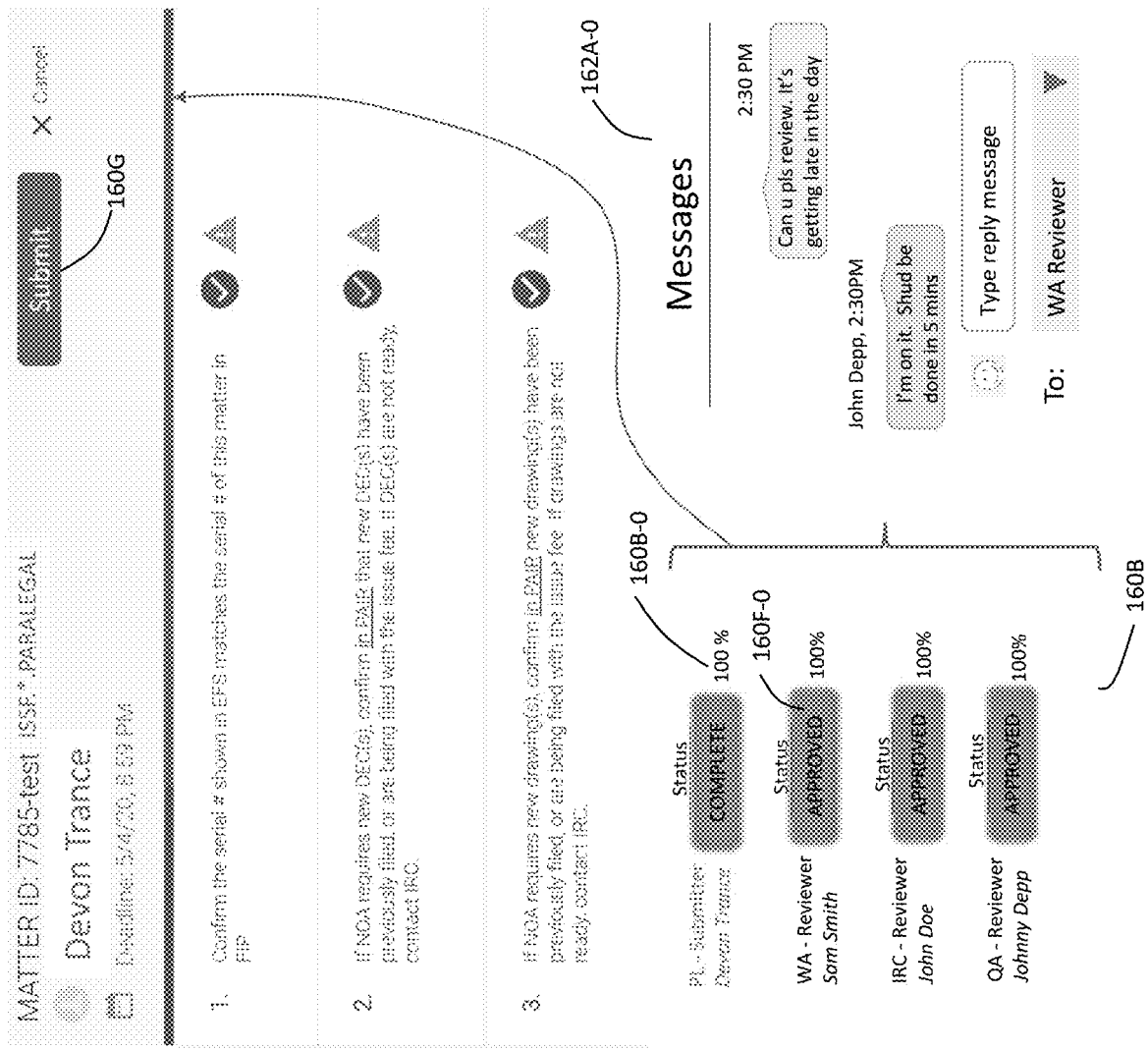
Figure 9L:
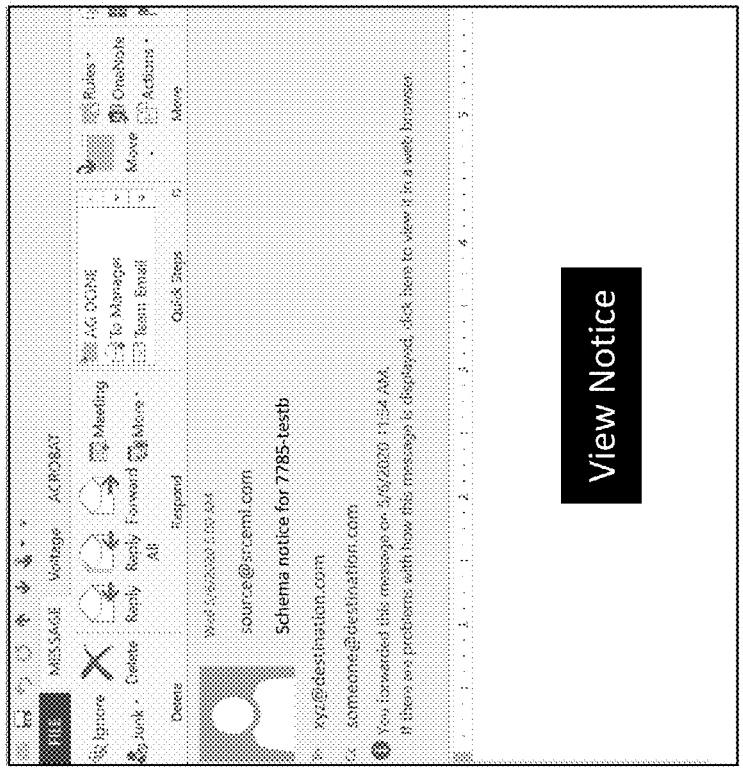
Figure 9M:
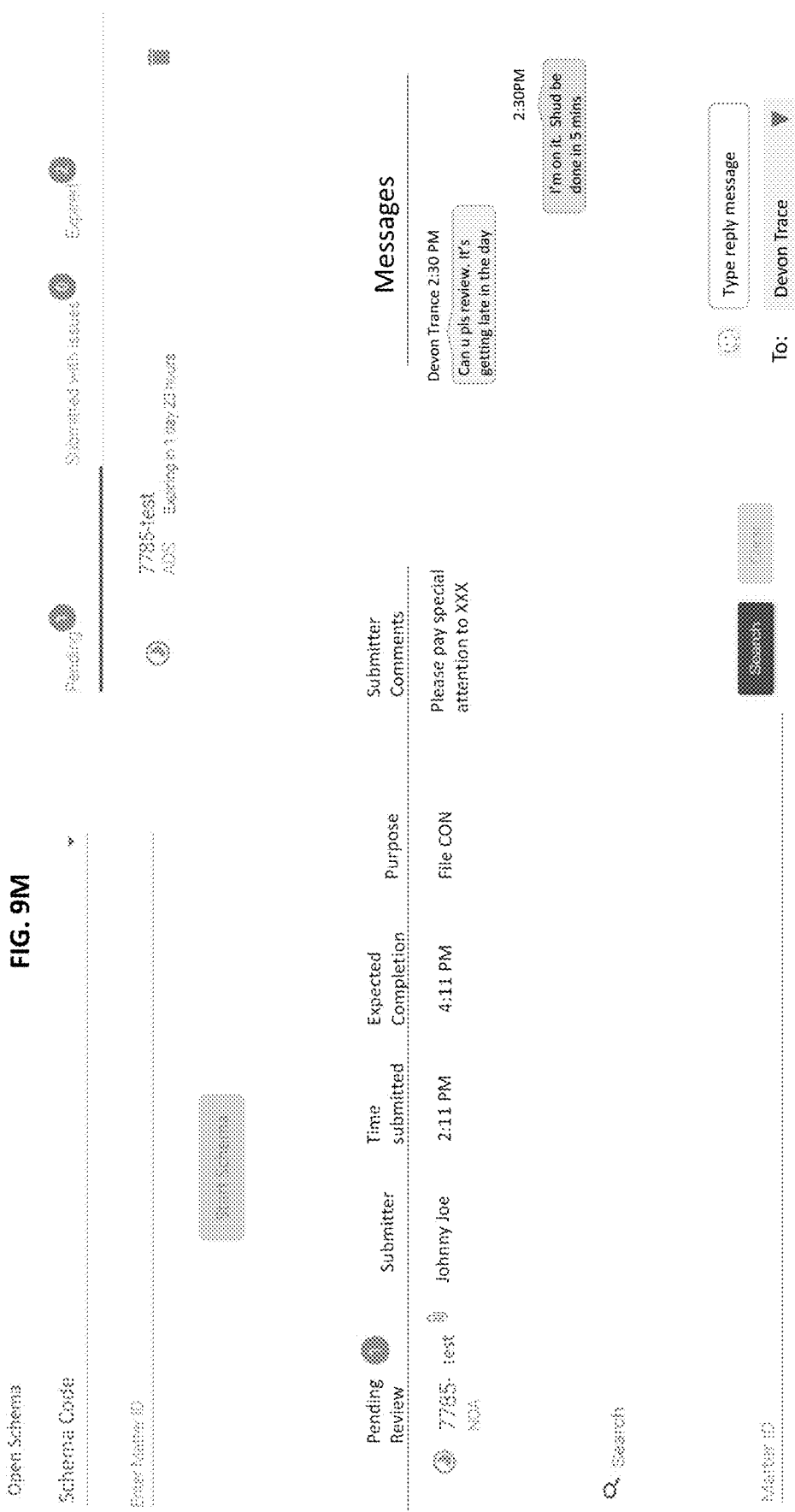
Figure 9N:
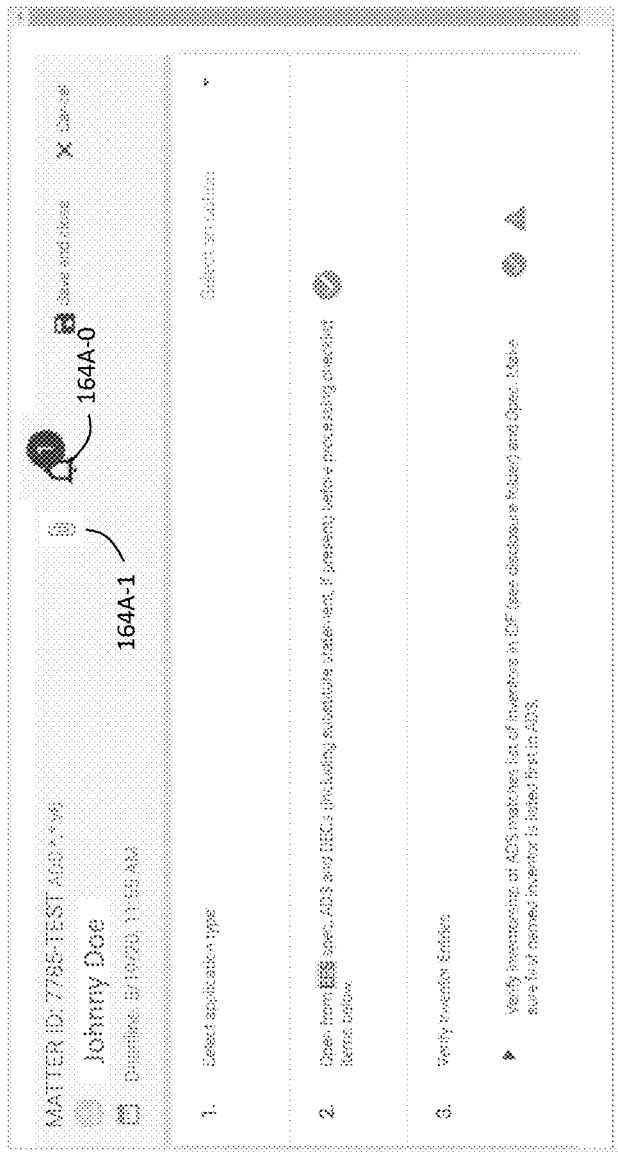

The primary user can see the progress of each team member performing schema elements via the status column as shown in FIGS. 9A-9J. If primary user deems it necessary to send a reminder to one of the users to complete their schema, the primary user can choose to send a message via the messaging UI 162A-0 or by selecting the REVIEW button, which in turn provides a REMIND button 160E-1. The REMIND button 160E-1 when selected can cause the schema management system 100 to submit a reminder to the user to complete the schema. The reminder can be sent via the messaging UI 162A-0, email and/or other suitable communication technique. Once the primary user and the remaining users have approved their respective schemas as shown in FIG. 9K, the schema reaches a state of completion indicated in the status of the primary user, thereby enabling the primary user to select the submit button 160G causing the schema management system 100 store a final record of the schema in its database with any memoranda created by the users. The schema management system 100 can also be configured to send an email with a randomized URL depicted as a View Notice button shown in FIG. 9L, which when selected by the recipient of the email presents in a browser a viewing of the completed schema elements by each or a portion of the users that participated in completing the schema along with any memoranda created by the users.

It will be appreciated that the schema management system 100 can also be configured to submit to each participant of the submitted schema a survey requesting feedback as to the performance of one or more participants of the schema. For example, the WA-Reviewer may be sent a survey to provide feedback on the performance of the primary user. Similarly, the primary user can be sent a survey to provide feedback on the WA-Reviewer, IRC-Reviewer and QA-Reviewer. Survey results can be kept by the schema management system 100 in a database that differs from the database of submitted schemas. The surveys can also be anonymized and can be tagged with a purging period. Additionally, the schema management system 100 can be configured to track the time of each participant of the submitted schema and combine this information with the survey results.

The schema management system 100 can be configured to randomize links submitted via any email communications. By randomizing URL links (e.g., no schema identifier, or other description about a schema), purged schemas cannot be reversed engineered by URL information.

In one or more embodiments, particular schema elements, information associated with schema elements, and/or other information associated with utilizing the schema management system 100 described herein can be stored (in whole and/or in part) in a blockchain format. This can include storing information that is to be retained permanently in the blockchain format while storing other information that is to be purged and/or anonymized outside of the blockchain format. As an example, maintenance records for a particular part or component of a system (e.g., a turbine of an airplane engine) may be maintained in blockchain format so that a history of schema elements performed on the particular part is accessible and verifiable. In this example, there may be some information that does not need to be included in a permanent record for the part (e.g., purchasing information) which would not be included in the blockchain format. In this example, the schema management system 100 facilitates maintenance being performed on the particular part, including maintenance performed by different members of a crew, while also allowing data to be analyzed with respect to the maintenance that is or was performed.

In one or more embodiments, the schema management system 100 can be accessed by mobile devices (e.g., a mobile phone, PDA, laptop computer, and so forth) so that individual(s) in the field or other environment (e.g., outside of an office space) can more readily access schemas from the schema management system 100. For instance, members of a crew that are providing cleaning services to a facility can access the schema management system 100 so that an overall project (e.g., restoration of the facility) can be managed and so that the progress of the overall project can be better monitored. This can also facilitate the performance of other schema elements associated with the restoration of the facility that may or may not be performed by the crew that are providing cleaning services, such as a schema element that requires looking for leakage in a pipe which then, via the exemplary embodiments of the subject disclosure, can trigger a schema element for repair by another individual, such as a plumber.

FIG. 10 depicts an illustrative embodiment of a method 1000 applied to a schema management system 100. The method 1000 can begin at step 1002 where the schema management system 100 can be configured for receiving a request to create a schema. At step 1004 the schema management system 100 can be configured for receiving a schema identifier, user type, and item identifier, the item identifier identifying one or more items to which the schema is to be applied to. The item identifier can represent, for example, a client identifier or other suitable identifier for identifying a tangible or intangible object. At step 1006 the schema management system 100 can be configured for generating a plurality of schema elements based on user-generated input. At step 1008 the schema management system 100 can be configured for recording in a database a plurality of records associated with the schema, the records including the schema identifier, the item identifier, and the plurality of schema elements, the database including other records for other schemas, the other schemas and the schema comprising a plurality of schemas with corresponding records, and the plurality of schemas distinguishable from each other based on the schema identifier and the item identifier associated with each schema of the plurality of schemas. It will be appreciated that method 1000 can be further adapted in order for the schema management system 100 any of the embodiments described in the subject disclosure. One or more of the embodiments described herein can utilize various techniques and combinations of techniques for communicating including emails, instant messaging, voice call messages, and so forth. The communicating can be to and/or from various devices and combinations of devices such as instant messaging to a mobile device of a cleaning crew member(s), leaving a voice message on a mobile phone of a maintenance crew member(s), and so forth. In one or more embodiments, the timing of some or all of the communications can be controlled or otherwise managed including manually or automatically such as real-time versus delayed communications (e.g., send this IM at 4 pm).

One or more of the embodiments described herein can be utilized in conjunction with and/or interface with (e.g., via an application programming interface) other systems and software, such as an inventory management system, a real time location system, a financial management system, a hotel reservation and management system, a maintenance management system, and so forth. Such interfacing can include sharing some or all of the information (e.g., non-confidential information) obtained or generated by the system so that the other system can perform some of its own analysis of the shared data.

Figure 11:
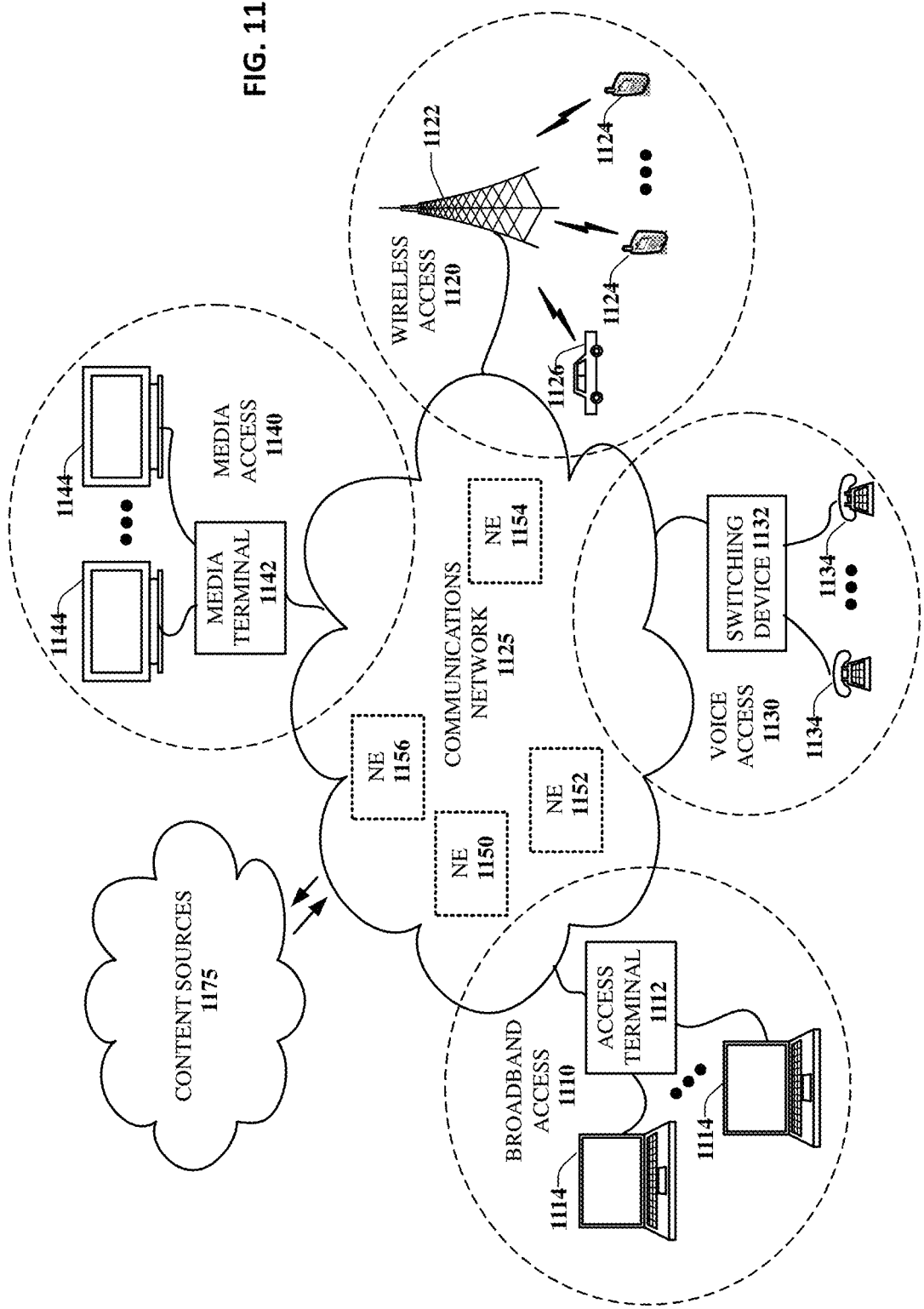
FIG. 11 is a block diagram illustrating an exemplary, non-limiting embodiment of a communications network from which a schema management system can be accessed in accordance with various aspects described herein.

Referring now to FIG. 11, a block diagram illustrating an exemplary, non-limiting embodiment of a communications network from which a schema management system 100 can be accessed in accordance with various aspects described herein. In particular, a communications network 1125 is presented for providing broadband access 1110 to a plurality of data terminals 1114 via access terminal 1112, wireless access 1120 to a plurality of mobile devices 1124 and vehicle 1126 via base station or access point 1122, voice access 1130 to a plurality of telephony devices 1134, via switching device 1132 and/or media access 1140 to a plurality of audio/video display devices 1144 via media terminal 1142. In addition, communication network 1125 is coupled to one or more content sources 1175 of audio, video, graphics, text and/or other media. While broadband access 1110, wireless access 1120, voice access 1130 and media access 1140 are shown separately, one or more of these forms of access can be combined to provide multiple access services to a single client device (e.g., mobile devices 1124 can receive media content via media terminal 1142, data terminal 1114 can be provided voice access via switching device 1132, and so on).

The communications network 1125 includes a plurality of network elements (NE) 1150, 1152, 1154, 1156, etc. for facilitating the broadband access 1110, wireless access 1120, voice access 1130, media access 1140 and/or the distribution of content from content sources 1175. The communications network 1125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 1112 can include a digital subscriber line access multiplexer (DSLAM), cable modem termination system (CMTS), optical line terminal (OLT) and/or other access terminal. The data terminals 1114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 1122 can include a 4G, 5G, or higher generation base station, an access point that operates via an 802.11 standard such as 802.11n, 802.11ac or other wireless access terminal. The mobile devices 1124 can include mobile phones, e-readers, tablets, phablets, wireless modems, and/or other mobile computing devices.

In various embodiments, the switching device 1132 can include a private branch exchange or central office switch, a media services gateway, VoIP gateway or other gateway device and/or other switching device. The telephony devices 1134 can include traditional telephones (with or without a terminal adapter), VoIP telephones and/or other telephony devices.

In various embodiments, the media terminal 1142 can include a cable head-end or other TV head-end, a satellite receiver, gateway or other media terminal 1142. The display devices 1144 can include televisions with or without a set top box, personal computers and/or other display devices.

In various embodiments, the content sources 1175 include broadcast television and radio sources, video on demand platforms and streaming video and audio services platforms, one or more content data networks, data servers, web servers and other content servers, and/or other sources of media.

In various embodiments, the communications network 1125 can include wired, optical and/or wireless links and the network elements 1150, 1152, 1154, 1156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 12:
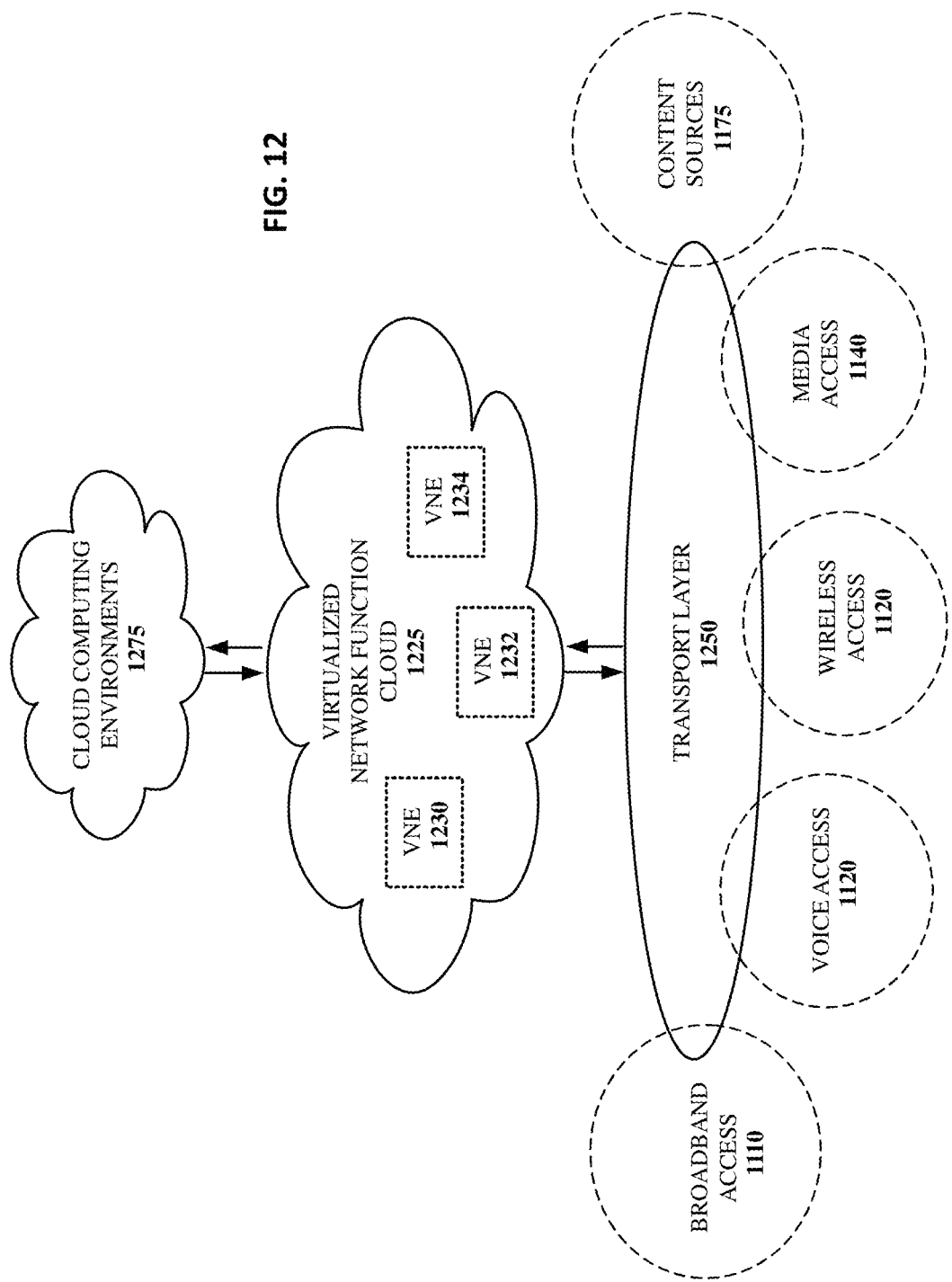
FIG. 12 is a block diagram illustrating an example, non-limiting embodiment of a virtualized communication network from which a schema management system can function in accordance with various aspects described herein.

Referring now to FIG. 12, a block diagram illustrating an example, non-limiting embodiment of a virtualized communication network from which a schema management system 100 can perform its operations in accordance with various aspects described herein. In particular a virtualized communication network is presented that can be used to implement some or all of the subsystems and functions of schema management system 100.

In particular, a cloud networking architecture is shown that leverages cloud technologies and supports rapid innovation and scalability via a transport layer 1250, a virtualized network function cloud 1225 and/or one or more cloud computing environments 1275. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 1230, 1232, 1234, etc. that perform some or all of the functions of network elements 1150, 1152, 1514, 1156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 1230 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 1250 includes fiber, cable, wired and/or wireless transport elements, network elements and interfaces to provide broadband access 1110, wireless access 1120, voice access 1130, media access 1140 and/or access to content sources 1175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 1230, 1232 or 1234. These network elements can be included in transport layer 1250.

The virtualized network function cloud 1225 interfaces with the transport layer 1250 to provide the VNEs 1230, 1232, 1234, etc. to provide specific NFVs. In particular, the virtualized network function cloud 1225 leverages cloud operations, applications, and architectures to support networking workloads. The virtualized network elements 1230, 1232 and 1234 can employ network function software that provides either a one-for-one mapping of traditional network element function or alternately some combination of network functions designed for cloud computing. For example, VNEs 1230, 1232 and 1234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 1230, 1232, 1234, etc. can be instantiated and managed using an orchestration approach similar to those used in cloud compute services.

The cloud computing environments 1275 can interface with the virtualized network function cloud 1225 via APIs that expose functional capabilities of the VNEs 1230, 1232, 1234, etc. to provide the flexible and expanded capabilities to the virtualized network function cloud 1225. In particular, network workloads may have applications distributed across the virtualized network function cloud 1225 and cloud computing environment 1275 and in the commercial cloud or might simply orchestrate workloads supported entirely in NFV infrastructure from these third-party locations.

Figure 13:
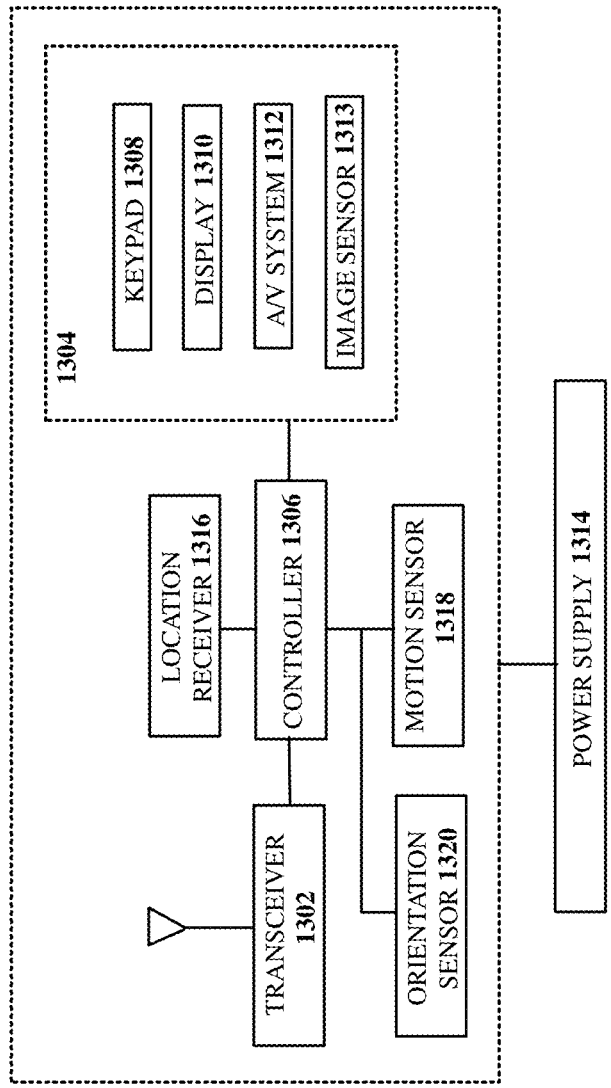
FIG. 13 is a block diagram of an example, non-limiting embodiment of a communication device that can be configured to execute a portion of and/or communicate with a schema management system in accordance with various aspects described herein.

Turning now to FIG. 13, a block diagram of an example, non-limiting embodiment of a communication device that can be configured to execute a portion of and/or communicate with a schema management system 100 in accordance with various aspects described herein. The communication device 1300 can serve as an illustrative embodiment of devices such as data terminals 1114, mobile devices 1124, vehicle 1126, display devices 1144 or other client devices for communication via communications network 1125.

The communication device 1300 can comprise a wireline and/or wireless transceiver 1302 (herein transceiver 1302), a user interface (UI) 1304, a power supply 1314, a location receiver 1316, a motion sensor 1318, an orientation sensor 1320, and a controller 1306 for managing operations thereof. The transceiver 1302 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1302 can also be adapted to support circuit-switched wireline access technologies (such as PSTN), packet-switched wireline access technologies (such as TCP/IP, VoIP, etc.), and combinations thereof.

The UI 1304 can include a depressible or touch-sensitive keypad 1308 with a navigation mechanism such as a roller ball, a joystick, a mouse, or a navigation disk for manipulating operations of the communication device 1300. The keypad 1308 can be an integral part of a housing assembly of the communication device 1300 or an independent device operably coupled thereto by a tethered wireline interface (such as a USB cable) or a wireless interface supporting for example Bluetooth®. The keypad 1308 can represent a numeric keypad commonly used by phones, and/or a QWERTY keypad with alphanumeric keys. The UI 1304 can further include a display 1310 such as monochrome or color LCD (Liquid Crystal Display), OLED (Organic Light Emitting Diode) or other suitable display technology for conveying images to an end user of the communication device 1300. In an embodiment where the display 1310 is touch-sensitive, a portion or all of the keypad 1308 can be presented by way of the display 1310 with navigation features.

The display 1310 can use touch screen technology to also serve as a user interface for detecting user input. As a touch screen display, the communication device 1300 can be adapted to present a user interface having graphical user interface (GUI) elements that can be selected by a user with a touch of a finger. The display 1310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1310 can be an integral part of the housing assembly of the communication device 1300 or an independent device communicatively coupled thereto by a tethered wireline interface (such as a cable) or a wireless interface.

The UI 1304 can also include an audio system 1312 that utilizes audio technology for conveying low volume audio (such as audio heard in proximity of a human ear) and high volume audio (such as speakerphone for hands free operation). The audio system 1312 can further include a microphone for receiving audible signals of an end user. The audio system 1312 can also be used for voice recognition applications. The UI 1304 can further include an image sensor 1313 such as a charged coupled device (CCD) camera for capturing still or moving images.

The power supply 1314 can utilize common power management technologies such as replaceable and rechargeable batteries, supply regulation technologies, and/or charging system technologies for supplying energy to the components of the communication device 1300 to facilitate long-range or short-range portable communications. Alternatively, or in combination, the charging system can utilize external power sources such as DC power supplied over a physical interface such as a USB port or other suitable tethering technologies.

The location receiver 1316 can utilize location technology such as a global positioning system (GPS) receiver capable of assisted GPS for identifying a location of the communication device 1300 based on signals generated by a constellation of GPS satellites, which can be used for facilitating location services such as navigation. The motion sensor 1318 can utilize motion sensing technology such as an accelerometer, a gyroscope, or other suitable motion sensing technology to detect motion of the communication device 1300 in three-dimensional space. The orientation sensor 1320 can utilize orientation sensing technology such as a magnetometer to detect the orientation of the communication device 1300 (north, south, west, and east, as well as combined orientations in degrees, minutes, or other suitable orientation metrics).

The communication device 1300 can use the transceiver 1302 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 1306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1300.

FIG. 14 diagrammatic representation of a machine in the form of a computer system within which a set of instructions, when executed, can cause the machine to perform any one or more of the methods and/or embodiments described herein for the schema management system 100. In some embodiments, the machine may be connected (e.g., using a network 1426) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU)), a graphics processing unit (GPU, or both), a main memory 1404 and a static memory 1406, which communicate with each other via a bus 1408. The computer system 1400 may further include a display unit 1410 (e.g., a liquid crystal display (LCD), a flat panel, or a solid state display). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., 4G, 5G, etc.) can be used by computer system 1400. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

Some of the embodiments described herein can also employ artificial intelligence (AI) to facilitate automating one or more features described herein. The embodiments of the subject disclosure can employ various AI-based schemes for carrying out various embodiments thereof. Moreover, a classifier can be employed. A classifier is a function that maps an input attribute vector, x=(x1, x2, x3, x4 . . . xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable medium, comprising executable instructions that, when executed by a processing system of a schema management system that includes a processor, facilitate performance of operations, the operations comprising:

receiving a first schema creation request to create a first new schema;

presenting a first graphical user interface (GUI) for completing the first new schema;

receiving, via the first GUI, a schema identifier, and a first user type;

generating, via the first GUI, a first plurality of schema elements based on first user-generated input;

recording in a database a first plurality of data structures associated with the first new schema, the first plurality of data structures of the first new schema including the schema identifier, the first user type, and the first plurality of schema elements;

receiving a second schema creation request to create a second new schema;

presenting a second GUI for completing the second new schema;

receiving, via the second GUI, the schema identifier, and second user type;

generating, via the second GUI, a second plurality of schema elements based on second user-generated input; and recording in the database a second plurality of data structures associated with the second new schema, the second plurality of data structures of the second new schema including the schema identifier, the second user type, and the second plurality of schema elements;

wherein the database includes other data structures for other schemas, the other schemas, the first new schema and the second new schema collectively corresponding to a plurality of schemas with associated data structures, wherein the first user type of the first new schema differs from the second user type of the second new schema, thereby the first new schema and the second new schema have differing user types, wherein the first user type is determined from first login information, wherein the second user type is determined from second login information, wherein the first login information differs from the second login information, wherein the first new schema and the second new schema share the schema identifier, thereby the first new schema and the second new schema are associated with a same schema identifier, and wherein selecting from the database the first new schema is distinguished from selecting from the database the second new schema based on the differing user types while sharing the same schema identifier.

2. The non-transitory machine-readable medium of claim 1, wherein the operations further comprise:

receiving a first user-generated request from a first device of a first user, the first user-generated request including the schema identifier and first user login information;

receiving a second user-generated request from a second device of a second user, the second user-generated request including the schema identifier and second user login information, wherein the second user login information differs from the first user login information, and wherein the first user-generated request shares the same schema identifier as provided by the second user-generated request;

determining the first user login information is associated with the first user type;

determining the second user login information is associated with the second user type, the first user type differing from the second user type resulting in differing user types;

selecting from the database the first new schema based on the first user type and the same schema identifier;

selecting from the database the second new schema based on the second user type and the same schema identifier, wherein the selecting from the database the first new schema is distinguished from the selecting from the database the second new schema based on the differing user types while sharing the same schema identifier;

presenting the first new schema at the first device of the first user; and presenting the second new schema at the second device of the second user.

3. The non-transitory machine-readable medium of claim 2, wherein the operations further comprise:

detecting a selection of a status type associated with a schema element in the first new schema; and presenting a graphical user interface for memorializing information associated with the selection of the status type.

4. The non-transitory machine-readable medium of claim 1, wherein at least a portion of the first plurality of schema elements of the first new schema are imported from one or more other schemas.

5. The non-transitory machine-readable medium of claim 1, wherein a portion of the second plurality of schema elements of the second new schema comprise at least a portion of an imported schema.

6. The non-transitory machine-readable medium of claim 1, wherein the operations further comprise:

presenting a specific schema from the plurality of schemas at a device of a first user, wherein the specific schema includes an imported schema;

receiving user-generated input from the device of the first user, the user-generated input identifying an assignment of the imported schema to a second user; and detecting a submission request directed to the second user.

7. The non-transitory machine-readable medium of claim 6, wherein the operations further comprise notifying the second user of the assignment of the imported schema responsive to detecting the submission request.

8. The non-transitory machine-readable medium of claim 6, wherein the operations further comprise receiving one or more file attachments for delivery with the imported schema.

9. The non-transitory machine-readable medium of claim 7, wherein the operations further comprise presenting a progress indicator of processed schema elements by the second user in association with the imported schema.

10. The non-transitory machine-readable medium of claim 7, wherein the operations further comprise enabling communications between the first user and the second user.

11. The non-transitory machine-readable medium of claim 6, wherein the operations further comprise enabling completion of the specific schema by the first user upon detecting completion of the imported schema by the second user.

12. The non-transitory machine-readable medium of claim 1, wherein the operations further comprise purging at least a portion of one or more completed schemas in the plurality of schemas according to an established purging period.

13. The non-transitory machine-readable medium of claim 1, wherein the operations further comprise randomizing one or more instances of completed schemas according to an established randomization period.

14. The non-transitory machine-readable medium of claim 1, wherein the operations further comprise configuring the first new schema and the second new schema for team-based processing.

15. A method, comprising:
receiving, by a processing system including at least one processor, a first schema creation request to create a first new schema;
presenting, by the processing system, a first graphical user interface (GUI) for completing the first new schema;
receiving, by the processing system via the first GUI, a schema identifier, and a first user type;
generating, by the processing system via the first GUI, a first plurality of schema elements based on first user-generated input;
recording, by the processing system, in a database a first plurality of data structures associated with the first new schema, the first plurality of data structures of the first new schema including the schema identifier, the first user type, and the first plurality of schema elements;
receiving, by the processing system, a second schema creation request to create a second new schema;
presenting, by the processing system, a second GUI for completing the second new schema;
receiving, by the processing system via the second GUI, the schema identifier, and second user type;
generating, by the processing system via the second GUI, a second plurality of schema elements based on second user-generated input; and
recording, by the processing system, in the database a second plurality of data structures associated with the second new schema, the second plurality of data structures of the second new schema including the schema identifier, the second user type, and the second plurality of schema elements;
wherein the database includes other data structures for other schemas, the other schemas, the first new schema and the second new schema collectively corresponding to a plurality of schemas with associated data structures,
wherein the first user type of the first new schema differs from the second user type of the second new schema, thereby the first new schema and the second new schema have differing user types,
wherein the first user type is determined from first login information,
wherein the second user type is determined from second login information,
wherein the first login information differs from the second login information,
wherein the first new schema and the second new schema share the schema identifier, thereby the first new schema and the second new schema are associated with a same schema identifier, and
wherein selecting from the database the first new schema is distinguished from selecting from the database the second new schema based on the differing user types while sharing the same schema identifier.

16. The method of claim 15, further comprising:
receiving a first user-generated request from a first device of a first user, the first user-generated request including the schema identifier and first user login information;
receiving a second user-generated request from a second device of a second user, the second user-generated request including the schema identifier and second user login information,
wherein the second user login information differs from the first user login information, and
wherein the first user-generated request shares the same schema identifier as provided by the second user-generated request;
presenting the first new schema at the first device of the first user responsive to determining the first user login information is associated with the first user type; and
presenting the second new schema at the second device of the second user responsive to determining the second user login information is associated with the second user type, the first user type differing from the second user type resulting in differing user types.

17. The method of claim 15, further comprising configuring at least two schemas of the plurality of schemas for team-based processing of the at least two schemas.

18. A device, comprising:
a processing system including a processor; and
a memory that stores executable instructions that, when executed by the processing system, facilitate performance of operations, the operations comprising:
receiving a first schema creation request to create a first new schema;
presenting a first graphical user interface (GUI) for completing the first new schema;
receiving, via the first GUI, a schema identifier, and a first user type;
generating, via the first GUI, a first plurality of schema elements based on first user-generated input;
recording in a database a first plurality of data structures associated with the first new schema, the first plurality of data structures of the first new schema including the schema identifier, the first user type, and the first plurality of schema elements;
receiving a second schema creation request to create a second new schema;
presenting a second GUI for completing the second new schema;
receiving, via the second GUI, the schema identifier, and second user type;
generating, via the second GUI, a second plurality of schema elements based on second user-generated input; and
recording in the database a second plurality of data structures associated with the second new schema, the second plurality of data structures of the second new schema including the schema identifier, the second user type, and the second plurality of schema elements;
wherein the database includes other data structures for other schemas, the other schemas, the first new schema and the second new schema collectively corresponding to a plurality of schemas with associated data structures,
wherein the first user type of the first new schema differs from the second user type of the second new schema, thereby the first new schema and the second new schema have differing user types,
wherein the first user type is determined from first login information,
wherein the second user type is determined from second login information,
wherein the first login information differs from the second login information, wherein the first new schema and the second new schema share the schema identifier, thereby the first new schema and the second new schema are associated with a same schema identifier, and wherein selecting from the database the first new schema is distinguished from selecting from the database the second new schema based on the differing user types while sharing the same schema identifier.

19. The device of claim 18, wherein the operations further comprise configuring the first new schema and the second new schema for team-based processing of the first new schema at a first device by a first user and the second new schema at a second device by a second user, and wherein at least a first portion of the first plurality of schema elements of the first new schema differ from at least a second portion of the second plurality of schema elements of the second new schema.

20. The device of claim 19, wherein the team-based processing comprises delegating processing of at least a portion of the first new schema to the second user, to another user utilizing another device, or a combination thereof.

* * * * *